United States Patent
Grieshaber et al.

(10) Patent No.: US 10,273,357 B2
(45) Date of Patent: Apr. 30, 2019

(54) HIGH HEAT POLYCARBONATE COMPOSITIONS

(71) Applicant: SABIC GLOBAL TECHNOLOGIES B.V., Bergen op Zoom (NL)

(72) Inventors: Sarah E. Grieshaber, Newburgh, IN (US); Tony Farrell, Bergen op Zoom (NL); Rob Boonman, Oosterhout (NL); Wilhelmus Johannes Daniel Steendam, Bergen op Zoom (NL); Maria del Mar Diez Diaz, Bergen op Zoom (NL); Robert Dirk van de Grampel, Tholen (NL); Natacha Forey, Grenoble (FR); Sjoerd van Nispen, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/302,508

(22) PCT Filed: Apr. 15, 2015

(86) PCT No.: PCT/US2015/025989
§ 371 (c)(1),
(2) Date: Oct. 7, 2016

(87) PCT Pub. No.: WO2015/160965
PCT Pub. Date: Oct. 22, 2015

(65) Prior Publication Data
US 2017/0029618 A1 Feb. 2, 2017

Related U.S. Application Data

(60) Provisional application No. 61/979,916, filed on Apr. 15, 2014.

(51) Int. Cl.
B32B 7/02 (2019.01)
C08L 69/00 (2006.01)
(Continued)

(52) U.S. Cl.
CPC .............. C08L 69/00 (2013.01); C08K 5/053 (2013.01); C08L 83/10 (2013.01);
(Continued)

(58) Field of Classification Search
CPC .... C08L 69/00; C08L 69/005; C08L 2201/08; C08L 2205/0258; C08L 2205/03; C08L 2205/035
See application file for complete search history.

(56) References Cited

U.S. PATENT DOCUMENTS 4,762,896 A 8/1988 Fox et al.
4,982,014 A 1/1991 Freitag et al.
(Continued)

FOREIGN PATENT DOCUMENTS

EP 0432596 A2 * 6/1991 ............... C08K 5/13
EP 0524731 A1 1/1993
(Continued)

OTHER PUBLICATIONS

EP 0432596 Machine Translation (Year: 1991).*
(Continued)

*Primary Examiner* — Prashant J Khatri
*Assistant Examiner* — Zachary M Davis
(74) *Attorney, Agent, or Firm* — Cantor Colburn LLP

(57) ABSTRACT

Polycarbonate blend compositions are disclosed. The compositions include at least one polycarbonate useful for high heat applications. The compositions can include one or more additional polymers. The compositions can include one or more additives. The compositions can be used to prepare articles of manufacture, and in particular, automotive bezels.

18 Claims, 3 Drawing Sheets

(51) Int. Cl.
*C08K 5/053* (2006.01)
*C08L 83/10* (2006.01)

(52) U.S. Cl.
CPC ..... *C08L 2201/08* (2013.01); *C08L 2205/025* (2013.01); *C08L 2205/03* (2013.01); *C08L 2205/035* (2013.01); *C08L 2205/06* (2013.01)

(56) References Cited

U.S. PATENT DOCUMENTS

| | | | |
|---|---|---|---|
| 5,401,813 | A | 3/1995 | Mason |
| 5,451,632 | A | 9/1995 | Okumura et al. |
| 5,885,497 | A | 3/1999 | Maas et al. |
| 6,001,929 | A | 12/1999 | Nodera et al. |
| 6,502,974 | B2 | 1/2003 | Chase et al. |
| 6,723,864 | B2 | 4/2004 | Silva et al. |
| 6,784,233 | B1 | 8/2004 | Weber et al. |
| 7,109,274 | B2 | 9/2006 | Acar et al. |
| 7,135,577 | B2 | 11/2006 | Rai et al. |
| 7,244,804 | B2 | 7/2007 | Ikeda et al. |
| 7,277,230 | B2 | 10/2007 | Srinivasan et al. |
| 7,329,720 | B2 | 2/2008 | Ganesan et al. |
| 7,348,439 | B2 | 3/2008 | Ganesan et al. |
| 7,354,986 | B2 | 4/2008 | Mahood et al. |
| 7,365,124 | B2 | 4/2008 | Srinivasan et al. |
| 7,408,016 | B2 | 8/2008 | Chatterjee et al. |
| 7,470,796 | B2 | 12/2008 | Rai et al. |
| 7,491,788 | B1 | 2/2009 | Leenders et al. |
| 7,514,524 | B2 | 4/2009 | Basale et al. |
| 7,563,817 | B2 | 7/2009 | Ganesan et al. |
| 7,592,464 | B2 | 9/2009 | Basale et al. |
| 7,642,315 | B2 | 1/2010 | Davis et al. |
| 7,649,073 | B2 | 1/2010 | Davis et al. |
| 7,709,581 | B2 | 5/2010 | Glasgow et al. |
| 7,790,832 | B2 | 9/2010 | Ganesan et al. |
| 7,838,689 | B2 | 11/2010 | Bhotla et al. |
| 7,842,379 | B2 | 11/2010 | Thiagarajan et al. |
| 7,868,190 | B2 | 1/2011 | Bhotla et al. |
| 7,884,220 | B2 | 2/2011 | Xu et al. |
| 7,915,430 | B2 | 3/2011 | Bhotla et al. |
| 7,935,777 | B2 | 5/2011 | De Kraker et al. |
| 7,999,037 | B2 | 8/2011 | Jansen et al. |
| 8,022,166 | B2 | 9/2011 | De Kraker et al. |
| 8,064,140 | B2 | 11/2011 | Hoeks et al. |
| 8,110,710 | B2 | 2/2012 | Dai et al. |
| 8,222,347 | B2 | 7/2012 | Chakravarti et al. |
| 8,247,523 | B2 | 8/2012 | Bhotla et al. |
| 8,414,823 | B2 | 4/2013 | Rüdiger et al. |
| 8,525,191 | B2 | 9/2013 | Zhou et al. |
| 2002/0132959 | A1 | 9/2002 | Ogawa et al. |
| 2004/0039145 | A1 | 2/2004 | Silva et al. |
| 2005/0288517 | A1 | 12/2005 | Rai et al. |
| 2006/0047037 | A1 | 3/2006 | Kawato et al. |
| 2007/0015081 | A1 | 1/2007 | Van Den Bogerd et al. |
| 2007/0197761 | A1 | 8/2007 | Ganesan et al. |
| 2008/0161507 | A1 | 7/2008 | Chakravarti et al. |
| 2009/0088504 | A1* | 4/2009 | Chatterjee ............... C08L 69/00 524/158 |
| 2009/0318604 | A1 | 12/2009 | De Kraker et al. |
| 2010/0048779 | A1 | 2/2010 | Hayata et al. |
| 2010/0267889 | A1 | 10/2010 | Sediel et al. |
| 2011/0060106 | A1* | 3/2011 | de Kraker ............... C08L 69/00 525/101 |
| 2011/0143126 | A1* | 6/2011 | Meyer ..................... C08L 69/00 428/334 |
| 2011/0245389 | A1 | 10/2011 | Yamada et al. |
| 2012/0065354 | A1* | 3/2012 | Bruder ................... C08K 5/103 528/196 |
| 2012/0252985 | A1 | 10/2012 | Rosenquist et al. |
| 2012/0309926 | A1 | 12/2012 | Bhotla et al. |
| 2013/0053487 | A1 | 2/2013 | Gallucci et al. |
| 2013/0118581 | A1 | 5/2013 | Zhou et al. |
| 2013/0274417 | A1 | 10/2013 | Muthulakshmi et al. |
| 2013/0310498 | A1 | 11/2013 | Morizur et al. |
| 2014/0000001 | A1 | 1/2014 | Lowery et al. |
| 2014/0094550 | A1 | 4/2014 | Diaz et al. |
| 2014/0356551 | A1 | 12/2014 | Thulke et al. |
| 2015/0331153 | A1* | 11/2015 | Kang ..................... B05D 3/147 428/216 |
| 2017/0022359 | A1 | 1/2017 | Farrell et al. |
| 2017/0022360 | A1 | 1/2017 | Farrell et al. |
| 2017/0022361 | A1 | 1/2017 | Grieshaber et al. |
| 2017/0022362 | A1 | 1/2017 | Grieshaber et al. |
| 2017/0037243 | A1 | 2/2017 | Grieshaber et al. |

FOREIGN PATENT DOCUMENTS

| | | | |
|---|---|---|---|
| EP | 0681037 | A1 | 11/1995 |
| EP | 0699716 | A2 | 3/1996 |
| EP | 1304351 | A1 | 4/2003 |
| EP | 1763512 | B1 | 9/2010 |
| JP | H03269043 | * | 11/1991 ............. C08L 27/06 |
| JP | 2004330728 | A | 11/2004 |
| JP | 2009155479 | * | 7/2009 ............ C08L 101/00 |
| WO | 2007070528 | A1 | 6/2007 |
| WO | 2010067330 | A1 | 6/2010 |
| WO | 2013049967 | A1 | 10/2011 |
| WO | 2013067684 | A1 | 5/2013 |

OTHER PUBLICATIONS

EP 0432596 Abstract (Year: 1991).*
JP H03-269043 Machine Translation (Year: 1991).*
JP 2009-155479 Machine Translation (Year: 2009).*
International Search Report; International Application No. PCT/US2015/025989, International Filing Date Apr. 15, 2015; dated Jun. 18, 2015; 9 pages.
Oku et al., "Chemical conversion of poly(carbonate) to bis(hydroxyethyl) ether of bisphenol A. An approach to the chemical recycling of plastic wastes as monomers," Polymer 41 (2000) pp. 6749-6753.
Written Opinion of the International Searching Authority; International Application No. PCT/US2015/025939; International Filing Date Apr. 15, 2015; dated Jun. 18, 2015; 5 pages.
Schnell, Chemistry and Physics of Polycarbonates, (1964) pp. 124-127. (Year: 1964).
Kasaliwal Dissertation "Analysis of Multiwalled Carbon Nanotube Agglomerate Dispersion in Polymer Melts"; Technischen Universatit Dresden (2001) p. 61. (Year: 2011).

* cited by examiner

HIGH HEAT POLYCARBONATE COMPOSITIONS

CROSS REFERENCE TO RELATED APPLICATIONS

This application is a 371 of International Application No. PCT/US2015/025989, filed Apr. 15, 2015, which claims priority to U.S. Provisional Patent Application No. 61/979,916, filed Apr. 15, 2014, which are incorporated herein by reference in their entirety.

TECHNICAL FIELD

The present disclosure relates generally to polycarbonate compositions, methods of using the compositions, and processes for preparing the compositions. In particular, the disclosure relates to polycarbonate compositions having improved thermal, mechanical, or rheological properties. The disclosure also relates to articles comprising the polycarbonate compositions, and more particularly, metallizable articles formed from the compositions.

BACKGROUND

Polycarbonates (PC) are synthetic thermoplastic resins that can be derived from bisphenols and phosgenes by interfacial polymerization, or from bisphenols and diaryl carbonates by melt polymerization. Polycarbonates are a useful class of polymers having many desired properties. They are highly regarded for optical clarity and enhanced impact strength and ductility at room temperature.

Since part designs are becoming more and more complex, a need remains for materials that have an improved balance of properties (e.g., heat resistance, melt flow, impact resistance, and metallizability). In particular, there remains a need for improved polycarbonate compositions, and articles formed from such compositions.

DETAILED DESCRIPTION

Figure 1:
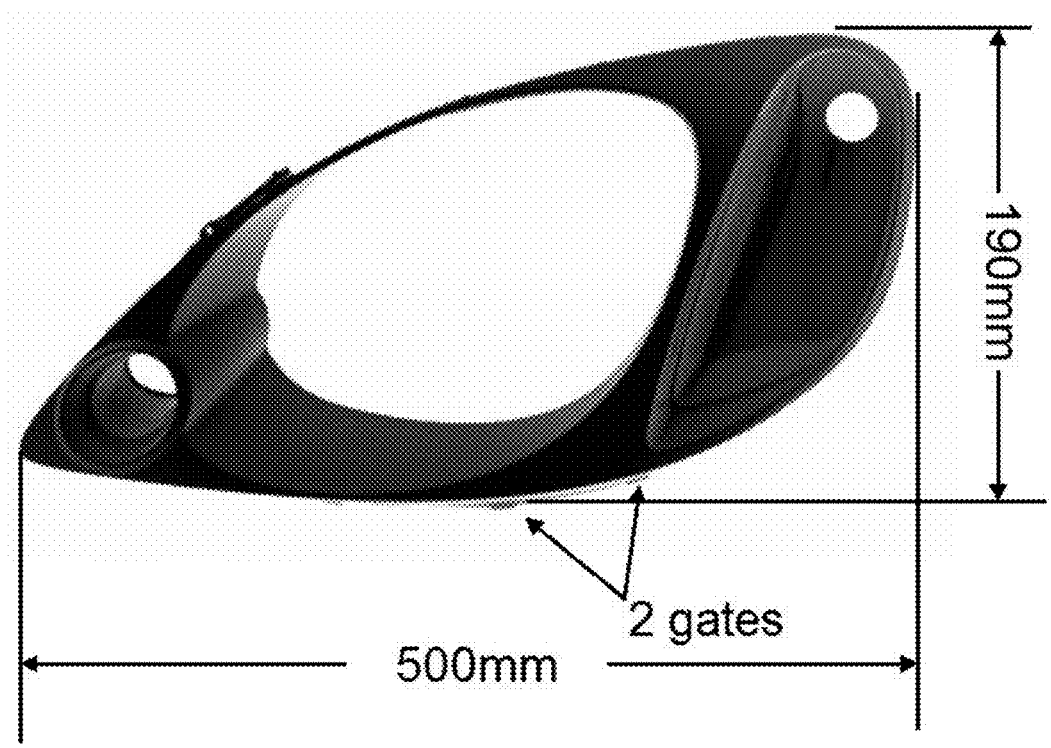
FIG. 1 depicts an exemplary auto bezel that can be molded from a disclosed polycarbonate blend composition. The bezel can be metallized after the molding process.

The present disclosure relates to polycarbonate-based blend compositions, also referred to herein as thermoplastic compositions. The compositions include at least one high heat polycarbonate. The compositions can include one or more additional polymers (e.g., homopolycarbonates, polysiloxane-polycarbonate copolymers, polyesters). The compositions can include one or more additives (e.g., fillers, mold release agents, antioxidants). The compositions can have improved thermal properties, mechanical properties, or rheological properties.

The compositions can be used to manufacture a variety of articles, and in particular, metallized articles suited to high heat applications. For example, the compositions can be used to prepare metallized headlamp bezels. Automotive headlamps are increasingly utilizing light sources that operate at higher temperatures and generate greater heat loads than in the past. Headlamps are also becoming a more integral part of automobile design to improve aerodynamics and aesthetic appearance. The result is that headlamp components (e.g., the lens) are closer to the light (and heat) source, necessitating use of materials that have an increased heat resistance while retaining other material characteristics.

The thermoplastic compositions are preferably directly metallizable for use in manufacture of metallized articles (e.g., metallized bezels). Additional preparation steps, such as base coating or chemical etching, can reduce the gloss of the metallized part. Thermoplastics can be evaluated for metallizability by assessing initial appearance after metallization, cross-hatch adhesion, haze onset temperature, and corrosion resistance, for example.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The terms "first," "second," "third," and the like, as used herein, do not denote any order, quantity, or importance, but rather are used to distinguish one element from another.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Disclosed are polycarbonate-based blend compositions. The compositions include at least one high heat polycarbonate, which may be referred to herein as "the first polycarbonate." The compositions may include one or more additional polycarbonates, which may be referred to herein as "the second polycarbonate," "the third polycarbonate," and the like. The compositions may include one or more polyesters, which may be referred to herein as "the first polyester," "the second polyester," and the like. The compositions may include one or more hydroxyl-functionalized flow promoters (e.g., alkylene glycols). The compositions may include one or more additives.

The compositions include at least one polycarbonate. Polycarbonates of the disclosed blend compositions may be homopolycarbonates, copolymers comprising different moieties in the carbonate (referred to as "copolycarbonates"), copolymers comprising carbonate units and other types of polymer units such as polysiloxane units, polyester units, and combinations thereof.

The polycarbonates may have a weight average molecular weight (Mw) of 1,500 to 150,000 Daltons [±1,000 Daltons], of 10,000 to 50,000 Daltons [±1,000 Daltons], of 15,000 to 35,000 Daltons [±1,000 Daltons], or of 20,000 to 30,000 Daltons [±1,000 Daltons]. Molecular weight determinations may be performed using gel permeation chromatography (GPC), using a cross-linked styrene-divinylbenzene column and calibrated to polycarbonate references using a UV-VIS detector set at 254 nm. Samples may be prepared at a concentration of 1 mg/ml, and eluted at a flow rate of 1.0 ml/min.

The compositions may include one or more homopolycarbonates or copolycarbonates. The term "polycarbonate" and "polycarbonate resin" refers to compositions having repeating units of formula (1):

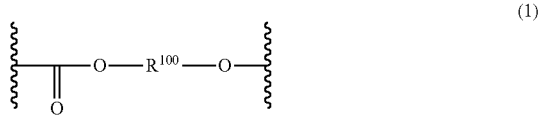

(1)

wherein each $R^{100}$ may independently comprise any suitable organic group, such as an aliphatic, alicyclic, or aromatic group, or any combination thereof. In certain embodiments, $R^{100}$ in the carbonate units of formula (1) may be a $C_6$-$C_{36}$ aromatic group wherein at least one moiety is aromatic.

The repeating units of formula (1) may be derived from dihydroxy compounds of formula (2):

HO—$R^{100}$—OH (2)

wherein $R^{100}$ is as defined above.

The polycarbonate may include repeating units of formula (3):

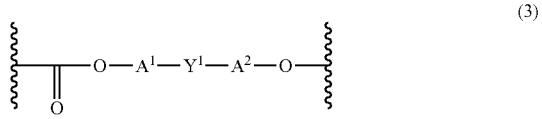

(3)

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group of $Y^1$ may be a hydrocarbon group such as methylene, cyclohexylidene, or isopropylidene.

The repeating units of formula (3) may be derived from a dihydroxy monomer unit of formula (4):

HO-$A^1$-$Y^1$-$A^2$-OH (4)

wherein $A^1$, $A^2$, and $Y^1$ are as defined above.

The polycarbonate may include repeating units of formula (5):

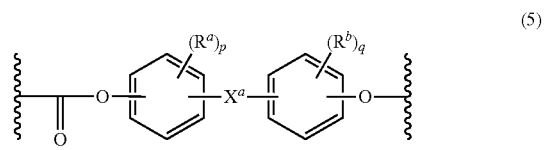

(5)

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; p and q are each independently 0 to 4; and $X^a$ is a bridging group between the two arylene groups. $X^a$ may be a single bond, —O—, —S—, —S(O)—, —S(O)$_2$—, —C(O)—, or a $C_1$-$C_8$ organic group. The $C_1$-$C_{18}$ organic bridging group may be cyclic or acyclic, aromatic or non-aromatic, and can optionally include halogens, heteroatoms (e.g., oxygen, nitrogen, sulfur, silicon, or phosphorous), or a combination thereof. The $C_1$-$C_{18}$ organic group can be disposed such that the $C_6$ arylene groups connected thereto are each connected to a common alkylidene carbon or to different carbons of the $C_1$-$C_{18}$ organic bridging group. The bridging group $X^a$ and the carbonate oxygen atoms of each $C_6$ arylene group can be disposed ortho, meta, or para (specifically para) to each other on the $C_6$ arylene group. Exemplary $X^a$ groups include, but are not limited to, methylene, ethylidene, neopentylidene, isopropylidene, cyclohexylmethylidene, 1,1-ethene, 2-[2.2.1]-bicycloheptylidene, cyclohexylidene, cyclopentylidene, cyclododecylidene, and adamantylidene.

In certain embodiments, p and q are each 1; $R^a$ and $R^b$ are each a $C_1$-$C_3$ alkyl group, specifically methyl, disposed meta to the oxygen on each ring; and $X^a$ is isopropylidene. In certain embodiments, p and q are both 0; and $X^a$ is isopropylidene.

In certain embodiments, $X^a$ may have formula (6):

(6)

wherein $R^c$ and $R^d$ are each independently hydrogen, halogen, alkyl (e.g., $C_1$-$C_{12}$ alkyl), cycloalkyl (e.g., $C_3$-$C_{12}$ cycloalkyl), cycloalkylalkyl (e.g., $C_3$-$C_{12}$-cycloalkyl-$C_1$-$C_6$-alkyl), aryl (e.g., $C_6$-$C_{12}$ aryl), arylalkyl (e.g., $C_6$-$C_{12}$-aryl-$C_1$-$C_6$-alkyl), heterocyclyl (e.g., five- or six-membered heterocyclyl having one, two, three, or four heteroatoms independently selected from nitrogen, oxygen, and sulfur), heterocyclylalkyl (e.g., five- or six-membered heterocyclyl-$C_1$-$C_6$-alkyl), heteroaryl (e.g., five- or six-membered heteroaryl having one, two, three, or four heteroatoms independently selected from nitrogen, oxygen, and sulfur), or heteroarylalkyl (e.g., five- or six-membered heteroaryl-$C_1$-$C_6$-alkyl), wherein said alkyl, cycloalkyl, cycloalkylalkyl, aryl, arylalkyl, heterocyclyl, heterocyclylalkyl, heteroaryl, and heteroarylalkyl are each independently unsubstituted or substituted (e.g., substituted with 1 to 3 substituents independently selected from the group consisting of —OH, —NH$_2$, —NO$_2$, —CN, halo, $C_1$-$C_4$-alkyl, $C_1$-$C_4$-alkoxy-$C_1$-$C_4$-alkyl, halo-$C_1$-$C_4$-alkyl, halo-$C_1$-$C_4$-alkoxy-$C_1$-$C_4$-alkyl, hydroxy-$C_1$-$C_4$-alkyl, amino-$C_1$-$C_4$-alkyl, $C_1$-$C_4$-alkylamino-$C_1$-$C_4$-alkyl, di($C_1$-$C_4$-alkyl)amino-$C_1$-$C_4$-alkyl, azido-$C_1$-$C_4$-alkyl, cyano-$C_1$-$C_4$-alkyl, $C_1$-$C_4$-alkoxy, halo-$C_1$-$C_4$-alkoxy, $C_1$-$C_4$-alkoxy-$C_1$-$C_4$-alkoxy, $C_2$-$C_4$-alkenyl, and $C_2$-$C_4$-alkynyl). In certain embodiments, $R^c$ and $R^d$ are each independently hydrogen or $C_1$-$C_8$ alkyl. In certain embodiments, $R^c$ and $R^d$ are each methyl. Exemplary groups of formula (6) include, but are not limited to, methylene, ethylidene, neopentylidene, and isopropylidene.

In certain embodiments, $X^a$ may have formula (7):

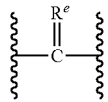
(7)

wherein $R^e$ is a divalent $C_1$-$C_3$, group. In certain embodiments, $R^e$ is a divalent hydrocarbyl (e.g., a $C_{12}$-$C_{31}$ hydrocarbyl), a cycloalkylidene (e.g., a $C_5$-$C_{18}$ cycloalkylidene), a cycloalkylene (e.g., a $C_5$-$C_{18}$ cycloalkylene), a heterocycloalkylidene (e.g., a $C_3$-$C_{18}$ heterocycloalkylidene), or a group of the formula —$B^1$-G-$B^2$— wherein $B^1$ and $B^2$ are the same or different alkylene group (e.g., a $C_1$-$C_6$ alkylene group) and G is a cycloalkylidene group (e.g., a $C_3$-$C_{12}$ cycloalkylidene group) or an arylene group (e.g., a $C_6$-$C_{16}$ arylene group), wherein said hydrocarbyl, cycloalkylidene, cycloalkylene, and heterocycloalkylidene are each independently unsubstituted or substituted (e.g., substituted with 1 to 3 substituents independently selected from the group consisting of —OH, —$NH_2$, —$NO_2$, —CN, halo, $C_1$-$C_4$-alkyl, $C_1$-$C_4$-alkoxy-$C_1$-$C_4$-alkyl, halo-$C_1$-$C_4$-alkyl, halo-$C_1$-$C_4$-alkoxy-$C_1$-$C_4$-alkyl, hydroxy-$C_1$-$C_4$-alkyl, amino-$C_1$-$C_4$-alkyl, $C_1$-$C_4$-alkylamino-$C_1$-$C_4$-alkyl, di($C_1$-$C_4$-alkyl)amino-$C_1$-$C_4$-alkyl, azido-$C_1$-$C_4$-alkyl, cyano-$C_1$-$C_4$-alkyl, $C_1$-$C_4$-alkoxy, halo-$C_1$-$C_4$-alkoxy, $C_1$-$C_4$-alkoxy-$C_1$-$C_4$-alkoxy, $C_2$-$C_4$-alkenyl, and $C_2$-$C_4$-alkynyl). Exemplary groups of formula (7) include, but are not limited to, 2-[2.2.1]-bicycloheptylidene, cyclohexylidene, cyclopentylidene, cyclododecylidene, and adamantylidene.

The repeating structural units of formula (5) may be derived from a dihydroxy monomer unit of formula (8):

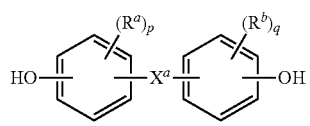
(8)

wherein $X^a$, $R^a$, $R^b$, p, and q are as defined above. In certain embodiments, p and q are both 0, and $X^a$ is isopropylidene.

The polycarbonate may include repeating units of formula (9), formula (10), formula (11), or a combination thereof:

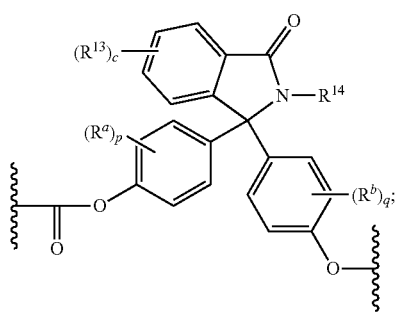
(9)

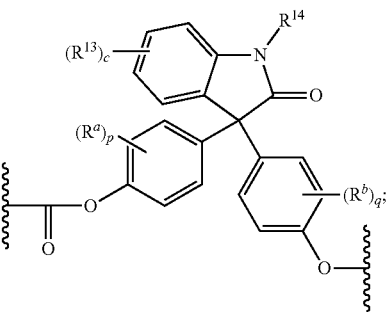
(10)

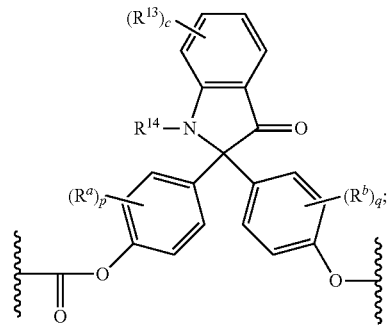
(11)

wherein $R^{13}$ at each occurrence is independently a halogen or a $C_1$-$C_6$ alkyl group; $R^{14}$ is independently a $C_1$-$C_6$ alkyl, phenyl, or phenyl substituted with up to five halogens or $C_1$-$C_6$ alkyl groups; $R^a$ and $R^b$, at each occurrence, are each independently a halogen, $C_1$-$C_{12}$ alkyl, $C_1$-$C_{12}$ alkenyl, $C_3$-$C_8$ cycloalkyl, or $C_1$-$C_{12}$ alkoxy; c is independently 0 to 4; and p and q are each independently 0 to 4. In a specific embodiment, $R^{14}$ is a $C_1$-$C_6$ alkyl or phenyl group. In still another embodiment, $R^{14}$ is a methyl or phenyl group. In another specific embodiment, c is 0; p is 0; and q is 0.

The dihydroxy compound of formula (12) can have formula (15), which may be useful for high heat applications:

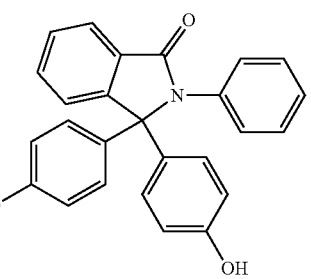
(15)

(also known as 3,3-bis(4-hydroxyphenyl)-2-phenylisoindolin-1-one (PPPBP)).

The polycarbonate may include repeating units of formula (16):

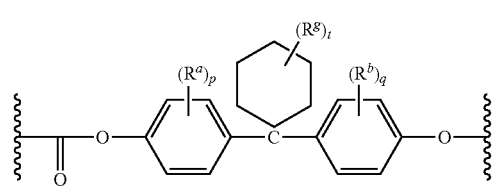
(16)

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; $R^g$ is independently $C_1$-$C_{12}$ alkyl or halogen, or two $R^g$ groups together with the carbon atoms to which they are attached may form a four-, five, or six-membered cycloalkyl group; p and q are each independently 0 to 4; and t is 0 to 10. $R^a$ and $R^b$ may be disposed meta to the cyclohexylidene bridging group. The substituents $R^a$, $R^b$ and $R^g$ may, when comprising an appropriate number of carbon atoms, be straight chain, cyclic, bicyclic, branched, saturated, or unsaturated. In one example, $R^a$, $R^b$ and $R^g$ are each independently $C_1$-$C_4$ alkyl, p and q are each 0 or 1, and t is 0 to 5. In another example, $R^a$, $R^b$ and $R^g$ are each methyl, p and q are each 0 or 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

The dihydroxy compound of formula (17) can have formula (18), which may be useful for high heat applications:

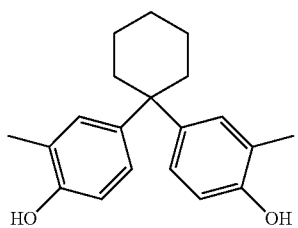

(18)

(also known as 1,1-bis(4-hydroxy-3-methylphenyl)cyclohexane (DMBPC)).

The dihydroxy compound of formula (17) can have formula (19), which may be useful for high heat applications:

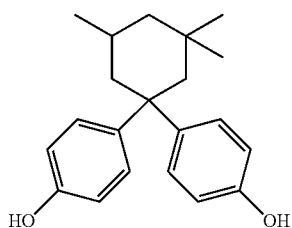

(19)

(also known as bisphenol isophorone).

The dihydroxy compound of formula (17) can have formula (20), which may be useful for high heat applications:

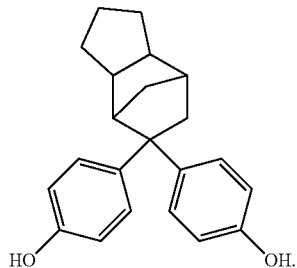

(20)

The polycarbonate may include repeating units of formula (21):

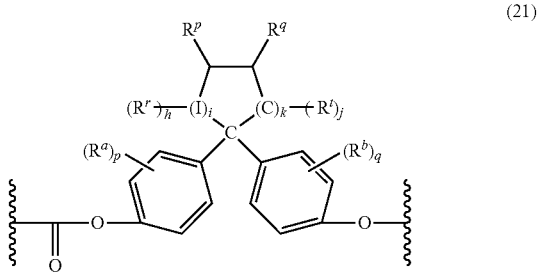

(21)

wherein $R^r$, $R^p$, $R^q$ and $R^t$ are each independently hydrogen, halogen, oxygen, or a $C_1$-$C_{12}$ organic group; $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; I is a direct bond, a carbon, or a divalent oxygen, sulfur, or —N(Z)— where Z is hydrogen, halogen, hydroxy, $C_1$-$C_{12}$ alkyl, $C_1$-$C_{12}$ alkoxy, $C_6$-$C_{12}$ aryl, or $C_1$-$C_{12}$ acyl; h is 0 to 2, j is 1 or 2, i is an integer of 0 or 1, k is an integer of 0 to 3, p is an integer of 0 to 4, and q is an integer 0 to 4, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (21) will have an unsaturated carbon-carbon linkage where the ring is fused. When i is 0, h is 0, and k is 1, the ring as shown in formula (21) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

The polycarbonate may include repeating units of formula (23):

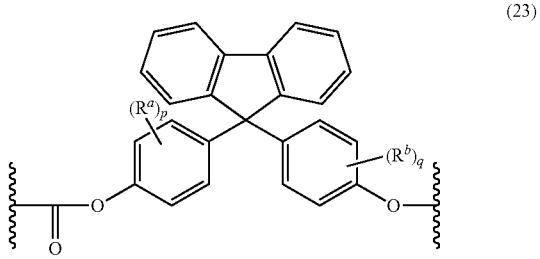

(23)

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; and p and q are each independently 0 to 4. In certain embodiments, at least one of each of $R^a$ and $R^b$ are disposed meta to the cycloalkylidene bridging group. In certain embodiments, $R^a$ and $R^b$ are each independently $C_1$-$C_3$ alkyl; and p and q are each 0 or 1. In certain embodiments, $R^a$ and $R^b$ are each methyl; and p and q are each 0 or 1.

The repeating structural units of formula (23) may be derived from a dihydroxy monomer unit of formula (24):

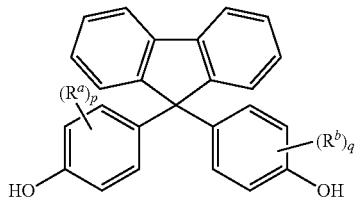

(24)

wherein $R^a$, $R^b$, p, and q are as defined above. Such dihydroxy compounds that might impart high Tgs to the polycarbonate as a copolycarbonate are described in U.S. Pat. No. 7,244,804, which is fully incorporated herein by reference.

The polycarbonate may include repeating units of formula (26):

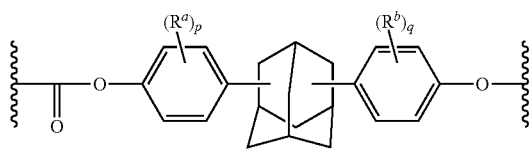

(26)

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; and p and q are each independently 0 to 4. In certain embodiments, at least one of each of $R^a$ and $R^b$ are disposed meta to the cycloalkylidene bridging group. In certain embodiments, $R^a$ and $R^b$ are each independently $C_1$-$C_3$ alkyl; and p and q are each 0 or 1. In certain embodiments, $R^a$ and $R^b$ are each methyl; and p and q are each 0 or 1.

The dihydroxy compound of formula (27) can have formula (28), which may be useful for high heat applications:

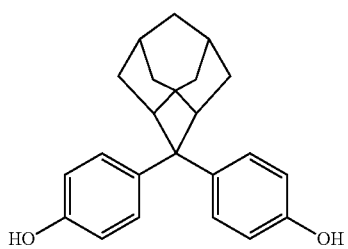

(28)

(also known as 2,2-bis(4-hydroxyphenyl)adamantane).

A dihydroxy compound of formula (29) may be useful for high heat applications:

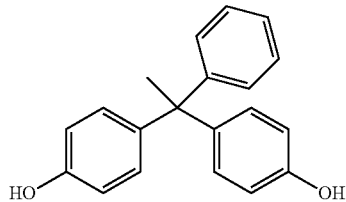

(29)

(also known as 4,4'-(1-phenylethane-1,1-diyl)diphenol (bisphenol-AP) or 1,1-bis(4-hydroxyphenyl)-1-phenyl-ethane).

A dihydroxy compound of formula (30) may be useful for high heat applications:

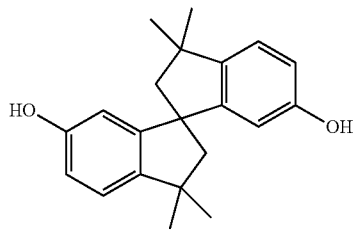

(30)

(also known as 6,6'-dihydroxy-3,3,3',3'-tetramethylspiro (bis)indane).

Exemplary monomers for inclusion in the polycarbonate include, but are not limited to, 4,4'-dihydroxybiphenyl, 1,1-bis(4-hydroxyphenyl)methane, bis(4-hydroxyphenyl) acetonitrile, bis(4-hydroxyphenyl)phenylmethane, bis(4-hydroxyphenyl)-1-naphthylmethane, 1,1-bis(4-hydroxyphenyl)ethane, 1,2-bis(4-hydroxyphenyl)ethane, 1,1-bis(4-hydroxyphenyl)-1-phenylethane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 1,1-bis(4-hydroxyphenyl)propane, 1,1-bis(4-hydroxy-t-butylphenyl)propane, 2,2-bis(4-hydroxyphenyl)propane ("bisphenol-A" or "BPA"), 2-(4-hydroxyphenyl)-2-(3-hydroxyphenyl)propane, 2,2-bis(4-hydroxy-2-methylphenyl)propane, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxy-3-bromophenyl)propane, 2,2-bis(4-hydroxyphenyl)hexafluoropropane, 1,1-bis(4-hydroxyphenyl)n-butane, 2,2-bis(4-hydroxyphenyl)butane, 3,3-bis(4-hydroxyphenyl)-2-butanone, 1,1-bis(4-hydroxyphenyl)isobutene, trans-2,3-bis(4-hydroxyphenyl)-2-butene, 1,6-bis(4-hydroxyphenyl)-1,6-hexanedione, 2,2-bis(4-hydroxyphenyl)octane, 1,1-bis(hydroxyphenyl)cyclopentane, 1,1-bis(4-hydroxyphenyl)cyclohexane, 1,1-bis(4-hydroxy-3-methylphenyl)cyclohexane, 1,1-bis(4-hydroxyphenyl)cyclododecane, 2,2-bis(4-hydroxyphenyl)adamantane, (alpha, alpha'-bis(4-hydroxyphenyl)toluene, 4,4'-dihydroxybenzophenone, 2,7-dihydroxypyrene, bis(4-hydroxyphenyl)ether, ethylene glycol bis(4-hydroxyphenyl)ether, bis(4-hydroxyphenyl)sulfide, bis(4-hydroxyphenyl)sulfoxide, bis(4-hydroxyphenyl)sulfone, bis(4-hydroxyphenyl)diphenylmethane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 2-phenyl-3,3-bis(4-hydroxyphenyl)phthalimidine (also referred to as 3,3-bis(4-hydroxyphenyl)-2-phenylisoindolin-1-one or "PPPBP"), 9,9-bis(4-hydroxyphenyl)fluorene, and bisphenol isophorone (also referred to as 4,4'-(3,3,5-trimethylcyclohexane-1,1-diyl)diphenol or "BPI"), 1,1-bis(4-hydroxy-3-methylphenyl)cyclohexane ("DMBPC"), tricyclopentadienyl bisphenol (also referred to as 4,4'-(octahydro-1H-4,7-methanoindene-5,5-diyl)diphenol), 2,2-bis(4-hydroxyphenyl)adamantane ("BCF"), 1,1-bis(4-hydroxyphenyl)-1-phenyl ethane ("BPAP"), and 3,3-bis(4-hydroxyphenyl)phthalide, or any combination thereof.

Exemplary monomers useful for increasing the Tg of the polycarbonate include, but are not limited to, bis(4-hydroxyphenyl)diphenylmethane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 2-phenyl-3,3-bis(4-hydroxyphenyl)phthalimidine (also referred to as 3,3-bis(4-hydroxyphenyl)-2-phenylisoindolin-1-one or "PPPBP"), 9,9-bis(4-hydroxyphenyl)fluorene, and bisphenol isophorone (also referred to as 4,4'-(3,3,5-trimethylcyclohexane-1,1-diyl)diphenol or "BPI"), 1,1-bis(4-hydroxy-3-methylphenyl)cyclohexane ("DMBPC"), tricyclopentadienyl bisphenol (also referred to as 4,4'-(octahydro-1H-4,7-methanoindene-5,5-diyl)diphenol), 2,2-bis(4-hydroxyphenyl)adamantane ("BCF"), 1,1-bis(4-hydroxyphenyl)-1-phenyl ethane ("BPAP"), and 3,3-bis(4-hydroxyphenyl)phthalide, or any combination thereof.

Other dihydroxy monomer units that may be used include aromatic dihydroxy compounds of formula (31):

(31)

wherein each $R^h$ is independently a halogen atom, a $C_1$-$C_{10}$ hydrocarbyl such as a $C_1$-$C_{10}$ alkyl group, or a halogen substituted $C_1$-$C_{10}$ hydrocarbyl such as a halogen-substituted $C_1$-$C_{10}$ alkyl group, and n is 0 to 4. The halogen, when present, is usually bromine.

Examples of aromatic dihydroxy compounds represented by formula (31) include, but are not limited to, resorcinol, substituted resorcinol compounds (e.g., 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol), catechol, hydroquinone, substituted hydroquinones (e.g., 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations thereof.

The compositions may include one or more polycarbonate polysiloxane copolymers. The polycarbonate structural unit of the polycarbonate-polysiloxane copolymer may be derived the monomers of formula (2), formula (4), or formula (8), as described above. The diorganosiloxane (referred to herein as "siloxane") units can be random or present as blocks in the copolymer.

The polysiloxane blocks comprise repeating siloxane units of formula (32):

(32)

wherein each R is independently a $C_1$-$C_{13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. Where a transparent poly (carbonate-siloxane) is desired, R is unsubstituted by halogen. Combinations of the foregoing R groups can be used in the same copolymer.

The value of E in formula (32) can vary widely depending on the type and relative amount of each component in the composition, the desired properties of the composition, and like considerations. Generally, E has an average value of 2 to 1,000, specifically 2 to 500, 2 to 200, or 2 to 125, 5 to 80, or 10 to 70. E may have an average value of 10 to 80, 10 to 40, 40 to 80, or 40 to 70. Where E is of a lower value (e.g., less than 40), it can be desirable to use a relatively larger amount of the poly(carbonate-siloxane). Conversely, where E is of a higher value (e.g., greater than 40), a relatively lower amount of the poly(carbonate-siloxane) can be used. A combination of a first and a second (or more) poly (carbonate-siloxane) can be used, wherein the average value of E of the first copolymer is less than the average value of E of the second copolymer.

The polysiloxane blocks may be provided by repeating structural units of formula (33):

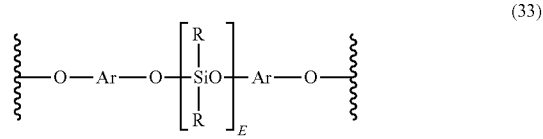

(33)

wherein E and R are as defined in formula (32), and each Ar is independently a substituted or unsubstituted $C_6$-$C_{30}$ arylene wherein the bonds are directly connected to an aromatic moiety. The Ar groups in formula (33) can be derived from a $C_6$-$C_{30}$ dihydroxyarylene compound, for example a dihydroxyarylene compound of formula (2), (4), or (8) above. Specific dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane.

Combinations comprising at least one of the foregoing dihydroxyarylene compounds can also be used.

Polycarbonates comprising units of formula (33) can be derived from the corresponding dihydroxy compound of formula (34):

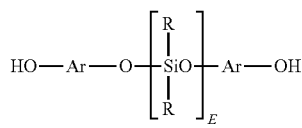
(34)

wherein Ar, R, and E are as described above. Compounds of formula (34) can be obtained by the reaction of a dihydroxyaromatic compound with, for example, an alpha, omega-bis-acetoxy-polydiorganosiloxane oligomer under phase transfer conditions. Compounds of formula (34) can also be obtained from the condensation product of a dihydroxyaromatic compound, with, for example, an alpha, omega bis-chloro-polydimethylsiloxane oligomer in the presence of an acid scavenger.

In a specific embodiment, where Ar of formula (34) is derived from resorcinol, the dihydroxy aromatic compound has formula (35):

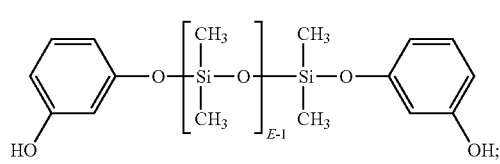
(35)

or, wherein Ar is derived from bisphenol-A, and the dihydroxy aromatic compound has formula (36):

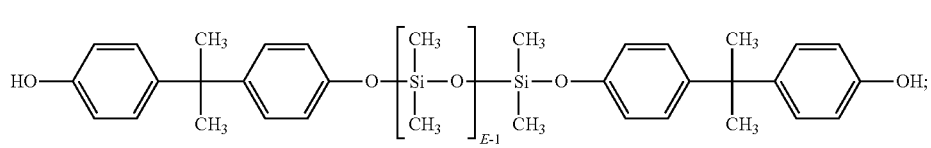
(36)

wherein E has an average value of between 20 and 75.

The polydiorganosiloxane blocks may have formula (37):

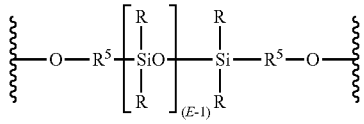
(37)

wherein R and E are as described in formula (32), and each $R^5$ is independently a divalent $C_1$-$C_{30}$ organic group such as a $C_1$-$C_{30}$ alkyl, $C_1$-$C_{30}$ aryl, or $C_1$-$C_{30}$ alkylaryl.

The polysiloxane blocks of formula (37) may be derived from the corresponding dihydroxy compound of formula (38):

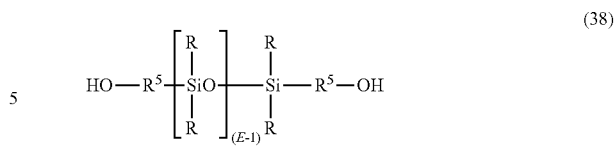
(38)

wherein R and E and $R^5$ are as described for formula (37).

In a specific embodiment, the polysiloxane blocks are of formula (39):

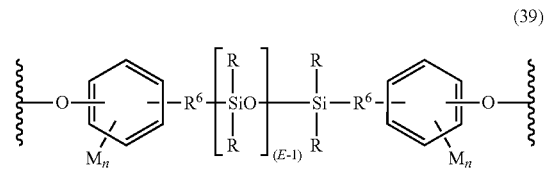
(39)

wherein R and E are as defined in formula (32), $R^6$ is a divalent $C_2$-$C_8$ aliphatic group, each M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and each n is independently 0, 1, 2, 3, or 4. In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, each R is methyl, each $R^6$ is a divalent $C_1$-$C_3$ aliphatic group, each M is methoxy, and each n is one.

Specific polysiloxane blocks are of formulas (39a)-(39c):

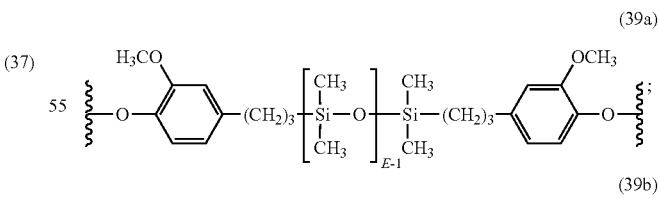
(39a)

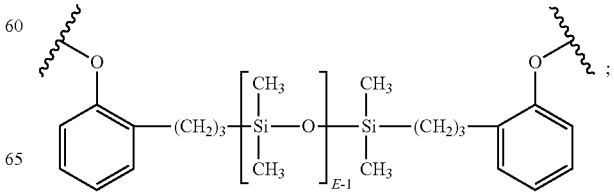
(39b)

-continued

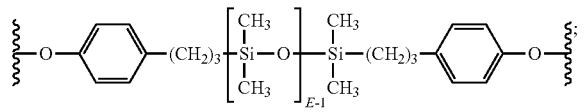
(39c)

or a combination comprising at least one of the foregoing can be used, wherein E has an average value of 2 to 200, 2 to 125, 5 to 125, 5 to 100, 5 to 50, 20 to 80, or 5 to 20. In a preferred embodiment, the polysiloxane blocks are of the formula (39a).

Polysiloxane blocks of formula (39) can be derived from the corresponding dihydroxy polysiloxane of formula (38):

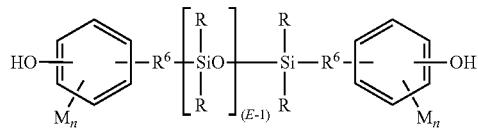
(40)

wherein each of R, E, M, $R^6$, and n are as described for formula (39). Such dihydroxy polysiloxanes can be made by affecting a platinum-catalyzed addition between a siloxane hydride and an aliphatically unsaturated monohydric phenol. The polysiloxane hydride may have formula (41):

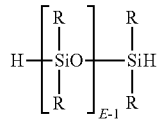
(41)

wherein R and E are as previously for formula (39). Exemplary aliphatically unsaturated monohydric phenols include, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The poly(carbonate-siloxane)s can then be manufactured, for example, by the synthetic procedure of European Patent Publication No. 0524731A1 of Hoover, page 5, Preparation 2.

Still other polysiloxane blocks are of formula (42):

wherein R, E, $R^6$, M, and n are as defined in formula (39), and G is a linking group, for example a group of the formula —C(=O)Ar$^1$C(=O)— wherein Ar$^1$ is a substituted or unsubstituted $C_6$-$C_{30}$ arylene, for example phenylene; a group of the formula —C(=O)NHAr$^2$NHC(=O)— wherein Ar$^2$ is a substituted or unsubstituted $C_6$-$C_{30}$ arylene or a group of the formula —Ar$^2$X$^a$Ar$^{2a}$— wherein each Ar$^{2a}$ is independently a substituted or unsubstituted $C_6$-$C_{12}$ arylene and X$^a$ is a single bond, —O—, —S—, —S(O)—, —S(O)$_2$—, —C(O)—, or a $C_1$-$C_{18}$ organic group bridging group connecting the two arylene groups, for example, a substituted or unsubstituted $C_1$-$C_2$ alkylidene of the formula —C(R$^c$)(R$^d$)— wherein R$^c$ and R$^d$ are each independently hydrogen, $C_1$-$C_{12}$ alkyl, $C_1$-$C_{12}$ cycloalkyl, $C_7$-$C_{12}$ arylalkyl, for example methylene, where the bridging group and the hydroxy substituent of each $C_6$ arylene group are disposed ortho, meta, or para (specifically para) to each other on the $C_6$ arylene group; or a group of the formula —P(=O)Ar$^3$— wherein Ar$^3$ is a substituted or unsubstituted $C_6$-$C_{30}$ arylene, for example phenylene.

Transparent poly(carbonate-siloxane)s may comprise carbonate units of formula (1) derived from bisphenol A, and polysiloxane units as described above, in particular polysiloxane units of formulas (39a), (39b), (39c), or a combination comprising at least one of the foregoing (specifically of formula 39a), wherein E has an average value of 4 to 50, 4 to 15, specifically 5 to 15, more specifically 6 to 15, and still more specifically 7 to 10. The transparent copolymers can comprise the siloxane units in an amount of 0.1 to 60 weight percent (wt %), 0.5 to 55 wt %, 0.5 to 45 wt %, 0.5 to 30 wt %, or 0.5 to 20 wt %, based on the total weight of the polycarbonate copolymer, with the proviso that the siloxane units are covalently bound to the polymer backbone of the polycarbonate copolymer. The transparent copolymers can be manufactured using one or both of the tube reactor processes described in U.S. Patent Application No. 2004/0039145A1 or the process described in U.S. Pat. No. 6,723,864 can be used to synthesize the poly(siloxane-carbonate)s.

The poly(carbonate-siloxane) can comprise 50 to 99 weight percent of carbonate units and 1 to 50 weight percent siloxane units. Within this range, the poly(carbonate-siloxane) can comprise 70 to 98 weight percent, more specifically 75 to 97 weight percent of carbonate units and 2 to 30 weight percent, more specifically 3 to 25 weight percent siloxane units.

In an embodiment, a blend is used, in particular a blend of a bisphenol A homopolycarbonate and a poly(carbonate-siloxane) block copolymer of bisphenol A blocks and eugenol capped polydimethylsilioxane blocks, of the formula (43):

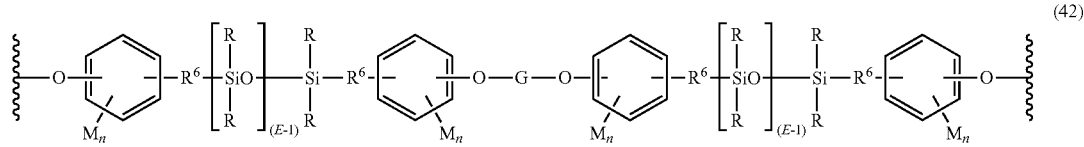
(42)

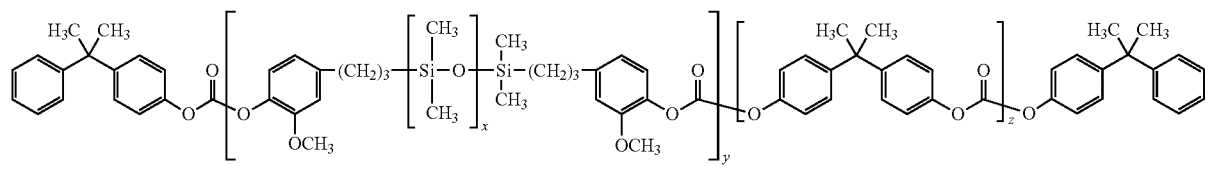

(43)

wherein x is 1 to 200, specifically 5 to 85, specifically 10 to 70, specifically 15 to 65, and more specifically 40 to 60; y is 1 to 500, or 10 to 200, and z is 1 to 1000, or 10 to 800. In an embodiment, x is 1 to 200, y is 1 to 90 and z is 1 to 600, and in another embodiment, x is 30 to 50, y is 10 to 30 and z is 45 to 600. The polysiloxane blocks may be randomly distributed or controlled distributed among the polycarbonate blocks.

In an embodiment, the poly(carbonate-siloxane) comprises 10 wt % or less, specifically 6 wt % or less, and more specifically 4 wt % or less, of the polysiloxane based on the total weight of the poly(carbonate-siloxane), and are generally optically transparent and are commercially available from SABIC Innovative Plastics. In another embodiment, the poly(carbonate-siloxane) comprises 10 wt % or more, specifically 12 wt % or more, and more specifically 14 wt % or more, of the poly(carbonate-siloxane), based on the total weight of the poly(carbonate-siloxane), are generally optically opaque and are commercially available from SABIC Innovative Plastics.

Poly(carbonate-siloxane) can have a Mw of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The poly(carbonate-siloxane) can have a melt volume flow rate, measured at 300° C./1.2 kg, of 1 to 50 cubic centimeters per 10 minutes (cc/10 min), specifically 2 to 30 cc/10 min. Mixtures of poly(carbonate-siloxane)s of different flow properties can be used to achieve the overall desired flow property.

The compositions may include one or more polyester-polycarbonate copolymers. The polyester-polycarbonate may comprise repeating ester units of formula (44):

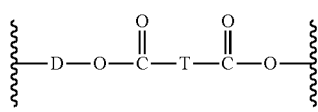

(44)

wherein O-D-O of formula (44) is a divalent group derived from a dihydroxy compound, and D may be, for example, one or more alkyl containing $C_6$-$C_{20}$ aromatic group(s), or one or more $C_6$-$C_{20}$ aromatic group(s), a $C_2$-$C_{10}$ alkylene group, a $C_6$-$C_{20}$ alicyclic group, a $C_6$-$C_{20}$ aromatic group or a polyoxyalkylene group in which the alkylene groups contain 2 to 6 carbon atoms, specifically 2, 3, or 4 carbon atoms. D may be a $C_2$-$C_{30}$ alkylene group having a straight chain, branched chain, or cyclic (including polycyclic) structure. O-D-O may be derived from a compound of formula (2), as described above. O-D-O may be derived from an aromatic dihydroxy compound of formula (4), as described above. O-D-O may be derived from an aromatic dihydroxy compound of formula (8), as described above.

The molar ratio of ester units to carbonate units in the polyester-polycarbonates may vary broadly, for example 1:99 to 99:1, specifically 10:90 to 90:10, more specifically 25:75 to 75:25, optionally expanded depending on the desired properties of the final composition.

T of formula (44) may be a divalent group derived from a dicarboxylic acid, and may be, for example, a $C_2$-$C_{10}$ alkylene group, a $C_6$-$C_{20}$ alicyclic group, a $C_6$-$C_{20}$ alkyl aromatic group, a $C_6$-$C_{20}$ aromatic group, or a $C_6$-$C_{36}$ divalent organic group derived from a dihydroxy compound or chemical equivalent thereof. T may be an aliphatic group, wherein the molar ratio of carbonate units to ester units of formula (44) in the poly(aliphatic ester)-polycarbonate copolymer is from 99:1 to 60:40; and 0.01 to 10 weight percent, based on the total weight of the polymer component, of a polymeric containing compound. T may be derived from a $C_6$-$C_{20}$ linear aliphatic alpha-omega ($\alpha$-$\omega$) dicarboxylic ester.

Diacids from which the T group in the ester unit of formula (44) is derived include aliphatic dicarboxylic acids having from 6 to 36 carbon atoms, optionally from 6 to 20 carbon atoms. The $C_6$-$C_{20}$ linear aliphatic alpha-omega ($\alpha$-$\omega$) dicarboxylic acids may be adipic acid, sebacic acid, 3,3-dimethyl adipic acid, 3,3,6-trimethyl sebacic acid, 3,3,5,5-tetramethyl sebacic acid, azelaic acid, dodecanedioic acid, dimer acids, cyclohexane dicarboxylic acids, dimethyl cyclohexane dicarboxylic acid, norbornane dicarboxylic acids, adamantane dicarboxylic acids, cyclohexene dicarboxylic acids, or $C_{14}$, $C_{18}$ and $C_{20}$ diacids.

The ester units of the polyester-polycarbonates of formula (44) can be further described by formula (45), wherein T is $(CH_2)_m$, where m is 4 to 40.

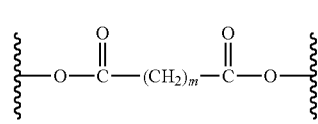

(45)

Saturated aliphatic alpha-omega dicarboxylic acids may be adipic acid, sebacic or dodecanedioic acid. Sebacic acid is a dicarboxylic acid having the following formula (46):

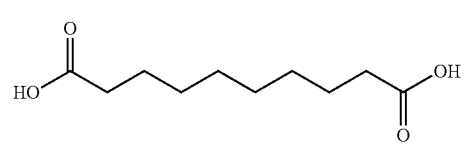

(46)

Sebacic acid has a molecular mass of 202.25 Daltons, a density of 1.209 g/cm³ (25° C.), and a melting point of 294.4° C. at 100 mmHg. Sebacic acid is extracted from castor bean oil found in naturally occurring castor beans.

Other examples of aromatic dicarboxylic acids that may be used to prepare the polyester units include isophthalic, terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98.

D of the repeating units of formula (44) may also be a $C_2$-$C_6$ alkylene group and T may be p-phenylene, m-phenylene, naphthalene, a divalent cycloaliphatic group, or a combination thereof. This class of polyester includes the poly(alkylene terephthalates).

Mixtures of the diacids can also be employed. It should be noted that although referred to as diacids, any ester precursor could be employed such as acid halides, specifically acid chlorides, and diaromatic esters of the diacid such as diphenyl, for example the diphenyl ester of sebacic acid. With reference to the diacid carbon atom number earlier mentioned, this does not include any carbon atoms which may be included in the ester precursor portion, for example diphenyl. It may be desirable that at least four, five or six carbon bonds separate the acid groups. This may reduce the formation of undesirable and unwanted cyclic species.

The polyester unit of a polyester-polycarbonate may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol-A. In another specific embodiment, the polycarbonate units may be derived from resorcinol and bisphenol-A in a molar ratio of resorcinol carbonate units to bisphenol-A carbonate units of 1:99 to 99:1.

In certain embodiments, the polyester-polycarbonate is a copolymer of formula (47):

%, still more specifically 50 to 95 wt %, each based on the total weight of units x+y. The weight ratio of terephthalic acid to isophthalic acid can be in the range of from 5:95 to 95:5. Polyester-polycarbonate (47) comprising 35 to 45 wt % of carbonate units and 55 to 65 wt % of ester units, wherein the ester units have a molar ratio of isophthalate to terephthalate of 45:55 to 55:45 can be referred to as PCE; and copolymers comprising 15 to 25 wt % of carbonate units and 75 to 85 wt % of ester units having a molar ratio of isophthalate to terephthalate from 98:2 to 88:12 can be referred to as PPC. In these embodiments the PCE or PPC can be derived from reaction of bisphenol-A and phosgene with iso- and terephthaloyl chloride, and can have an intrinsic viscosity of 0.5 to 0.65 deciliters per gram (measured in methylene chloride at a temperature of 25° C.).

Useful polyesters may include aromatic polyesters, poly (alkylene esters) including poly(alkylene arylates), and poly (cycloalkylene diesters). Aromatic polyesters may have a polyester structure according to formula (44), wherein D and T are each aromatic groups as described hereinabove. Useful aromatic polyesters may include, for example, poly (isophthalate-terephthalate-resorcinol) esters, poly (isophthalate-terephthalate-bisphenol-A) esters, poly [(isophthalate-terephthalate-resorcinol) ester-co- (isophthalate-terephthalate-bisphenol-A)] ester, or a combination comprising at least one of these.

End capping agents can be incorporated into the polycarbonates. Exemplary chain-stoppers include certain monophenolic compounds (i.e., phenyl compounds having a single free hydroxy group), monocarboxylic acid chlorides, monocarboxylic acids, and/or monochloroformates. Phenolic chain-stoppers are exemplified by phenol and $C_1$-$C_{22}$ alkyl-substituted phenols such as p-cumyl-phenol, resorcinol monobenzoate, and p-tertiary-butylphenol, cresol, and monoethers of diphenols, such as p-methoxyphenol. Exemplary chain-stoppers also include cyanophenols, such as for example, 4-cyanophenol, 3-cyanophenol, 2-cyanophenol, and polycyanophenols. Alkyl-substituted phenols with branched chain alkyl substituents having 8 to 9 carbon atoms can be specifically be used.

The polycarbonates may include branching groups, provided that such branching does not significantly adversely affect desired properties of the polycarbonate. Branched polycarbonate blocks can be prepared by adding a branching agent during polymerization. These branching agents (47)

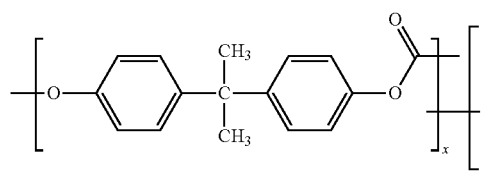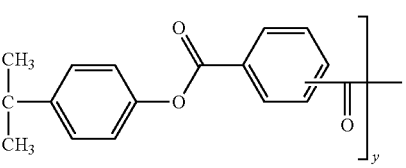

wherein the polyester-polycarbonate includes bisphenol A carbonate blocks, and polyester blocks made of a copolymer of bisphenol A with isothalate, terephthalate or a combination of isophthalate and terephthalate. Further in the polyester-polycarbonate (47), x and y represent the respective parts by weight of the aromatic carbonate units and the aromatic ester units based on 100 parts total weight of the copolymer. Specifically, x, the carbonate content, is from more than zero to 80 wt %, from 5 to 70 wt %, still more specifically from 5 to 50 wt %, and y, the aromatic ester content, is 20 to less than 100 wt %, specifically 30 to 95 wt include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 6.0 wt %. Mixtures comprising linear polycarbonates and branched polycarbonates can be used.

The polycarbonates (e.g., homopolycarbonates, copolycarbonates, polycarbonate polysiloxane copolymers, polyester-polycarbonates, isosorbide-containing polycarbonates) may be manufactured by processes such as interfacial polymerization and melt polymerization. High Tg copolycarbonates are generally manufactured using interfacial polymerization.

Polycarbonates produced by interfacial polymerization may have an aryl hydroxy end-group content of 150 ppm or less, 100 ppm or less, or 50 ppm or less. Polycarbonates produced by melt polymerization may have an aryl hydroxy end-group content of greater than or equal to 350 ppm, greater than or equal to 400 ppm, greater than or equal to 450 ppm, greater than or equal to 500 ppm, greater than or equal to 550 ppm, greater than or equal to 600 ppm, greater than or equal to 650 ppm, greater than or equal to 700 ppm, greater than or equal to 750 ppm, greater than or equal to 800 ppm, or greater than or equal to 850 ppm.

The compositions may include one or more polyesters. The polyesters may be homopolymers or copolyesters. The polyesters may be semi-crystalline materials. The polyesters may be linear or branched thermoplastic polyesters having repeating structural units of Formula (55),

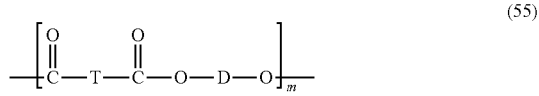

(55)

wherein each T is independently a divalent aliphatic radical, a divalent alicyclic radical, a divalent aromatic radical, or a polyoxyalkylene radical, or a combination thereof; each D is independently a divalent aliphatic radical, a divalent alicyclic radical, a divalent aromatic radical, or a combination thereof; and m is an integer selected from 25 to 1000. In certain embodiments, the T and D radicals, at each occurrence, are each independently selected from a $C_2$-$C_{12}$ alkylene radical, a $C_6$-$C_{12}$ alicyclic radical, a $C_6$-$C_{20}$ aromatic radical, and a polyoxyalkylene radical in which the alkylene groups of the polyoxyalkylene contain 2-6 and most often 2 or 4 carbon atoms. In certain embodiments, T at each occurrence is independently selected from phenyl and naphthyl, and D at each occurrence is independently selected from ethylene, propylene, butylene, and dimethylene cyclohexene. The polyesters may have any end group configuration. The end groups may be, for example, hydroxy, carboxylic acid, or ester end groups. In some instances, the polyester may have a carboxylic acid (COOH) end group content of from 15 to 40 meq/Kg.

The polyesters can have an intrinsic viscosity, as determined in chloroform at 25° C., of 0.05 to 1.5 deciliters per gram (dl/gm), specifically 0.3 to 1.5 dl/gm, and more specifically 0.45 to 1.2 dl/gm. The polyesters can have a Mw of 10,000 to 200,000, specifically 20,000 to 100,000 as measured by GPC.

In certain embodiments, the polyesters may be post-consumer (recycled) polyesters, such as recycled PET or similar recycled resins. Such recycled resins are commercially available from a variety of sources such as bottles (e.g., post-consumer PET bottles with a diethylene glycol (DEG) content of 0.5 to 2.5 mole percent and 10 to 500 ppm of a metal selected from the group consisting of Ti, Sb, Sn, Zn, Ge, Zr, Co or mixtures thereof), films, and fibers.

In certain embodiments, the polyester may have repeating units of formula (56):

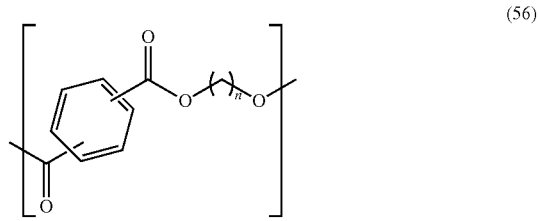

(56)

wherein n at each occurrence is independently selected from 1 to 10. In certain embodiments, the phenylene ring is derived from isophthalic acid, terephthalic acid, or a combination thereof.

Exemplary polyesters include, but are not limited to, poly(ethylene terephthalate) ("PET"); poly(1,4-butylene terephthalate) ("PBT"); poly(ethylene naphthanoate) ("PEN"); poly(butylene naphthanoate) ("PBN"); poly(propylene terephthalate) ("PPT"); poly(1,4-cyclohexylenedimethylene) terephthalate ("PCT"); poly(1,4-cyclohexylenedimethylene 1,4-cyclohexandicarboxylate) ("PCCD"); poly(cyclohexylenedimethylene terephthalate) glycol ("PCTG"); poly(ethylene terephthalate) glycol ("PETG"); and poly(1,4-cyclohexylenedimethylene terephthalate-co-isophthalate) ("PCTA"). In certain embodiments, the polyester may be a semi-crystalline material based on polybutylene terephthalate (PBT) and/or polyethylene terephthalate (PET) polymers.

In certain embodiments, the polyester is poly(ethylene terephthalate) ("PET"). The PET may have an intrinsic viscosity (IV) of greater than or equal to 0.55 dl/g. The PET may have an intrinsic viscosity (IV) of greater than or equal to 0.75 dl/g. The PET may have an intrinsic viscosity (IV) of 0.535 dl/g, and a carboxylic acid (COOH) end group content of 20 meq/Kg COOH. The PET resin may have a diethylene glycol (DEG) content of 0.8%. The PET may include repeating units of formula (57):

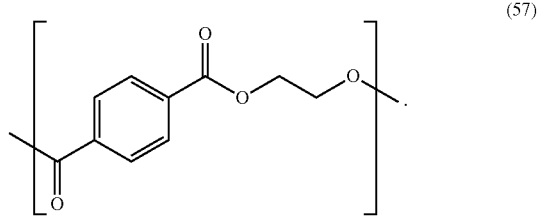

(57)

In certain embodiments, the polyester is poly(1,4-butylene terephthalate) ("PBT"). The PBT may have an intrinsic viscosity (IV) of 1.1 dl/g, and a carboxylic acid (COOH) end group content of 38 meq/Kg COOH, and may be referred to herein as PBT 315, which is sold under the tradename VALOX 315 from SABIC Innovative Plastics. PBT 315 may have a Mw of 115,000 g/mol [±1,000 g/mol], measured using polystyrene standards. The PBT may have an intrinsic viscosity (IV) of 0.66 dl/g, and a carboxylic acid (COOH) end group content of 17 meq/Kg COOH, and may be referred to herein as PBT 195, which is sold under the tradename VALOX 195 from SABIC Innovative Plastics. The PBT 195 may have a Mw of 66,000 g/mol [±1,000 g/mol], measured using polystyrene standards. The PBT may include repeating units of formula (58):

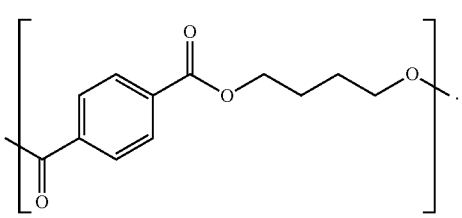

(58)

In certain embodiments, the polyester is poly(1,4-cyclohexylenedimethylene 1,4-cyclohexandicarboxylate) ("PCCD"), also referred to as poly(1,4-cyclohexane-dimethanol-1,4-dicarboxylate). The PCCD may have a Mw of 41,000 to 60,000 and a refractive index of 1.506 to 1.508. The PCCD may have a Mw of 80,000 g/mol. The PCCD may have repeating units of formula (59):

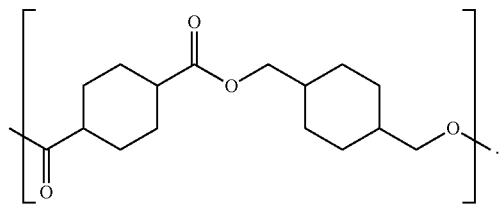

(59)

In certain embodiments, the polyester is poly(cyclohexylenedimethylene terephthalate) glycol ("PCTG"), or poly(ethylene terephthalate) glycol ("PETG"), both of which may be referred to as poly(ethylene terephthalate)-co-(1,4-cyclohexanedimethylene terephthalate). PCTG and PETG are copolyesters derived from terephthalic acid and the diols of ethylene glycol and cyclohexanedimethanol. PCTG and PETG copolyesters may have the formula (60);

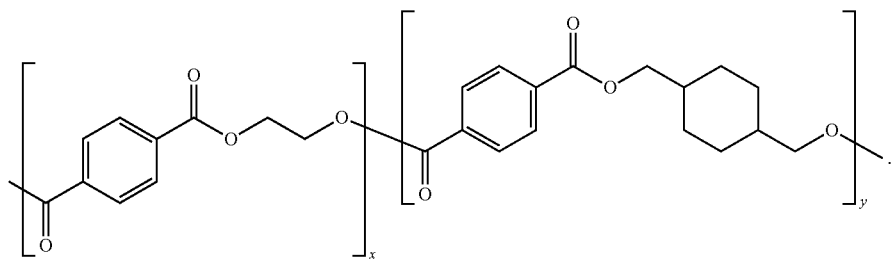

(60)

The diol content of PCTG may be greater than 50 mol % cyclohexanedimethanol; and the diol content of PETG may be less than 50 mol % cyclohexanedimethanol. In certain embodiments, PCTG may have 80 mol % cyclohexanedimethanol diol content and 20 mol % ethylene glycol diol content. The PCTG may have a Mw of 70,000 g/mol [±1,000 g/mol], measured using polystyrene standards. The PETG may have a Mw of 70,000 g/mol [±1,000 g/mol], measured using polystyrene standards.

In certain embodiments, the polyester is poly(1,4-cyclohexylenedimethylene terephthalate-co-isophthalate) ("PCTA"). PCTA copolyesters may have the formula (61):

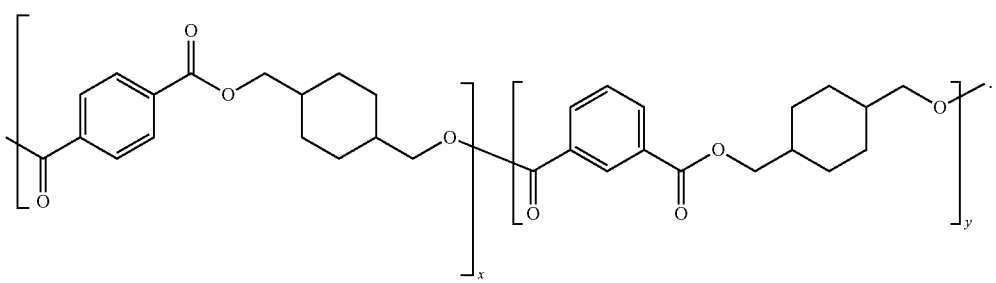

(61)

Dicarboxylic acids (e.g., aliphatic dicarboxylic acids, alicyclic dicarboxylic acids, aromatic dicarboxylic acids, and combinations thereof) and diols (e.g., aliphatic diols, alicyclic diols, aromatic diols, and combinations thereof) can be used to prepare the polyesters. Chemical equivalents of dicarboxylic acids (e.g., anhydrides, acid chlorides, acid bromides, carboxylate salts, or esters) and chemical equivalents of diols (e.g., esters, specifically $C_1$-$C_8$ esters such as acetate esters) may also be used to prepare the polyesters.

Aromatic dicarboxylic acids that can be used to prepare the polyesters include, but are not limited to, isophthalic acid, terephthalic acid, 1,2-di(p-carboxyphenyl)ethane, 4,4'-dicarboxydiphenyl ether, 4,4'-bisbenzoic acid, and the like, and 1,4- or 1,5-naphthalene dicarboxylic acids and the like. A combination of isophthalic acid and terephthalic acid can be used. The weight ratio of isophthalic acid to terephthalic acid may be, for example, 91:9 to 2:98, or 25:75 to 2:98. Dicarboxylic acids containing fused rings that can be used to prepare the polyesters include, but are not limited to, 1,4-, 1,5-, and 2,6-naphthalenedicarboxylic acids. Exemplary cycloaliphatic dicarboxylic acids include, but are not limited to, decahydronaphthalene dicarboxylic acids, norbornene dicarboxylic acids, bicyclooctane dicarboxylic acids, and 1,4-cyclohexanedicarboxylic acids.

Aliphatic diols that can be used to prepare the polyesters include, but are not limited to, 1,2-ethylene glycol, 1,2- and 1,3-propylene glycol, 2,2-dimethyl-1,3-propane diol, 2-ethyl-2-methyl-1,3-propane diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol and its cis- and trans-isomers, triethylene glycol, 1,10-decane diol, and the like, and combinations thereof. The diol may be ethylene and/or 1,4-butylene diol. The diol may be 1,4-butylene diol. The diol may be ethylene glycol with small amounts (e.g., 0.5 to 5.0 percent) of diethylene glycol. Aromatic diols that can be used to prepare the polyesters include, but are not limited to, resorcinol, hydroquinone, pyrocatechol, 1,5-naphthalene diol, 2,6-naphthalene diol, 1,4-naphthalene diol, 4,4'-dihydroxybiphenyl, bis(4-hydroxyphenyl)ether, bis(4-hydroxyphenyl)sulfone, and the like, and combinations thereof.

The polyesters can be obtained by interfacial polymerization or melt-process condensation, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

The compositions may include one or more hydroxyl-functionalized flow promoters.

The flow promoter may be an alkylene glycol. Suitable alkylene glycols include, but are not limited to, ethylene glycol, propylene glycol, and poly(alkylene glycol), such as polyethylene glycol, polypropylene glycol, poly(1,4-butylene) glycol, block or random poly (ethylene glycol)-co-(propylene glycol) copolymers, and combinations thereof.

The poly(alkylene glycol) may have formula (62),

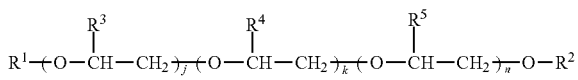

(62)

wherein $R^1$ and $R^2$ independently represent —H, —$C_1$-$C_{22}$ alkyl, —$COC_1$-$C_{21}$ alkyl, unsubstituted —$C_6$-$C_{14}$ aryl (e.g., phenyl, naphthyl, and anthracenyl), alkyl-substituted —$C_6$-$C_{14}$ aryl, or -tetrahydrofurfuryl; $R^3$, $R^4$, and $R^5$ each independently represent —H or —$CH_3$; and j, k, and n each independently represent an integer from 2 to 200.

The poly(alkylene glycol) may have a molecular weight (Mn) of 1,500 to 2,500 g/mol, or 2,000 g/mol [*1,000 g/mol]. The poly(alkylene glycol) can have a number average molecular weight of greater than or equal to 1,000 g/mole, greater than or equal to 1,500 g/mole, greater than or equal to 2,000 g/mole, greater than or equal to 2,500 g/mole, greater than or equal to 3,000 g/mole, greater than or equal to 3,500 g/mole, greater than or equal to 4,000 g/mole, greater than or equal to 4,500 g/mole, greater than or equal to 5,000 g/mole, greater than or equal to 5,500 g/mole, greater than or equal to 6,000 g/mole, greater than or equal to 6,500 g/mole, greater than or equal to 7,000 g/mole, greater than or equal to 7,500 g/mole, greater than or equal to 8,000 g/mole, greater than or equal to 8,500 g/mole, greater than or equal to 9,000 g/mole, greater than or equal to 9,500 g/mole, or greater than or equal to 10,000 g/mole.

The flow promoter may be a polyhydric alcohol compound of formula (63):

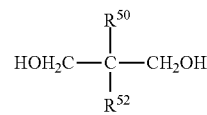

(63)

wherein $R^{50}$ is $NH_2$ or $CH_2OH$; and $R^{52}$ is a $C_1$-$C_{20}$ alkyl group, a $C_3$-$C_{20}$ cycloalkyl group, a $C_6$-$C_{20}$ aryl group, a $C_1$-$C_{20}$ alkoxy group, or a $C_6$-$C_{20}$ aryloxy group, wherein said alkyl, cycloalkyl, aryl, alkoxy, and aryloxy groups are each independently unsubstituted or substituted with one or more hydroxy groups. In certain embodiments, formula (63) includes at least three hydroxymethyl groups, or at least two hydroxymethyl groups and one amino group.

Exemplary compounds of formula (63) include, but are not limited to, 1,1-dimethylol-1-aminoethane (DAE), 1,1-dimethylol-1-aminopropane (DAP), tris(hydroxymethyl)aminomethane (THAM), 1,1,1-trimethylolpropane (TMP), 1,1,1-trimethylolethane, pentaerythritol (PETOL), dipentaerythritol, tripentaerythritol, 1,1,1-trimethylol pentane, or any combination thereof.

In certain embodiments, the hydroxyl-functionalized flow promoter is ethylene glycol, propylene glycol, polyethylene glycol, polypropylene glycol, poly(1,4-butylene) glycol, block or random poly (ethylene glycol)-co-(propylene glycol) copolymer, tri(hydroxymethyl)aminomethan ("THAM"), sorbitol, sucrose, fructose, glucose, glycerol monostearate ("GMS"), glycerol tristearate ("GTS"), or a combination thereof.

In certain embodiments, the hydroxyl-functionalized flow promoter is a hydroxyl-functionalized aromatic compound. The hydroxyl-functionalized aromatic compound may be 1,4-dihydroxybenzene, 2,2-bis(4-hydroxyphenyl)propane, 1,1,1-trishydroxy phenyl ethane (THPE), bisphenol acetophenone (BisAP), 1,1-bis(4-hydroxy-3-methylphenyl)cyclohexane (DMBPC), or 4,4'-(3,3,5-trimethylcyclohexane-1,1-diyl)diphenol (BPI), BPA, paracumyl phenol (PCP), 3,3-bis(4-hydroxyphenyl)-2-phenylisoindolin-1-one (PPPBP), or a hydroxyl functionalized oligo or poly-aryl moiety.

In certain embodiments, the hydroxyl-functionalized flow promoter is a polycarbonate (e.g., a polycarbonate produced by melt polymerization) having an aryl hydroxy end-group content of greater than or equal to 350 ppm, greater than or equal to 400 ppm, greater than or equal to 450 ppm, greater than or equal to 500 ppm, greater than or equal to 550 ppm, greater than or equal to 600 ppm, greater than or equal to 650 ppm, greater than or equal to 700 ppm, greater than or equal to 750 ppm, greater than or equal to 800 ppm, or greater than or equal to 850 ppm.

In certain embodiments, the hydroxyl-functionalized flow promoter is polyethylene glycol (PEG) having a Mw of 3,350 g/mol [$\pm$1,000 g/mol]; PEG having a Mw of 10,000 g/mol [$\pm$1,000 g/mol]; PEG having a Mw of 35,000 g/mol [$\pm$1,000 g/mol]; or polypropylene glycol (PPG) having a Mw of 2,000 g/mol [$\pm$1,000 g/mol].

The hydroxyl-functionalized flow promoters can be present in the compositions in an amount of 0.01 to 2% by weight, and preferably 0.05 to 1% based on total weight of the composition.

The compositions may comprise additional components, such as one or more additives. Suitable additives include, but are not limited to impact modifiers, UV stabilizers, colorants, flame retardants, heat stabilizers, plasticizers, lubricants, mold release agents, fillers, reinforcing agents, antioxidant agents, antistatic agents, blowing agents, antidrip agents, and radiation stabilizers.

The blend compositions may have a combination of desired properties.

Melt viscosity (MV) of the blend compositions may be determined using ISO 11443 or ASTM D3835. Melt viscosity is a measurement of the rheological characteristics of a composition at temperatures and shear conditions common to processing equipment. A lower value for melt viscosity indicates that the composition flows easier. Melt viscosity may be determined at different temperatures (e.g., 260° C., 280° C., 300° C., 316° C., or 330° C.) and different shear rates (e.g., 1500 or 5000 second$^{-1}$). Melt viscosities are typically determined by pressing a molten composition through a die while measuring the pressure drop over the complete or part of the die. Melt viscosities may be measured by, for example, a Kayeness Capillary viscometer (e.g., with a capillary length:diameter ratio of 20:1, a capillary diameter of 1.0 millimeter, a capillary entrance angle of 180 degrees, and a dwell time of 4 minutes). Melt viscosity may be reported in Pascal-seconds and the shear rate may be reported in reciprocal seconds. A melt viscosity measured at a shear rate of 5000 s$^{-1}$ may be referred to as a high shear melt viscosity value.

The blend compositions may have a melt viscosity of 50 MPa to 400 MPa, 50 MPa to 375 MPa, 50 MPa to 350 MPa, 50 MPa to 325 MPa, 50 MPa to 300 MPa, 50 MPa to 275 MPa, 50 MPa to 250 MPa, 50 MPa to 225 MPa, 50 MPa to 200 MPa, 50 MPa to 175 MPa, 50 MPa to 150 MPa, 100 MPa to 375 MPa, 100 MPa to 350 MPa, 100 MPa to 325 MPa, 100 MPa to 300 MPa, 100 MPa to 275 MPa, 100 MPa to 250 MPa, 100 MPa to 225 MPa, or 100 MPa to 200 MPa, measured in accordance with ISO 11443 at 300° C. at a shear rate of 1500 s$^{-1}$, or measured in accordance with ISO 11443 at 316° C. at a shear rate of 5000 s$^{-1}$.

Melt volume flow rate (often abbreviated MVR) of the blend compositions may be determined using ISO 1133 or ASTM D1238. MVR measures the volume of a composition extruded through an orifice at a prescribed temperature and load over a prescribed time period. The higher the MVR value of a polymer composition at a specific temperature, the greater the flow of that composition at that specific temperature.

MVR may be measured, for example, by packing a small amount of polymer composition into an extruder barrel of an extruder. The composition may be preheated for a specified amount of time at a particular temperature (the test temperature is usually set at or slightly above the melting region of the material being characterized). After preheating the composition, a particular weight (e.g., a 2.16 kg weight) may be introduced to a piston, which acts as the medium that causes extrusion of the molten polymer composition. The weight exerts a force on the piston and thereby the molten polymer composition, and the molten composition flows through the dye wherein the displacement of the molten composition is measured in cubic centimeters per over time such as 10 minutes (cm$^3$/10 min).

The compositions may have a MVR of 2 to 300 cm$^3$/10 min, 2 to 200 cm$^3$/10 min, 2 to 100 cm$^3$/10 min, 10 to 300 cm$^3$/10 min, 20 to 300 cm$^3$/10 min, 30 to 300 cm$^3$/10 min, 40 to 300 cm$^3$/10 min, 50 to 300 cm$^3$/10 min, 60 to 300 cm$^3$/10 min, 70 to 300 cm$^3$/10 min, 80 to 300 cm$^3$/10 min, 90 to 300 cm$^3$/10 min, 100 to 300 cm$^3$/10 min, 50 to 200 cm$^3$/10 min, 75 to 175 cm$^3$/10 min, or 100 to 150 cm$^3$/10 min, using the ISO 1133 method, 2.16 kg load, 330° C. temperature, 360 second dwell.

Melt flow rate (often abbreviated MFR) of the blend compositions may be determined using ISO 1133 or ASTM D1238. MFR measures the mass of a composition extruded through an orifice at a prescribed temperature and load over a prescribed time period. The higher the MFR value of a polymer composition at a specific temperature, the greater the flow of that composition at that specific temperature.

The compositions may have a MFR of 2 to 500 g/10 min, 2 to 300 g/10 min, 2 to 200 g/10 min, 2 to 100 g/10 min, 10 to 500 g/10 min, 20 to 500 g/10 min, 30 to 500 g/10 min, 40 to 500 g/10 min, 50 to 500 g/10 min, 60 to 500 g/10 min, 70 to 500 g/10 min, 80 to 500 g/10 min, 90 to 500 g/10 min, 100 to 500 g/10 min, 50 to 300 g/10 min, 75 to 250 g/10 min, or 100 to 200 g/10 min, using the ISO 1133 method, 2.16 kg load, 330° C. temperature, 360 second dwell.

Glass transition temperature (Tg) of the blended compositions may be determined using differential scanning calorimetry (DSC), for example, with a heating rate of 10° C./minute and using the second heating curve for Tg determination.

The compositions may have glass transition temperatures ranging from 120° C. to 230° C., 140° C. to 185° C., 145° C. to 180° C., 150° C. to 175° C., 155° C. to 170° C., or 160° C. to 165° C. The compositions may have a glass transition temperature of 150° C., 151° C., 152° C., 153° C., 154° C., 155° C., 156° C., 157° C., 158° C., 159° C., 160° C., 161° C., 162° C., 163° C., 164° C., 165° C., 166° C., 167° C., 168° C., 169° C., 170° C., 171° C., 172° C., 173° C., 174° C., or 175° C.

Heat deflection temperature or heat distortion temperature (often abbreviated HDT) of the blended compositions may be determined according to ISO 75 or ASTM D648. HDT is a measure of heat resistance and is an indicator of the ability of a material to withstand deformation from heat over time. A higher HDT value indicates better heat resistance. Measurements may be performed on molded ISO bars (80×10×4 mm) preconditioned at 23° C. and 50% relative humidity for 48 hrs. The heating medium of the HDT equipment may be mineral oil. Measurements may be performed in duplicate and the average value reported.

The compositions may have heat deflection temperatures ranging from 120° C. to 230° C., 140° C. to 185° C., 145° C. to 180° C., 150° C. to 175° C., 155° C. to 170° C., or 160° C. to 165° C., measured at 0.45 MPa stress or 1.8 MPa stress in accordance with ISO 75. The compositions may have a heat deflection temperature of 150° C., 151° C., 152° C., 153° C., 154° C., 155° C., 156° C., 157° C., 158° C., 159° C., 160° C., 161° C., 162° C., 163° C., 164° C., 165° C., 166° C., 167° C., 168° C., 169° C., 170° C., 171° C., 172° C., 173° C., 174° C., or 175° C., measured at 0.45 MPa stress or 1.8 MPa stress in accordance with ISO 75.

Vicat softening temperature may be determined according to ISO 306. Vicat softening temperature is a measure of the temperature at which a thermoplastic material starts to soften rapidly. Measurements may be performed using a heating rate of 120° C./hour and a force of 50 Newtons (method B120). Test specimens of 10×10×4 mm may be cut from molded 80×10×4 mm ISO impact bars. Each test may be performed in duplicate and the average of the two results reported.

The compositions may have Vicat B120 softening temperatures ranging from 120° C. to 230° C., 140° C. to 185° C., 145° C. to 180° C., 150° C. to 175° C., 155° C. to 170° C., or 160° C. to 165° C., measured in accordance with ISO 306. The compositions may have a Vicat B120 softening temperature of 150° C., 151° C., 152° C., 153° C., 154° C., 155° C., 156° C., 157° C., 158° C., 159° C., 160° C., 161° C., 162° C., 163° C., 164° C., 165° C., 166° C., 167° C., 168° C., 169° C., 170° C., 171° C., 172° C., 173° C., 174° C., or 175° C., measured in accordance with ISO 306.

Multiaxial impact testing (MAI) may be performed according to ISO 6603 or ASTM D3763. This procedure provides information on how a material behaves under multiaxial deformation conditions. The multiaxial impact value indicates the amount of energy the material absorbs during the test; a higher value generally indicates a better result. Impact properties that may be reported include Energy to Maximum Load, Energy to Failure, and Average Total Energy, all expressed in units of Joules. Ductility of tested parts may be expressed in percent (% D) based on whether the part fractured in a brittle or ductile manner.

Multiaxial impact may be measured using injection molded plaques (e.g., disks 3.2 mm thick and 10 centimeters in diameter). The plaques may be prepared using standard molding conditions or abusive molding conditions. Standard molding conditions may refer to a barrel temperature of 580° F. and a residence time of 35 seconds. Abusive molding conditions may refer to a barrel temperature of 580-620° F. and a residence time of 120 seconds. Abusive molding conditions may refer to conditions where the composition dwells in the molder barrel for an extended period of time and/or under elevated molding temperatures that may cause thermal degradation of one or more polymers in the composition. An apparatus, such as a Dynatup, may be used to evaluate multiaxial impact, and may have a tup of 10 mm, 12.5 mm, or 20 mm. The impact velocity may be 4.4 m/s. Measurements may be conducted at various temperatures (e.g., 23° C., 0° C., −30° C.).

The blend compositions may have an Energy to Maximum Load of 10 J to 250 J, 50 J to 200 J, or 100 J to 150 J, at 23° C., 0° C., or −30° C., molded under standard molding conditions.

The blend compositions may have an Energy to Maximum Load of 10 J to 250 J, 50 J to 200 J, or 100 J to 150 J, at 23° C., 0° C., or −30° C., molded under abusive molding conditions.

The blend compositions may have an Energy to Failure of 10 J to 250 J, 50 J to 200 J, or 100 J to 150 J, at 23° C., 0° C., or −30° C., molded under standard molding conditions.

The blend compositions may have an Energy to Failure of 10 J to 250 J, 50 J to 200 J, or 100 J to 150 J, at 23° C., 0° C., or −30° C., molded under abusive molding conditions.

The blend compositions may have an Average Total Energy of 10 J to 250 J, 50 J to 200 J, or 100 J to 150 J, at 23° C., 0° C., or −30° C., molded under standard molding conditions.

The blend compositions may have an Average Total Energy of 10 J to 250 J, 50 J to 200 J, or 100 J to 150 J, at 23° C., 0° C., or −30° C., molded under abusive molding conditions.

The blend compositions may possess a ductility of greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a notched izod impact test at −20° C., −15° C., −10° C., 0° C., 5° C., 10° C., 15° C., 20° C., 23° C., 25° C., 30° C., or 35° C. at a thickness of 3.2 mm according to ASTM D3763.

The blend compositions may have a notched izod impact (NII). A higher NII value indicates better impact strength. The polycarbonate compositions may have a notched izod impact strength (NII) of greater than or equal to 5 kJ/m$^2$, greater than or equal to 10 kJ/m$^2$, greater than or equal to 15 kJ/m$^2$, greater than or equal to 20 kJ/m$^2$, greater than or equal to 25 kJ/m$^2$, greater than or equal to 30 kJ/m$^2$, greater than or equal to 35 kJ/m$^2$, greater than or equal to 40 kJ/m$^2$, greater than or equal to 45 kJ/m$^2$, greater than or equal to 50 kJ/m$^2$, greater than or equal to 55 kJ/m$^2$, or greater than or equal to 60 kJ/m$^2$, measured at 23° C., 0° C., or −30° C. according to ISO 180.

Metallization may be performed on molded parts (e.g., 1.5 mm or 3 mm thick) using a physical vapor deposition (PVD) process. This process deposits a 100-150 nm thick aluminum layer onto one side of the molded part under vacuum, followed by a protective plasma-deposited siloxane hardcoat of 50 nm.

To determine haze onset temperatures, three metallized parts may placed in a calibrated air convection oven for 1.5 hrs. If no haze is observed, the oven temperature may be increased by 2° C. and the parts replaced with three fresh parts to avoid artifacts of in-situ annealing. Oven temperatures at which metallized parts are hazed may be recorded as haze onset temperatures. The parts used in the haze onset measurements may be dynatup parts (0.125" thickness) vacuum-metallized on one side (~80 nm thickness aluminum coating). The parts may be conditioned for the experiments by immediately placing the freshly metallized parts in sealed bags, and conditioned at 25° C./50% relative humidity (RH) for 5 and 10 days prior to haze onset tests, while some parts may be kept unconditioned.

A metallized 1.5 mm thick or 3 mm thick sample (e.g., plaque) of the blend composition may have a haze onset temperature of greater than or equal to 130° C., greater than or equal to 135° C., greater than or equal to 140° C., greater than or equal to 145° C., greater than or equal to 150° C., greater than or equal to 155° C., greater than or equal to 160° C., greater than or equal to 165° C., greater than or equal to 170° C., or greater than or equal to 175° C.

Adhesion of a metal layer to a molded article comprising the blend compositions can be evaluated using the cross-hatch adhesion test method (ASTM 3359/ISO 2409). A GT0 rating is considered the best. To conduct the test, a lattice pattern of scratches may be scratched onto a metallized plaque by first making 6 parallel cuts with a cutting tool, and thereafter making another six cuts overlapping the original cuts at a 90 degree angle. These cuts result in a cross cut area of 25 squares being obtained. All loose material may then be removed with a brush. The lattice pattern may then be covered with tape (Tesa 4651). The tape may be removed quickly. The plaque is then ready for evaluation. The cross-cut area may be evaluated and classified from GT0 to GT5 (excellent to poor).

A metallized sample of the blend composition may pass a cross-hatch adhesion test (ASTM D 3359, ISO 2409) with a GT0 metal adhesion rating. A metallized sample of the blend composition may pass a cross-hatch adhesion test (ASTM D 3359, ISO 2409) with a GT1 metal adhesion rating.

A metallized sample of the blend composition may pass a corrosion test. Corrosion testing may be performed via exposing metallized samples to a climate chamber at 40° C. and 98% relative humidity as described in the DIN50017. The sample may be exposed for a time period of 120 hour or 240 hours. A metallized sample of the blend composition may exhibit 10% or less, 9% or less, 8% or less, 7% or less, 5% or less, 4% or less, 3% or less, 2% or less, 1% or less, or 0% corrosion when stored for 120 hours or 240 hours at 98% relative humidity at 40° C., in accordance with DIN 50017.

Yellowness Index (YI) for laboratory scale samples may be determined using a HunterLab Color System. Yellowness Index (YI) may be measured according to ASTM D1925 on plaques of 3 mm thickness and on films of 0.2 mm thickness. Films can be prepared in a petri dish by casting from a solution of 1.1 grams of a polycarbonate in 10 ml chloroform. A molded sample of the polycarbonate blend composition can have a yellow index less than or equal to 15, less than or equal to 10, less than or equal to 5, less than or equal to 1, or 0, as measured according to ASTM D1925.

Metallized gloss measurements may be carried out using a BKY Gardner trigloss instrument. Measurements can be recorded at 20 degrees. To determine gloss before and after heat aging, 4 inch×4 inch (10.2 cm×10.2 cm) molded plaques may be tested before and after aging at 160° C. for 1 hour, for example. A metallized article prepared from the polycarbonate blend composition can have a gloss greater than or equal to 1000 units, greater than or equal to 1100 units, greater than or equal to 1200 units, greater than or equal to 1300 units, great than or equal to 1400 units, greater than or equal to 1500 units, greater than or equal to 1600 units, greater than or equal to 1700 units, greater than or equal to 1750 units, greater than or equal to 1800 units, greater than or equal to 1850 units, greater than or equal to 1900 units, greater than or equal to 1950 units, or 2000 units, measured at 20 degrees using a trigloss meter. A metallized article prepared from the polycarbonate blend composition can retain 80% or greater, 85% or greater, 90% or greater, 95% or greater, or 100% of its gloss after heat aging (e.g., heat aging at 150° C. for one hour, or 160° C. for one hour). A metallized article prepared from the polycarbonate blend composition can have a gloss greater than or equal to 1000 units, greater than or equal to 1500 units, greater than or equal to 1900 units, greater than or equal to 1950 units, or 2000 units, measured at 20 degrees using a trigloss meter; and can retain 80% or greater, 85% or greater, 90% or greater, 95% or greater, or 100% of its gloss after heat aging (e.g., heat aging at 150° C. for one hour, or 160° C. for one hour).

Reflectivity of metallized parts may be determined. Reflectivity may be assessed using a spectrophotometer (e.g., an X-rite I-7 spectrophotometer) in reflection mode with specular light excluded (e.g., specular excluded mode using a 25 mm aperture according to ASTM D1003 using D65 illumination and a 10 degree observer angle). A mirror image has a high level of specular reflection. Hence when specular reflection is excluded from the measurement, a highly reflective, mirror like metallized surface will give low L*. A decrease in mirror like reflectivity will give more diffuse light scattering and hence give a higher L*.

A metallized sample of the blend composition may have high reflectivity. A metallized sample of the blend composition may have an L* of 20 or less, 15 or less, or 10 or less, when measured in reflection mode with specular light excluded (e.g., specular excluded mode using a 25 mm aperture according to ASTM D1003 using D65 illumination and a 10 degree observer angle).

Shaped, formed, or molded articles comprising the polycarbonate compositions are also provided. The article may be a metallized article. The article may be metallized with, for example, chrome, nickel, or aluminum. The article may optionally include an intervening base coat between the molded article and the metal.

Articles that can be prepared using the polycarbonate compositions include, for example, automotive, aircraft, and watercraft exterior and interior components. Exemplary articles include, but are not limited to, instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, circuit breakers, electrical and electronic housings, and running boards, or any combination thereof. In certain embodiments, the article is a metallized automotive bezel.

Exemplary articles include, for example, enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications.

The article can be an automotive bezel, an automobile headlamp lens (e.g., an outer headlamp lens or an inner headlamp lens), or a headlamp assembly comprising: a headlamp lens; a headlamp reflector; a bezel; and a housing. The headlamp assembly may further comprise a tungsten-halogen, a halogen infrared reflective, or a high-intensity discharge light source.

In certain embodiments, a surface of an article molded from the thermoplastic composition (via, e.g., injection molding) exhibits a gloss of greater than 95 units, measured at 20 degrees using a trigloss meter. In certain embodiments, when a surface of the molded article is metallized, the metallized surface has a gloss of greater than 1000 units, greater than 1100 units, greater than 1200 units, greater than 1300 units, greater than 1400 units, greater than 1500 units, greater than 1600 units, or greater than 1700 units, measured at 20 degrees using a trigloss meter. A base coat can be present between the article and the metallized surface, or the surface of the article can be directly metallized without a base coat.

The gloss of the molded articles may be further heat stable. For example, there is provided an article formed from the compositions (via, e.g., injection molding), and having a metallized surface, wherein the metallized surface retains 80% or more, 85% or more, 90% or more, or 95% or more of its gloss after heat aging at 150° C. for 1 hour, measured at 20 degrees using a trigloss meter. A base coat can be present between the article and the metallized surface, or the surface of the article can be directly metallized without a base coat.

There is also provided an article formed from the compositions (via, e.g., injection molding), and having a metallized surface, wherein the metallized surface retains 80% or more, 85% or more, 90% or more, or 95% or more of its gloss after heat aging at 160° C. for 1 hour, measured at 20 degrees using a trigloss meter. A base coat can be present between the article and the metallized surface, or the surface of the article can be directly metallized without a base coat.

In certain embodiments, there is provided an article formed from the compositions, specifically a composition having up to 2 wt % of a particulate filler, or no filler, and having a metallized surface, wherein the metallized surface retains 80% or more, 85% or more, 90% or more, or 95% or more of its gloss after heat aging at 150° C. for 1 hour, measured at 20 degrees using a tri gloss meter. An undercoat can be present between the article and the metallized surface, or a surface of the article can be directly metallized.

In certain embodiments, there is provided an article formed from the compositions, where the compositions include one or more additives such as, for example, antioxidants, flame retardants, heat stabilizers, light stabilizers, antistatic agents, colorants, and the like. An antioxidant stabilizer composition can be used, such as for example a hindered diol stabilizer, a thioester stabilizer, an amine stabilizer, a phosphite stabilizer, or a combination comprising at least one of the foregoing types of stabilizers.

The polycarbonate compositions may be molded into useful shaped articles by a variety of methods, such as injection molding, extrusion, rotational molding, compression molding, blow molding, sheet or film extrusion, profile extrusion, gas assist molding, structural foam molding, and thermoforming. Additional fabrication operations for preparing the articles include, but are not limited to, molding, in-mold decoration, baking in a paint oven, lamination, metallization, and/or thermoforming.

Various types of gates can be employed for preparing molded articles, such as for example, side gates, spoke gates, pin gates, submarine gates, film gates, disk gates, or any combination thereof.

The article may be produced by a manufacturing process. The process may include (a) providing a polycarbonate composition as disclosed herein; (b) melting the composition, for example at 200-400° C., 225-350° C., or 270-300° C. in an extruder; (c) extruding the composition; and (d) isolating the composition. The article may be further produced by (e) drying the composition and (f) melt forming the composition.

A method of preparing a metallized article can include molding a composition into a predetermined mold dimensioned to a selected article as described above; and subjecting the molded article to a metallization process (e.g., vacuum deposition processes, vacuum sputtering processes, or a combination thereof). An exemplary method can include the general steps of an initial pump down on a molded article in a vacuum chamber, glow discharge/plasma clear; and metal deposition and application of a topcoat. Exemplary metals for metallization include, but are not limited to, chrome, nickel, and aluminum. The surface of the molded item can be cleaned and degreased before vapor deposition in order to increase adhesion. A base coat can optionally be applied before metallization, for example, to improve metal layer adhesion. In certain embodiments, the metallized article is manufactured without applying a base coat prior to metallization.

A method of preparing a metallized article can include molding an article and subsequently metallizing the article using a physical vapor deposition (PVD) metallization process. During the metallization process, high vacuum may be applied and the article treated with plasma to create a polar surface to enhance adhesion. Subsequent to plasma treatment, a metal (e.g., aluminum) can be vaporized to deposit a selected thickness (e.g., 100 nm to 150 nm) of metal layer onto the article surface. This step may be followed with applying a plasma-deposit siloxane hardcoat of selected thickness (e.g., 50 nm) to protect the metal layer against oxidation and scratches.

A method of preparing a metallized article can include mounting an article (e.g., on a rack) after molding and cleaning the article (e.g., with ionized air); positioning the article in a vacuum chamber; and metallizing the article under reduced pressure (e.g., using physical vapor deposition). After metallization, a protective transparent layer may be applied to the metallized article. For example, hexamethyldisiloxane (HMDS) or SiOx may be applied in the vacuum chamber, or a silicone hard coat may be applied outside the vacuum chamber. In certain embodiments, the metallization process includes the steps of forepumping, glow discharge, high vacuum pumping, coating (thermal coating in high vacuum), cool-down time, protective coating (glow discharge polymerization), venting, and charging.

A method of preparing a metallized article can include drying a molded article (e.g., in a circulating oven) at a selected temperature (e.g., 275° F.) and time (e.g., 8 hours).

The molded article can optionally be placed in a bag (e.g., ziplock bag) and heat sealed to minimize moisture uptake prior to metallization. The molded article can be placed on an open rack in a controlled environment at a selected temperature (e.g., 23° C.), and humidity (e.g., 50% relative humidity), and for a selected time (e.g., 1 to 5 days). The molded article may then be metallized (e.g., with evaporative metallization or sputtering). Evaporative metallization may include the process of having a metal resistively heated under deep vacuum that is subsequently allowed to cool onto exposed surfaces.

A method of preparing a metallized article can include providing an article into a vacuum chamber and pumping down the vacuum chamber (e.g., using a roughing pump to obtain a pressure of $8 \times 10^{-2}$ mbar, following by a fine pump to achieve a pressure of $1 \times 10^{-3}$ mbar). After the pump down, the pressure can be increased (e.g., to $2.5 \times 10^{-2}$ mbar) by adding a selected gas (e.g., argon or an oxygen/argon mixture) into the chamber. A glow discharge plasma clean may be implemented (e.g., at 40 kHz/3 kW) to prepare the article surface for metallization. The chamber may then be pumped down to a suitable pressure (e.g., $1.3 \times 10^{-4}$) prior to metallization. Next, metal deposition (e.g., aluminum deposition) may be implemented for a suitable time (e.g., 1 minute) to apply a selected thickness of metal (e.g., 70 to 100 nm). Following evaporative deposition of the metal, the pressure can be increased in the vacuum chamber (e.g., to $4 \times 10^{-2}$ mbar) in preparation for topcoat application (e.g., HMDS topcoat). The topcoat material (e.g., HDMS) may be introduced into the vacuum chamber to apply a protective layer (e.g., a 45 nm protective HMDS layer) under glow discharge conditions (e.g., for 180 min).

A method of preparing a metallized article can include an initial pump down (e.g., less than $10^{-5}$ Mbar); glow discharge pretreatment (e.g., using air, pressure of $10^{-1}$ Mbar, voltage 4 Kv, time 1 minute); pump down (e.g., less than $10^{-5}$ Mbar); thermal aluminum evaporation (e.g., in 1 minute); and plasil protective layer application under glow discharge (e.g., using air, pressure $10^{-1}$ Mbar, voltage 4 Kv, time 1 minute).

A method of preparing a metallized article can provide an article with a metal layer thickness of, for example, 10 nm to 300 nm, 50 nm to 200 nm, 75 nm to 175 nm, 100 to 150 nm, or 70 nm to 100 nm.

A topcoat (e.g., siloxane hard-coat) can be applied to a metallized article, the topcoat having a thickness of, for example, 5 nm to 150 nm, 10 nm to 100 nm, 30 nm to 75 nm, 40 nm to 60 nm, or 45 nm to 55 nm.

A wide variety of articles can be manufactured using the disclosed compositions, including components for lighting articles, particularly optical reflectors. The optical reflectors can be used in automotive headlamps, headlamp bezels, headlight extensions and headlamp reflectors, for indoor illumination, for vehicle interior illumination, and the like.

In the manufacture of an optical reflector, the thermoplastic composition can be molded, an optional base coat can be applied to a surface of the article, followed by metallization of the surface. In certain embodiments, a base coat is not applied to a surface of the molded article prior to metallization. The surfaces of the molded items are smooth and good gloss can be obtained even by direct metal vapor deposition without treating the molded item with primer. Moreover, because the release properties of the molded item during injection molding are good, the surface properties of the molded item are superior without replication of mold unevenness.

The articles, in particular lighting articles, can have one or more of the following properties: very low mold shrinkage; good surface gloss even when metal layers are directly vapor deposited; no residue on the mold after long molding runs; and the vapor deposited surfaces do not become cloudy or have rainbow patterns even on heating of the vapor deposited surface. The articles further can have good heat stability.

The polycarbonate blend compositions preferably have one or more beneficial properties for the production of heat resistant articles (e.g., automotive bezels), and in particular, metallizable heat resistant articles. It has been unexpectedly found that the compositions disclosed herein can be prepared having a combination of thermal, mechanical, and rheological properties that exceed currently available technologies. In addition, the compositions can be used to prepare metallized articles to meet current design demands.

The polycarbonate blend compositions can include one or more high heat polycarbonates to enhance one or more of the thermal, mechanical, rheological, and metallization performance of the blend compositions. Exemplary high heat polycarbonates for inclusion in the blend compositions include polycarbonates derived from 2-phenyl-3,3-bis(4-hydroxyphenyl)phthalimidine (PPPBP) and BPA. The PPPBP-BPA copolymer may have endcaps derived from paracumyl phenol (PCP), for example.

The PPPBP-BPA copolymer may include 1 mol % to 50 mol % PPPBP, 10 mol % to 45 mol % PPPBP, 15 mol % to 40 mol % PPPBP, 20 mol % to 35 mol % PPPBP, 25 mol % to 40 mol % PPPBP, 25 mol % to 35 mol % PPPBP, 30 mol % to 35 mol % PPPBP, or 32 mol % to 33 mol % PPPBP.

The PPPBP-BPA copolymer may have a Mw of 15,500 g/mol to 40,000 g/mol, 16,000 g/mol to 35,000 g/mol, 17,000 g/mol to 30,000 g/mol, 15,500 g/mol to 25,000 g/mol, 15,500 g/mol to 23,000 g/mol, 17,000 to 23,000 g/mol, or 17,000 g/mol to 20,000 g/mol. Mw can be determined by GPC using BPA polycarbonate standards.

The PPPBP-BPA copolymers may have a polydispersity index (PDI) of 1.0 to 10.0, 2.0 to 7.0, or 2.0 to 3.0. In certain embodiments, the PPPBP-BPA copolymers have a PDI of 2.2 or 2.3.

The PPPBP-BPA copolymer may be present in the blend compositions in an amount ranging from 30 wt % to 95 wt %, 35 wt % to 95 wt %, 40 wt % to 95 wt %, 45 wt % to 95 wt %, 50 wt % to 95 wt %, 55 wt % to 95 wt %, 60 wt % to 95 wt %, 60 wt % to 90 wt %, 60 wt % to 85 wt %, or 60 wt % to 80 wt %, based on total weight of the composition.

In certain embodiments, the blend compositions include a PPPBP-BPA copolymer selected from the group consisting of: a paracumyl phenol (PCP) end-capped linear PPPBP-BPA copolymer having a Mw of 23,000 g/mol [±1,000 g/mol]; a paracumyl phenol (PCP) end-capped linear PPPBP-BPA copolymer having a Mw of 20,000 g/mol [±1,000 g/mol]; and a paracumyl phenol (PCP) end-capped linear PPPBP-BPA copolymer having a Mw of 17,000 g/mol [±1,000 g/mol]; or any combination thereof; wherein the Mw is as determined by GPC using BPA polycarbonate standards. In certain embodiments, the PPPBP-BPA copolymers include 31 mol % to 35 mol % PPPBP content, or 32 mol % to 33 mol % PPPBP content.

The polycarbonate blend compositions can include one or more polycarbonates to enhance one or more of the thermal, mechanical, rheological, and metallization performance of the blend compositions. Exemplary polycarbonates for inclusion in the blend compositions include homopolycarbonates derived from Bisphenol A. The BPA polycarbonate may have endcaps derived from phenol, paracumyl phenol (PCP), or a combination thereof.

The BPA polycarbonate may have a Mw of 17,000 g/mol to 40,000 g/mol, 17,000 g/mol to 35,000 g/mol, 17,000 g/mol to 30,000 g/mol, 17,000 g/mol to 25,000 g/mol, 17,000 g/mol to 23,000 g/mol, 17,000 to 22,000 g/mol, 18,000 g/mol to 22,000, 18,000 g/mol to 35,000 g/mol, 18,000 g/mol to 30,000 g/mol, 25,000 g/mol to 30,000 g/mol, 26,000 g/mol to 30,000 g/mol, 27,000 g/mol to 30,000 g/mol, 28,000 g/mol to 30,000 g/mol, or 29,000 g/mol to 30,000 g/mol. The BPA polycarbonate may have a Mw of 18,200 g/mol, 18,800 g/mol, 21,800 g/mol, 21,900 g/mol, 29,900 g/mol, or 30,000 g/mol. Mw can be determined by GPC using BPA polycarbonate standards.

The BPA polycarbonates may have a polydispersity index (PDI) of 1.0 to 10.0, 2.0 to 7.0, or 2.0 to 3.0. In certain embodiments, the BPA polycarbonates have a PDI of 2.2 or 2.3.

The BPA polycarbonate may be present in the blend compositions in an amount ranging from 1 wt % to 60 wt %, 3 wt % to 55 wt %, 5 wt % to 50 wt %, or 10 wt % to 35 wt %, based on total weight of the composition.

In certain embodiments, the blend compositions include a BPA polycarbonate selected from the group consisting of: a PCP end-capped linear BPA polycarbonate having a Mw of 18,200 g/mol [$\pm$1,000 g/mol]; a PCP end-capped linear BPA polycarbonate having a Mw of 18,800 g/mol [$\pm$1,000 g/mol]; a phenol end-capped linear BPA polycarbonate having a Mw of 21,800 g/mol [$\pm$1,000 g/mol]; a PCP end-capped linear BPA polycarbonate having a Mw of 21,900 g/mol [$\pm$1,000 g/mol]; a PCP end-capped linear BPA polycarbonate having a Mw of 29,900 g/mol [$\pm$1,000 g/mol]; and a phenol end-capped linear BPA polycarbonate having a Mw of 30,000 g/mol [$\pm$1,000 g/mol]; or any combination thereof; wherein the Mw is as determined by GPC using BPA polycarbonate standards.

The polycarbonate blend compositions can include one or more polysiloxane-polycarbonate copolymers to enhance one or more of the thermal, mechanical, rheological, and metallization performance of the blend compositions. Exemplary polysiloxane-polycarbonate copolymers for inclusion in the blend compositions include polycarbonates comprising polydimethylsiloxane units, and more specifically, polycarbonates including polydimethylsiloxane units and units derived from BPA. The polysiloxane-polycarbonate copolymers may have endcaps derived from paracumyl phenol (PCP), for example.

The polysiloxane-polycarbonate copolymer, such as a polydimethylsiloxane-polcarbonate copolymer, may include 1 wt % to 35 wt % siloxane content (e.g., polydimethylsiloxane content), 2 wt % to 30 wt % siloxane content, 5 wt % to 25 wt % siloxane content, or 6 wt % to 20 wt % siloxane content. The polysiloxane-polycarbonate copolymer may include 6 wt % siloxane content. The polysiloxane-polycarbonate copolymer may include 20 wt % siloxane content. Siloxane content may refer to polydimethylsiloxane content.

The polysiloxane-polycarbonate copolymer may have a Mw of 18,000 g/mol to 40,000 g/mol, 20,000 g/mol to 35,000 g/mol, or 23,000 g/mol to 30,000 g/mol. The polysiloxane-polycarbonate copolymer may have a Mw of 23,000 g/mol [$\pm$1,000 g/mol], or 30,000 g/mol [$\pm$1,000 g/mol]. Mw can be determined by GPC using BPA polycarbonate standards.

The polysiloxane-polycarbonate copolymer may have a polysiloxane average block length of 30 to 100 units. The polysiloxane-polycarbonate copolymer may have a polysiloxane average block length of 40 to 60 units. The polysiloxane-polycarbonate copolymer may have a polysiloxane average block length of 45 units.

The polysiloxane-polycarbonate copolymer, such as a polydimethylsiloxane-polycarbonate copolymer, may be present in the blend compositions in an amount ranging from 1 wt % to 60 wt %, 5 wt % to 55 wt %, or 10 wt % to 35 wt %, based on total weight of the composition.

In certain embodiments, the blend compositions include a polysiloxane-polycarbonate copolymer selected from the group consisting of: a PCP end-capped BPA polycarbonate-polydimethylsiloxane copolymer comprising 20 wt % siloxane, having an average polydimethylsiloxane block length of 45 units, and having a Mw of 30,000 g/mol [$^{35}$ 1,000 g/mol]; and a PCP end-capped BPA polycarbonate-polydimethylsiloxane copolymer comprising 6 wt % siloxane, having an average polydimethylsiloxane block length of 45 units, and having a Mw of 23,000 g/mol [$\pm$1,000 g/mol]; or a combination thereof; wherein the Mw is as determined by GPC using BPA polycarbonate standards.

The polycarbonate blend compositions can include one or more polyesters to enhance one or more of the thermal, mechanical, rheological, and metallization performance of the blend compositions. Exemplary polyesters for inclusion in the blend compositions include poly(ethylene terephthalate) ("PET"); poly(1,4-butylene terephthalate) ("PBT"); poly (ethylene naphthanoate) ("PEN"); poly(butylene naphthanoate) ("PBN"); poly(propylene terephthalate) ("PPT"); poly(1,4-cyclohexylenedimethylene) terephthalate ("PCT"); poly(1,4-cyclohexylenedimethylene 1,4-cyclohexandicarboxylate) ("PCCD"); poly(cyclohexylenedimethylene terephthalate) glycol ("PCTG"); poly(ethylene terephthalate) glycol ("PETG"); and poly(1,4-cyclohexylenedimethylene terephthalate-co-isophthalate) ("PCTA"); or any combination thereof.

The polyester can have an intrinsic viscosity, as determined in chloroform at 25° C., of 0.3 to 1.5 deciliters per gram (dl/gm), specifically 0.45 to 1.2 dl/gm.

The polyester can have a Mw of 10,000 g/mol to 200,000 g/mol, or 20,000 g/mol to 100,000 g/mol, as measured by GPC.

The polyester may be present in the blend compositions in an amount ranging from 0.05 wt % to 15 wt %, 0.1 wt % to 15 wt %, 0.5 wt % to 15 wt %, 1 wt % to 15 wt %, 1 wt % to 10 wt %, or 3 wt % to 10 wt %, based on total weight of the composition.

In certain embodiments, the blend compositions include a polyester selected from the group consisting of: poly(1,4-butylene terephthalate); poly(1,4-butylene terephthalate); poly(1,2-ethylene terephthalate); poly(1,4-cyclohexylenedimethylene 1,4-cyclohexandicarboxylate); and poly(cyclohexylenedimethylene terephthalate) glycol; or any combination thereof.

In certain embodiments, the blend compositions include a polyester selected from the group consisting of: poly(1,4-butylene terephthalate) having an intrinsic viscosity (IV) of 1.1 dl/g, and a carboxylic acid (COOH) end group content of 38 meq/Kg COOH; poly(1,4-butylene terephthalate) having an intrinsic viscosity (IV) of 0.66 dl/g, and a carboxylic acid (COOH) end group content of 17 meq/Kg COOH; poly(1,2-ethylene terephthalate) having an intrinsic viscosity (IV) of 0.54 dl/g, and a carboxylic acid (COOH) end group content of 20 meq/Kg COOH; poly(1,4-cyclohexylenedimethylene 1,4-cyclohexandicarboxylate); and poly(cyclohexylenedimethylene terephthalate) glycol; or any combination thereof.

The polycarbonate blend compositions can include one or more hydroxyl-functionalized flow promoters to enhance one or more of the thermal, mechanical, rheological, and metallization performance of the blend compositions. Exemplary flow promoters for inclusion in the blend compositions include ethylene glycol; propylene glycol; polyethylene glycol; polypropylene glycol; tri(hydroxymethyl)aminomethan ("THAM"); glycerol monostearate ("GMS"); octadecanoic acid, 1,2,3-propanetriyl ester (glycerol tristearate) ("GTS"); or any combination thereof.

The polyalkylene glycol flow promoters (e.g., PEG, PPG) can have a Mw of 1,000 g/mol to 100,000 g/mol, 2,000 g/mol to 50,000 g/mol, or 2,000 g/mol to 35,000 g/mol, as measured by GPC.

The hydroxyl-functionalized flow promoters may be present in the blend compositions in an amount ranging from 0.05 wt % to 5 wt %, or 0.1 wt % to 2 wt %, based on total weight of the composition.

In certain embodiments, the blend compositions include a hydroxyl-functionalized flow promoter selected from the group consisting of: ethylene glycol; polyethylene glycol (PEG) having a Mw of 3,350 g/mol [$\pm$1,000 g/mol]; PEG having a Mw of 10,000 g/mol [$\pm$1,000 g/mol]; PEG having a Mw of 35,000 g/mol [$\pm$1,000 g/mol]; polypropylene glycol (PPG) having a Mw of 2,000 g/mol [$\pm$1,000 g/mol]; tri (hydroxymethyl)-aminomethane; glycerol monostearate; and glycerol tristearate; or any combination thereof The polycarbonate blend compositions can include one or more additives. Exemplary additives for inclusion in the blend compositions include, for example, pentaerythritol tetrastearate (PETS), pentaerythrithol tetrakis-(3-dodecylthiopropionate) (SEENOX 412S), tetrakis(2,4-di-tert-butylphenyl)[1,1-biphenyl]-4,4'-diylbisphosphonite (PEPQ), monozinc phosphate (MZP), phosphoric acid, hydroxyl octaphenyl benzotriazole, and any combination thereof.

In certain embodiments, the blend compositions include PETS, a phosphite stabilizer (e.g., Iragafos 168), and a hindered phenol (e.g., Irgafos 1076). In certain embodiments, the blend compositions include 0.27 wt % PETS, 0.08 wt % phosphite stabilizer (e.g., Iragafos 168), and 0.04 wt % hindered phenol (e.g., Irgafos 1076), based on total weight of the composition.

In certain embodiments, the blend compositions include PEPQ as an additive. The PEPQ can be present in the blend compositions in an amount ranging from 0.01 wt % to 1 wt %, 0.05 wt % to 0.5 wt %, or 0.1 wt % to 0.2 wt %, based on total weight of the composition.

In certain embodiments, the blend compositions include phosphoric acid as an additive. The $H_3PO_4$ can be present in the blend compositions in an amount ranging from 0.01 to 0.2 wt %, based on total weight of the composition.

In certain embodiments, the blend compositions include MZP as an additive. The MZP can be present in the blend compositions in an amount ranging from 0.005 to 0.2 wt %, based on total weight of the composition.

In certain embodiments, the blend compositions include pentaerythrithol tetrakis-(3-dodecylthiopropionate as an additive. The pentaerythrithol tetrakis-(3-dodecylthiopropionate can be present in the blend compositions in an amount ranging from 0.005 to 0.2 wt %, based on total weight of the composition.

In certain embodiments, the blend compositions include hydroxyl octaphenyl benzotriazole as an additive. The hydroxyl octaphenyl benzotriazole can be present in the blend compositions in an amount ranging from 0.01 wt % to 1 wt %, 0.05 wt % to 0.5 wt %, or 0.1 wt % to 0.2 wt %, based on total weight of the composition.

7. Examples

Physical testing (e.g., Vicat softening temperature, heat deflection temperature, melt volume flow rate, melt flow rate, melt viscosity, Izod notched impact, multiaxial impact) was performed according to ISO or ASTM standards. Unless specified to the contrary herein, all test standards are the most recent standard in effect at the time of filing this application.

Vicat B120 softening temperatures were measured according to ISO 306-2013.

Notched Izod Impact (NII) Strength is used to compare the impact resistances of plastic materials. Notched Izod impact strength was determined using a 3.2 mm (4 mm for ISO) thick, molded, notched Izod impact bar. It was determined per ASTM D256-2010 or ISO 180-2000. The results are reported in Joules per meter (ASTM) or $kJ/m^2$ (ISO). Tests were conducted at room temperature (23° C.) and at low temperatures (0° C. and −30° C.).

Multiaxial impact energies were measured according to ASTM D3763-2010 or ISO 6603.

Heat deflection temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. HDT was determined as flatwise under 1.82 MPa or 0.45 MPa loading with 3.2 mm (4 mm for ISO) thickness bar according to ASTM D648-2007 or ISO 75-2013. Results are reported in ° C.

Melt volume rate (MVR) was measured at 300° C./2.16 kg or 330° C./2.16 kg as per ASTM D1238-2010 or ISO 1133-2011. Melt viscosity (MV) was measured according to ISO11443 at a temperature of 300° C. or 316° C. and shear rate of 1500 or 5000 $s^{-1}$.

Melt flow rate was measured according to ASTM D1238-2010 or ISO 1133-2011.

Differential scanning calorimetry (DSC) employing a temperature sweep rate of 20° C./min was used to determine glass transition temperatures.

Spiral Flow Test:

The spiral flow length was measured under a molding temperature of 330° C., a mold temperature of 100° C., and an injection pressure of 300 mm/s. The resulting molded parts had a thickness of 1 mm and a width of 15 mm.

Yellowness Index (YI) was measured using the ASTM D1925 test method on plaques of 3 mm thickness and on films of 0.2 mm thickness. Films were prepared in a petri dish by casting from a solution of 1.1 grams of a polycarbonate in 10 ml of chloroform.

Color data was acquired on an X-rite I-7 spectrophotometer in the range 360 nm to 750 nm. The reflection data was acquired in specular excluded mode using a 25 mm aperture according to ASTM D1003 using D65 illumination and a 10 degree observer angle. A mirror image has a high level of specular reflection. Hence when specular reflection is excluded from the measurement, a highly reflective, mirror like metallized surface will give low L*. A decrease in mirror like reflectivity will give more diffuse light scattering and hence give a higher L*.

Metallization was performed on molded parts from a film gate injection set-up having dimensions 60 mm×60 mm and a thickness of either 3 mm or 1.5 mm using the physical vapor deposition (PVD) process. This process deposits a 100-150 nm thick aluminum layer onto one side of the molded part under vacuum, followed by a protective plasma-deposited siloxane hard-coat of 50 nm. The initial metallization performance was assessed by 2 well-trained operators as acceptable ("OK") or not acceptable ("NOK"). Metal adhesion was tested according to the ASTM3359/ISO2409 method using a tape (Scotch 898) pull test on a metallized surface inscribed with a crosshatch, using a rating system with GT0 indicating no delamination and GT5 indicating 100% delamination. Corrosion testing was performed via exposing metallized samples to a climate chamber at 40° C. and 98% relative humidity as described in the DIN50017 procedure. Haze onset was determined as the highest temperature at which no visual defects appear after 1 hour of heat aging in an air circulating oven, exposing all sides of the sample (symmetric heating).

Haze measurements were performed on rectangular injection molded plaques having dimensions of 6"L×2.5"W×0.125"T according to ASTM D1003.

Transmittance was measured according to ASTM D1003, and defined in the following formula as: % $T=(I/I_o)\times 100\%$; wherein: $I$=intensity of the light passing through the test sample; and $I_o$=Intensity of incident light.

Parallel plate rheology measurements were made according to ASTM D4440 and ISO 6721-10.

Molecular weight determinations were performed using GPC, using a cross-linked styrene-divinylbenzene column and calibrated to bisphenol-A polycarbonate standards using a UV-VIS detector set at 254 nm. Samples were prepared at a concentration of 1 mg/ml, and eluted at a flow rate of 1.0 ml/min.

Table 1 summarizes the exemplary materials components of the polycarbonate blend compositions. The listed copolymers and polycarbonate resins were prepared by methods known in the art. All other chemical entities were purchased from the commercial sources listed.

TABLE 1

| | | |
|---|---|---|
| PPPBP-PC-1 | PPPBP (N-Phenylphenolphthaleinylbisphenol, 2,2-Bis(4-hydro) - Bisphenol A Copolymer, 32 mol % PPPBP, Mw 23,000 g/mol [±1,000 g/mol], interfacial polymerization, PCP end-capped, PDI = 2-3 | SABIC Innovative Plastics ("SABIC-IP") |
| PPPBP-PC-2 | PPPBP (N-Phenylphenolphthaleinylbisphenol, 2,2-Bis(4-hydro) - Bisphenol a Copolymer, 32 mol % PPPBP, Mw 19,900 g/mol [±1,000 g/mol], interfacial polymerization, PCP end-capped, PDI = 2-3 | SABIC-IP |
| PPPBP-PC-3 | PPPBP (N-Phenylphenolphthaleinylbisphenol, 2,2-Bis(4-hydro) - Bisphenol A Copolymer, 32 mol % PPPBP, Mw 17,300 g/mol [±1,000 g/mol], interfacial polymerization, PCP end-capped, PDI = 2-3 | SABIC-IP |
| PPPBP-PC-4 | PPPBP (N-Phenylphenolphthaleinylbisphenol, 2,2-Bis(4-hydro) - Bisphenol A Copolymer, 18 mol % PPPBP, Mw 23,000 g/mol [±1,000 g/mol], interfacial polymerization, PCP end-capped, PDI = 2-3 | SABIC-IP |
| PC-1 | Linear Bisphenol A Polycarbonate, produced via interfacial polymerization, Mw 30,000 g/mol [±1,000 g/mol], as determined by GPC using polycarbonate standards, phenol end-capped, PDI = 2-3 | SABIC-IP |
| PC-2 | Linear Bisphenol A Polycarbonate, produced via interfacial polymerization, Mw 21,800 g/mol [±1,000 g/mol], as determined by GPC using polycarbonate standards, phenol end-capped, PDI = 2-3 | SABIC-IP |
| PC-3 | Linear Bisphenol A Polycarbonate, produced via interfacial polymerization, Mw 18,800 g/mol [±1,000 g/mol], as determined by GPC using polycarbonate standards, para-cumylphenyl (PCP) end-capped, PDI = 2-3 | SABIC-IP |
| PC-4 | Linear Bisphenol A Polycarbonate produced by interfacial polymerization, Mw 29,900 g/mol [±1,000 g/mol], as determined by GPC using polycarbonate standards, PCP end-capped, PDI = 2-3 | SABIC-IP |
| PC-5 | Linear Bisphenol A polycarbonate produced by interfacial polymerization, Mw 21,900 g/mol [±1,000 g/mol], as determined by GPC using polycarbonate standards, PCP end-capped, PDI = 2-3 | SABIC-IP |
| PC-6 | Linear Bisphenol A polycarbonate produced by interfacial polymerization, Mw 18,200 g/mol [±1,000 g/mol], as determined by GPC using polycarbonate standards, PCP end-capped, PDI = 2-3 | SABIC-IP |
| PC-7 | Linear Bisphenol A polycarbonate produced by melt polymerization, Mw 21,700 g/mol [±1,000 g/mol], as determined by GPC using polycarbonate standards, PDI = 2-3 | SABIC-IP |
| PC-8 | Bisphenol A/1,1-bis-(4-hydroxyphenyl)-3,3,5-trimethylcyclohexane copolycarbonate resin (Apec 1895/7 grade) having a melt a melt volume rate of 18 g/10 min when measured according to ISO 1133, 330° C., 2.16 kg load | Bayer Material Science |
| PC-Si-1 | PDMS (polydimethylsiloxane) - Bisphenol A Polycarbonate copolymer, produced via interfacial polymerization, 6 wt % siloxane, average PDMS block length of 45 units (D45), Mw 23,000 g/mol [±1,000 g/mol], as determined by GPC using polycarbonate standards, para-cumylphenol (PCP) end-capped, PDI = 2-3 | SABIC-IP |
| PC-Si-2 | PDMS (polydimethylsiloxane) - Bisphenol A Polycarbonate copolymer, produced via interfacial polymerization, 20 wt % siloxane, average PDMS block length of 45 units (D45), Mw 30,000 g/mol [±1,000 g/mol], as determined by GPC using polycarbonate standards, para-cumylphenol (PCP) end-capped, PDI = 2-3 | SABIC-IP |

TABLE 1-continued

| | | |
|---|---|---|
| PETS | Pentaerythritol Tetrastearate | LONZA |
| PBT-1 | Polybutylene terephthalate produced via polymerization of dimethyl terephthalate (DMT) and butanediol (BDO), with intrinsic viscosity (IV) of 0.66 dl/g, and carboxylic acid (COOH) end group content of 17 meq/Kg COOH | SABIC-IP |
| PET-1 | Polyethylene Terephthalate with intrinsic viscosity (IV) of 0.535 dl/g, carboxylic acid (COOH) end group content of 20 meq/Kg COOH, and diethylene glycol (DEG) content of 0.8% | AKRA |
| Seenox 412S | Pentaerythrithol tetrakis-(3-dodecylthiopropionate) | HARUNO SANGYO KAISHA |
| PCCD | Poly(1,4-cyclohexane-dimethanol-1,4-cyclohexanedicarboxylate) | EASTMAN CHEMICAL |
| PCTG | Poly(cyclohexanedimethylene terephthalate)-co-poly(ethylene terephthalate) | EASTMAN CHEMICAL |
| PEPQ | Tetrakis(2,4-di-tert-butylphenyl)[1,1-biphenyl]-4,4'diylbisphosphonite | CLARIANT |
| MZP | Monozinc phosphate | GALLARD SCHLESINGER |
| PDMS | Polydimethylsiloxane oil, M1000 (1000 cps) | MOMENTIVE |
| PMPS | Polymethylphenylsiloxane oil, PN200 | MOMENTIVE |
| EG | Ethylene glycol; 1,2-Ethanediol | MERCK |
| PEG-1 | Poly(ethylene glycol) - Mw of 3,350 g/mol | CLARIANT |
| PEG-2 | Poly(ethylene glycol) - Mw of 10,000 g/mol | FISHER |
| PEG-3 | Poly(ethylene glycol) - Mw of 35,000 g/mol | FISHER |
| PPG | Poly(propylene glycol) - Mw of 2,000 g/mol | FISHER |
| THAM | Tris(hydroxymethyl)-aminomethane | ANGUS CHEMIE |
| GMS | Glycerol Monostereate (Rikemal S100A) | RIKEN VITAMIN CO., LTD |
| GTS | Octadecanoic acid, 1,2,3-propanetriyl ester (glycerol tristearate) | EMERY OLEOHEMICALS GMBH |
| Kane Ace MR02 | Siloxane-Acrylic ester copolymer | KANEKA |
| ABS | Acrylonitrile-butadiene-styrene graft copolymer | SABIC-IP |
| MBS | Methylmethacrylate Butadiene shell-core copolymer | DOW/ROHM AND HAAS |
| SAN | Styrene-Acrylonitrile copolymer | SABIC-IP/DOW |
| Bulk ABS | Styrene-Acrylonitrile copolymer | SABIC-IP |
| Phosphite stabilizer | Tris(di-t-butylphenyl)phosphite | BASF |
| PETS SEU | Palmitic/Stearic Acid (50/50) ester of dipenta/pentaerythritol | EMERY OLEOHEMICALS GMBH |
| Hindered Phenol | Octadecyl 3-(3,5-di-tert-butyl-4-hydroxyphenyl)propionate | BASF |
| BPA | 4,4'-(propane-2,2-diyl)diphenol | SABIC |
| UV stabilizer | Hydroxyl octaphenyl benzotriazole | CYTEC |
| $H_3PO_4$ | Phosphoric acid diluted in water | LABCHEM/ FISHER SCIENTIFIC |

Unless stated otherwise, the compositions were made by the following procedures. All solid additives (e.g., stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well.

Extrusion of all materials was performed on a 25 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), 270° C. (zone 3), and 280-300° C. (zone 4 to 8). Screw speed was 300 rpm and throughput was between 15 and 25 kg/hr.

The compositions were molded after drying at 135° C. for 4 hours on a 45-ton Engel molding machine with 22 mm screw or 75-ton Engel molding machine with 30 mm screw operating at a temperature around 310° C. with a mold temperature of 100° C.

Unless stated otherwise, the phrase "0.4 wt % additives" or a derivation thereof, as used in the following tables, refers to 0.27 wt % pentaerythritol tetrastearate (PETS)+0.08 wt % phosphite stabilizer (e.g., Iragafos 168)+0.04 wt % hindered phenol (e.g., Irgafos 1076).

Compositions with Polyester Flow Aids

Polyester flow aids were incorporated into polycarbonate blend compositions to lower viscosity and create high heat compositions that process more easily. The performance properties of these compositions are displayed in Table 2. The composition 4 containing PBT demonstrated the greatest increase in flow rates (MVR, MFR) and reduction in viscosity while also maintaining high impact strength.

TABLE 2

| | Composition | | | | | |
|---|---|---|---|---|---|---|
| | 1 | 2 | 3 | 4 | 5 | 6 |
| PPPBP-PC-1 (%) | 63.75 | 63.75 | 63.75 | 63.75 | 63.75 | 63.75 |
| PC-4 (%) | 15.94 | 15.46 | 10.46 | 10.46 | 5.46 | 10.46 |
| PC-5 (%) | 19.92 | 19.92 | 19.92 | 19.92 | 19.92 | |
| PC-6 (%) | | | | | | 24.0 |
| PCCD (%) | | | 5.0 | | | |
| PBT-1 (%) | | | | 5.0 | | |
| PET-1 (%) | | | | | 10.0 | |
| PETS (%) | 0.27 | 0.75 | 0.27 | 0.27 | 0.27 | 0.27 |
| Phosphite Stab.; Irgafos 168 (%) | 0.08 | 0.08 | 0.08 | 0.08 | 0.08 | 0.08 |
| Hindered Phenol; Irgafos 1076 (%) | 0.04 | 0.04 | 0.04 | 0.04 | 0.04 | 0.04 |
| NII, 23° C. (J/m) | 132 | 113 | 94.2 | 83 | 74.3 | 100 |
| Ductility (%) | 0 | 0 | 0 | 0 | 0 | 0 |
| MAI Total Energy (J) | 71 | 75 | 61 | 74 | 67 | 68 |
| Ductility (%) | 100 | 100 | 100 | 100 | 100 | 100 |
| MFR, 300° C., 2.16 kg (g/10 min) | 12 | 13 | 19 | 28 | 24 | 19 |
| MFR, 330° C., 2.16 kg (g/10 min) | 35 | 36 | 55 | 134 | 75 | 56 |
| Melt, vis 316° C., 5000 $s^{-1}$ (Pa-s) | 159 | 148 | 126 | 94 | 108 | 114 |
| Tg (° C.) | 175 | 171 | 160 | 165 | 168 | 168 |

Further studies incorporating PBT and PET into blends containing PPPBP-PC-1 and PC-6 are displayed in Table 3. Compositions containing 2-5% PBT and 4-6% PET demonstrated improvements in flow and viscosity. However, these improvements were accompanied by a reduction in heat (Tg).

TABLE 3

| | Composition | | | | | | | |
|---|---|---|---|---|---|---|---|---|
| | 7 | 8 | 9 | 10 | 11 | 12 | 13 | 14 |
| PPPBP-PC-1 (%) | 79.61 | 74.61 | 80 | 79.6 | 76.36 | 76.49 | 72.53 | 80 |
| PC-6 (%) | 20 | 20 | 14 | 16.64 | 20 | 14 | 20 | 14 |
| PBT-1 (%) | | 5 | 5 | 2.3 | | 5 | | 1.97 |
| PET-1 (%) | | | 0.61 | 1.07 | 3.25 | 4.12 | 5.11 | 5.61 |
| PETS (%) | 0.27 | 0.27 | 0.27 | 0.27 | 0.27 | 0.27 | 0.27 | 0.27 |
| Phosphite Stab.; Irgafos 168 (%) | 0.08 | 0.08 | 0.08 | 0.08 | 0.08 | 0.08 | 0.08 | 0.08 |
| Hindered Phenol; Irgafos 1076 (%) | 0.04 | 0.04 | 0.04 | 0.04 | 0.04 | 0.04 | 0.04 | 0.04 |
| Melt density, 330° C., 2.17 kg (g/cm³) | 1.18 | 1.18 | 1.18 | 1.18 | 1.18 | 1.18 | 1.18 | 1.18 |
| MVR, 330° C., 2.16 kg, 360 sec (cm³/10 min) | 36 | 217 | 119 | 54.9 | 44.8 | 203 | 59.1 | 43.7 |
| MFR, 330° C., 2.16 kg, 360 sec (g/10 min) | 42 | 256 | 140 | 65 | 53 | 240 | 70 | 52 |
| Melt, vis 316° C., 5000 $s^{-1}$ (Pa-s) | 148 | 91 | 109 | 129 | 134 | 87 | 115 | 131 |
| Tg (° C.) | 181 | 167 | 168 | 173 | 175 | 162 | 175 | 175 |

| | Composition | | | | | | |
|---|---|---|---|---|---|---|---|
| | 15 | 16 | 17 | 18 | 19 | 20 | 21 |
| PPPBP-PC-1 (%) | 72.06 | 75.47 | 76.03 | 71.82 | 72.33 | 65.1 | 68.31 |
| PC-6 (%) | 16.88 | 16.57 | 14 | 17.71 | 14.06 | 20 | 16.3 |
| PBT-1 (%) | 5 | 1.62 | 0 | 0.08 | 3.22 | 4.51 | 5 |
| PET-1 (%) | 5.67 | 5.95 | 9.58 | 10 | 10 | 10 | 10 |
| PETS (%) | 0.27 | 0.27 | 0.27 | 0.27 | 0.27 | 0.27 | 0.27 |
| Phosphite Stab.; Irgafos 168 (%) | 0.08 | 0.08 | 0.08 | 0.08 | 0.08 | 0.08 | 0.08 |
| Hindered Phenol; Irgafos 1076 (%) | 0.04 | 0.04 | 0.04 | 0.04 | 0.04 | 0.04 | 0.04 |
| Melt density, 330° C., 2.17 kg (g/cm³) | 1.18 | 1.18 | 1.18 | 1.18 | 1.18 | 1.18 | 1.18 |
| MVR, 330° C., 2.16 kg, 360 sec (cm³/10 min) | 415 | 217 | 59.5 | 55.7 | 110 | 959 | 190 |
| MFR, 330° C., 2.16 kg, 360 sec (g/10 min) | 490 | 256 | 70 | 66 | 130 | 1132 | 224 |
| Melt, vis 316° C., 5000 $s^{-1}$ (Pa-s) | 84 | 99 | 118 | 135 | 109 | 67 | 95 |
| Tg (° C.) | 170 | 167 | 168 | 175 | 175 | 175 | 163 |

Polycarbonate compositions that possess 5% or 7% of semicrystalline polyester PBT were prepared (Table 4, compositions 26, 28). These compositions possessed the best balance of flow and heat properties.

Metallization data for 26 and 28 is summarized in Table 6. Metallized samples pass haze onset at thicknesses of 3.0 mm and 1.5 mm at temperatures up to 165° C. Table 6 also displays that the compositions pass the cross-hatch adhesion

TABLE 4

| | Composition | | | | | | | |
|---|---|---|---|---|---|---|---|---|
| | 22 | 23 | 24 | 25 | 26 | 27 | 28 | 29 |
| PPPBP-PC-1 (%) | 80 | 78 | 78 | 77 | 85 | 90 | 85 | 90 |
| PC-6 (%) | 20 | 14 | 16 | 14 | 10 | 5 | 8 | 3 |
| PBT-1 (%) | 0 | 3 | 1.1 | 3 | 5 | 5 | 7 | 7 |
| PET-1 (%) | 0 | 5 | 5 | 6 | 0 | 0 | 0 | 0 |
| PETS (%) | 0.27 | 0.27 | 0.27 | 0.27 | 0.27 | 0.27 | 0.27 | 0.27 |
| Phosphite Stab.; Irgafos 168 (%) | 0.08 | 0.08 | 0.08 | 0.08 | 0.08 | 0.08 | 0.08 | 0.08 |
| Hindered Phenol; Irgafos 1076 (%) | 0.04 | 0.04 | 0.04 | 0.04 | 0.04 | 0.04 | 0.04 | 0.04 |
| HDT, 0.45 MPa, 3.2 mm (° C.) | 174 | 157 | 164 | 158 | 164 | 165 | 160 | 161 |
| Energy to max load-avg (J) | 58 | 44 | 53 | 62 | 47 | 45 | 56 | 52 |
| Energy to failure-avg (J) | 61 | 47 | 56 | 64 | 50 | 47 | 59 | 54 |
| Energy, Total-avg (J) | 61 | 47 | 56 | 64 | 50 | 47 | 59 | 54 |
| Max Load-avg (kN) | 6.9 | 5.7 | 6.5 | 6.7 | 5.8 | 5.7 | 6.6 | 5.8 |
| Deflection at max load-avg (mm) | 18 | 15 | 17 | 19 | 15 | 15 | 18 | 15 |
| Ductility (%) | 0 | 0 | 0 | 60 | 20 | 20 | 0 | 40 |
| Melt density, 330° C., 2.17 kg (g/cm$^3$) | 1.11 | 1.11 | 1.11 | 1.11 | 1.11 | 1.11 | 1.11 | 1.11 |
| MVR, 330° C., 2.16 kg, 360 sec (cm$^3$/10 min) | 43.6 | 167 | 99.6 | 215 | 203 | 232 | 513 | 280 |
| MFR, 330° C., 2.16 kg, 360 sec (g/10 min) | 48 | 185 | 140 | 239 | 225 | 258 | 569 | 311 |
| Melt, vis 316° C., 5000 s$^{-1}$ (Pa-s) | 155 | 124 | 131 | 120 | 113 | 127 | 105 | 119 |
| Tg (° C.) | 182 | 175 | 175 | 175 | 175 | 183 | 165 | 168 |

Table 5 shows that compositions 26 and 28 exhibited significantly increased melt flow rates and lowered melt viscosities. At the same time, 26 and 28 demonstrated a maintenance of heat capability (e.g., see their values for HDT and Tg).

These compositions were made by powder to pellet conversion and compounding of experimental samples using a single screw lab line, S2. All ingredients were tumble-blended prior to compounding and fed using a single feeder to the extruder. The typical sample size for this extruder is 3 kg. Standard injection molding was done at 580° F. with 35 s cycle time. Abusive molding was done at 580° F. with 120 s cycle time.

TABLE 5

| | Composition | | |
|---|---|---|---|
| | 1 | 26 | 28 |
| PPPBP-PC-1 (%) | 63.75 | 85.00 | 85.00 |
| PC-4 (%) | 15.94 | | |
| PC-5 (%) | 19.92 | | |
| PC-6 (%) | | 9.61 | 7.61 |
| PBT-1 (%) | | 5.00 | 7.00 |
| PETS (%) | 0.27 | 0.27 | 0.27 |
| Phosphite Stab.; Irgafos 168 (%) | 0.08 | 0.08 | 0.08 |
| Hindered Phenol; Irgafos 1076 (%) | 0.04 | 0.04 | 0.04 |
| HDT, 0.45 MPa, 3.2 mm (° C.) | 165 | 164 | 160 |
| Energy to max load-avg (J) | 60 | 57 | 55.7 |
| Energy to failure-avg (J) | 62 | 58.1 | 58.9 |
| MAI Energy, Total-avg (J) | 62 | 58.4 | 59 |
| Max Load-avg (kN) | 7.2 | 5.8 | 6.6 |
| Deflection at max load-avg (mm) | 14 | 14.9 | 17.6 |
| Ductility (%) | 80 | 20 | 0 |
| MFR, 330° C., 2.16 kg, 360 sec (g/10 min) | 35 | 225 | 250 |
| Melt vis, 316° C., 5000 s$^{-1}$ (Pa-s) | 160 | 113 | 105 |
| Tg (° C.) | 175 | 175 | 165 | test with the highest rating of GT0 at both thicknesses. In addition, both 26 and 28 pass the corrosion test in a humid environment for up to 10 days.

TABLE 6

| | Composition | |
|---|---|---|
| | 26 | 28 |
| 3.0 mm metallized plaques | | |
| Haze onset at 160° C. (P/F) | P | P |
| Haze onset at 165° C. (P/F) | P | P |
| Haze onset at 170° C. (P/F) | F | F |
| Corrosion test | | |
| Cross hatch adhesion test (GT) | GT0 | GT0 |
| 2 days at 98% humidity (P/F) | P | P |
| 5 days at 98% humidity (P/F) | P | P |
| 10 days at 98% humidity (P/F) | P | P |
| 1.5 mm metallized plaques | | |
| Haze onset at 160° C. (P/F) | P | P |
| Haze onset at 165° C. (P/F) | P | P |
| Haze onset at 170° C. (P/F) | F | F |
| Corrosion test | | |
| Cross hatch adhesion test (GT) | GT0 | GT0 |
| 2 days at 98% humidity (P/F) | P | P |
| 5 days at 98% humidity (P/F) | P | P |
| 10 days at 98% humidity (P/F) | P | P |

Incorporation of the flow aid PBT with high temperature PC-8 was also investigated (Table 7), although this strategy to improve flow properties in this polycarbonate blend had limited success. Incorporation of PBT into the PC-8 blends lowered melt viscosity and improved melt flow rate with greater amounts of PBT. However, melt viscosities were higher than those observed for the corresponding PPPBP- PC-1 blends (Table 5), and heat capability is compromised significantly. Overall, the flow improvements demonstrated from modification of the PC-8 blend are much less pronounced than the improvements noted above in compositions 26 and 28.

TABLE 7

| | Composition | | | |
|---|---|---|---|---|
| | 30 | 31 | 32 | 33 |
| PC-8 (%) | 100 | 99 | 95 | 90 |
| PBT-1 (%) | | 1.0 | 5.0 | 10.0 |
| Melt Density, 330° C./2.17 kg (g/cm$^3$) | 1.15 | 1.15 | 1.15 | 1.15 |
| MVR, 330° C., 2.16 kg, 360 sec (cm$^3$/10 min) | 10.6 | 13.4 | 19.8 | 31 |
| MFR, 330° C., 2.16 kg, 360 sec (g/10 min) | 12 | 15 | 23 | 36 |
| Melt vis @ 316° C., 5000 s$^{-1}$ (Pa-s) | 218 | 198 | 140 | 78 |
| Tg (° C.) | 185 | 180 | 165 | 150 |
| Parallel Plate Viscosity Change (%) | −8.8 | −45 | −65 | −64 |

Table 8 shows PBT as a flow aid in blends with 68 wt % PPPBP-PC-1 and BPA polycarbonate produced by interfacial or melt polymerization. Melt viscosity is decreased similarly in blends with either interfacial or melt produced polycarbonate with the addition of 1.5% or 5% PBT. Heat deflection temperature is also similar with both types of polycarbonate in the corresponding blends with PBT, and notched Izod impact values are maintained in all blends.

TABLE 8

| | Composition | | | |
|---|---|---|---|---|
| | 34 | 35 | 36 | 37 |
| PPPBP-PC-1 (%) | 68 | 68 | 68 | 68 |
| PC-2 (%) | 30 | 27 | | |
| PC-7 (%) | | | 30 | 27 |
| PBT-1, milled (%) | 1.5 | 5 | 1.5 | 5 |
| Additives (%) | 0.4 | 0.4 | 0.4 | 0.4 |
| HDT, 0.45 MPa/Flat (° C.) | 161 | 153 | 161 | 152 |
| HDT, 1.8 MPa/Flat (° C.) | 148 | 140 | 148 | 139 |
| Melt vis, 300° C., 1500 s$^{-1}$ (Pa-s) | 326 | 261 | 316 | 250 |
| Melt vis, 300° C., 5000 s$^{-1}$ (Pa-s) | 152 | 125 | 146 | 124 |
| NII, 23° C., 3 mm (kJ/m$^2$), 5.5 J Pendulum | 9 | 8 | 8 | 8 |

Melt Viscosity was measured according to ISO11443; HDT was measured according to ISO75; NII was measured according to ISO180.

The balance between flow and impact properties of PPPBP-PC containing compositions were significantly improved by the addition of polysiloxane-polycarbonate copolymers. In addition, these improved compositions showed no loss in aesthetics, metallization properties, or heat. As such, compositions were obtained that have significantly improved impact performance properties at a given flow level, as show in in Tables 9-12.

Composition 40 including PPPBP-PC-1 and PC-Si-1, and composition 41 further including PC-3, both demonstrated similar visual appearance, crosshatch adhesion, and corrosion resistance compared to compositions including PPPBP-PC-1 and PC-1 and/or PC-2 (38, 39) (Table 9). Compositions 40 and 41 also have similar haze onset as compositions 38 and 39 at the same MVR level. These results demonstrate that inclusion of PC-siloxane copolymers in PPPBP-PC-1/PC blends does not have a negative effect on the metallization properties, while the flow/impact balance is improved.

TABLE 9

| | Composition | | | |
|---|---|---|---|---|
| | 38 | 39 | 40 | 41 |
| PPPBP-PC-1 (%) | 64 | 64 | 64 | 64 |
| PC-1 (%) | 16 | | | |
| PC-2 (%) | 20 | 36 | | |
| PC-3 (%) | | | | 18 |
| PC-Si-1 (%) | | | 36 | 18 |
| MVR (cm$^3$/10 min) | 9 | 11 | 9 | 12 |
| Visual appearance | OK | OK | OK | OK |
| Initial crosshatch (GT) | GT0 | GT0 | GT0 | GT0 |
| Corrosion test | | | | |
| 48 h visual | OK | OK | OK | OK |
| 5 days visual | OK | OK | OK | OK |
| 10 days visual | OK | OK | OK | OK |
| 10 days corrosion | 0% | 0% | 0% | 0% |
| 10 days crosshatch (GT) | GT0 | GT0 | GT0 | GT0 |
| 3.0 mm metallized plaques | | | | |
| Haze onset at 150° C., 1 h (P/F) | P | P | P | P |
| Haze onset at 155° C., 1 h (P/F) | P | P | P | P |
| Haze onset at 160° C., 1 h (P/F) | P | P | P | P |
| Haze onset at 165° C., 1 h (P/F) | P | Some haze | P | Some haze |
| Haze onset at 170° C., 1 h (P/F) | F | F | F | F |

Additional PPPBP-PC/PC-siloxane blends were produced to explore the effect of varying the amounts of PC-siloxane in the composition (Table 10). In all cases, heat properties were comparable to 42, a non-PC-siloxane containing blend. Significant improvements in NII and MAI (at low temp) strengths were observed upon incorporation of PC-Si-1 or PC-Si-2, especially at higher loadings.

TABLE 10

| | Composition | | | | | | | | |
|---|---|---|---|---|---|---|---|---|---|
| | 42 | 43 | 44 | 45 | 46 | 47 | 48 | 49 | 50 |
| PPPBP-PC-1 (%) | 64.0 | 64.0 | 64.0 | 64.0 | 64.0 | 64.0 | 64.0 | 64.0 | 64.0 |
| PC-1 (%) | 18.0 | | | | | | | | |
| PC-2 (%) | 17.6 | | | | | | | | |
| PC-3 (%) | | 35.6 | 18.0 | | 30.0 | 24.0 | 18.0 | 12.0 | 6.0 |
| PC-Si-1 (%) | | | 18.0 | 36.0 | | | | | |
| PC-Si-2 (%) | | | | | 6.0 | 12.0 | 18.0 | 24.0 | 30.0 |
| Additives (%) | 0.4 | 0.4 | 0.4 | 0.4 | 0.4 | 0.4 | 0.4 | 0.4 | 0.4 |
| MV 300° C./1500 s$^{-1}$ (Pa-s) | 396 | 280 | 310 | 340 | 276 | 293 | 281 | 323 | 332 |
| MV 300° C./5000 s$^{-1}$ (Pa-s) | 175 | 135 | 144 | 154 | 134 | 139 | 144 | 151 | 156 |
| Vicat B120 (° C.) | 173 | 171 | 172 | 174 | 172 | 174 | 173 | 174 | 175 |
| HDT, 0.45 MPa (° C.) | 165 | 165 | 165 | 165 | 164 | 164 | 166 | 166 | 166 |

TABLE 10-continued

| | Composition | | | | | | | | |
|---|---|---|---|---|---|---|---|---|---|
| | 42 | 43 | 44 | 45 | 46 | 47 | 48 | 49 | 50 |
| HDT, 1.8 MPa (° C.) | 153 | 151 | 149 | 149 | 150 | 150 | 149 | 149 | 149 |
| NII, 23° C. (kJ/m²) | 10 | 9 | 11 | 14 | 15 | 27 | 31 | 33 | 32 |
| NII, 0° C. (kJ/m²) | 9 | 7 | 11 | 12 | 12 | 18 | 24 | 29 | 29 |
| NII, −30° C. (kJ/m²) | 7 | 5 | 8 | 10 | 8 | 12 | 17 | 20 | 23 |
| MAI energy at max. force, 23° C. (J) | 107 | 109 | 99 | 112 | 117 | 128 | 104 | 105 | 109 |
| MAI, 23° C. ductility (%) | 100 | 60 | 100 | 100 | 100 | 100 | 100 | 100 | 100 |
| MAI energy at max. force, 0° C. (J) | 97 | 102 | 106 | 106 | 113 | 99 | 101 | 103 | 89 |
| MAI 0° C. ductility (%) | 0 | 0 | 0 | 100 | 0 | 20 | 100 | 100 | 100 |
| MAI energy at max. force, −30° C. (J) | 74 | 78 | 93 | 93 | 91 | 97 | 89 | 93 | 71 |
| MAI, −30° C. ductility (%) | 0 | 0 | 0 | 0 | 0 | 20 | 100 | 100 | 100 |

Melt Viscosity was measured according to ISO11443;
Vicat B120 was measured according to IS0306;
HDT was measured according to ISO75;
NII was measured according to ISO180;
MAI was measured according to ISO6603.

Compositions including the lower molecular weight PPPBP-PC-3 resin were evaluated, as shown in Table 11. Thermal properties decreased by a few degrees Celsius compared to the corresponding composition including PPPBP-PC-1. The compositions including PC-siloxane showed significant improvements in Izod notched impact and multi axial impact (at low temp), especially at higher loadings. By changing to a lower molecular weight PPPBP-PC resin, a significant improvement in flow was observed.

TABLE 11

| | Composition | | | | | | | | | | | |
|---|---|---|---|---|---|---|---|---|---|---|---|---|
| | 42 | 51 | 52 | 53 | 54 | 55 | 56 | 57 | 58 | 59 | 60 | 61 |
| PPPBP-PC-1 (%) | 64.0 | | | | | | | | | | | |
| PPPBP-PC-3 (%) | | 64.0 | 64.0 | 64.0 | 64.0 | 64.0 | 64.0 | 64.0 | 64.0 | 64.0 | 64.0 | 64.0 |
| PC-1 (%) | 18.0 | | | | | | | | | | | |
| PC-2 (%) | 17.6 | 36.0 | 18.0 | | | 24.0 | 18.0 | 12.0 | | | | 9.0 |
| PC-3 (%) | | | | 18.0 | | | | | 24.0 | 18.0 | 12.0 | 9.0 |
| PC-Si-1 | | | 18.0 | 18.0 | 36.0 | | | | | | | |
| PC-Si-2 | | | | | | 12.0 | 18.0 | 24.0 | 12.0 | 18.0 | 24.0 | 18.0 |
| Additives (%) | 0.4 | 0.4 | 0.4 | 0.4 | 0.4 | 0.4 | 0.4 | 0.4 | 0.4 | 0.4 | 0.4 | 0.4 |
| MV 300° C./1500 s⁻¹ (Pa-s) | 396 | 181 | 232 | 209 | 241 | 243 | 243 | 249 | 215 | 225 | 233 | 234 |
| MV 300° C./5000 s⁻¹ (Pa-s) | 175 | 107 | 117 | 107 | 117 | 118 | 119 | 119 | 109 | 111 | 112 | 114 |
| Vicat B120 (° C.) | | 168 | 169 | 169 | 169 | 170 | 171 | 172 | 169 | 170 | 171 | 170 |
| HDT, 0.45 MPa (° C.) | 165 | 163 | 163 | 163 | 163 | 163 | 164 | 164 | 162 | 164 | 165 | 164 |
| HDT, 1.8 MPa (° C.) | 153 | 150 | 149 | 149 | 147 | 148 | 149 | 148 | 148 | 150 | 152 | 148 |
| NII, 23° C. (kJ/m2) | 10 | 8 | 10 | 9 | 13 | 25 | 34 | 34 | 21 | 30 | 33 | 33 |
| NII, 0° C. (kJ/m2) | 9 | 8 | 9 | 9 | 11 | 18 | 28 | 30 | 16 | 24 | 29 | 25 |
| NII, −30° C. (kJ/m2) | 7 | 8 | 9 | 9 | 9 | 13 | 18 | 22 | 12 | 17 | 21 | 18 |
| MAI energy at max. force, 23° C. (J) | 107 | 55 | 75 | 96 | 101 | 95 | 88 | 107 | 114 | 107 | 99 | 108 |
| MAI, 23° C. ductility (%) | 100 | 0 | 80 | 80 | 100 | 100 | 100 | 100 | 100 | 100 | 100 | 100 |
| MAI energy at max. force, 0° C. (J) | 97 | 15 | 82 | 82 | 90 | 94 | 83 | 88 | 100 | 65 | 86 | 79 |
| MAI, 0° C. ductility (%) | 0 | 0 | 0 | 0 | 60 | 0 | 100 | 100 | 0 | 100 | 100 | 100 |
| MAI energy at max. force, −30° C. (J) | 74 | 19 | 51 | 53 | 72 | 75 | 86 | 85 | 66 | 90 | 87 | 75 |
| MAI, −30° C. ductility (%) | 0 | 0 | 0 | 0 | 0 | 0 | 0 | 80 | 0 | 60 | 0 |

TABLE 11-continued

| | Composition | | | | | | | | | | | |
|---|---|---|---|---|---|---|---|---|---|---|---|---|
| | 42 | 51 | 52 | 53 | 54 | 55 | 56 | 57 | 58 | 59 | 60 | 61 |

Metallization test: 1.5 mm metallized plaques

| | | | | | | | | | | | | |
|---|---|---|---|---|---|---|---|---|---|---|---|---|
| Passes haze onset test at (° C.) | 160 | | | | | | | | | | | |
| Crosshatch adhesion test (GT) | GT0 | | | | | | | | | | | |
| Corrosion test, 10 d, 98% rel. hum. (%) | 0 | | | | | | | | | | | |

Melt Viscosity was measured according to ISO11443;
Vicat B120 was measured according to IS0306;
HDT was measured according to ISO75;
NII was measured according to ISO180;
MAI was measured according to ISO6603.

Table 12 shows that compositions including 45 wt % PPPBP-PC-1 and a PC-siloxane retained heat properties comparable to the non-PC-siloxane containing composition 62. Upon inclusion of PC-Si-1 or PC-Si-2, the Vicat B120 softening temperature is not affected. Significant improvements in Izod notched impact and multi axial impact (at low temp) for PC-Si-1 and PC-Si-2 are noted, especially at higher loadings. These compositions additionally retained or improved flow properties (MVR). Ultimately, in both the 64% PPPBP-PC-1 modified compositions and 45% PPPBP-PC-1 compositions, the incorporation of PC-siloxane (either PC-Si-1 or PC-Si-2) provided significant improvement in impact-flow balance, while retaining heat.

TABLE 12

| | Composition | | | | | | | | | | |
|---|---|---|---|---|---|---|---|---|---|---|---|
| | 62 | 63 | 64 | 65 | 66 | 67 | 68 | 69 | 70 | 71 | 72 |
| PPPBP-PC-1 (%) | 45.0 | 45.0 | 45.0 | 45.0 | 45.0 | 45.0 | 45.0 | 45.0 | 45.0 | 45.0 | 45.0 |
| PC-1 (%) | 20.0 | | | | | | | | | | |
| PC-2 (%) | 35.0 | | | | | | | | | | |
| PC-3 (%) | | 55.0 | 37.0 | 19.0 | | 49.0 | 44.2 | 43.0 | 38.5 | 37.0 | 31.0 |
| PC-Si-1 | | | 18.0 | 36.0 | 55.0 | | | | | | |
| PC-Si-2 | | | | | | 6.0 | 10.8 | 12.0 | 16.5 | 18.0 | 24.0 |
| Additives (%) | 0.4 | 0.4 | 0.4 | 0.4 | 0.4 | 0.4 | 0.4 | 0.4 | 0.4 | 0.4 | 0.4 |
| MV 300° C./1500 s$^{-1}$ (Pa-s) | 294 | 141 | 199 | 229 | 265 | 188 | 199 | 201 | 210 | 213 | 226 |
| MV 300° C./5000 s$^{-1}$ (Pa-s) | | | 104 | 113 | | 103 | 103 | 103 | 108 | 110 | 112 |
| Vicat B120 (° C.) | 160 | 161 | 161 | 161 | 161 | 161 | 161 | 161 | 162 | 162 | 163 |
| HDT, 0.45 MPa (° C.) | 154 | 154 | 154 | 155 | 154 | 154 | 155 | 155 | 155 | 155 | 156 |
| HDT, 1.8 MPa (° C.) | 141 | 140 | 140 | 139 | 141 | 141 | 141 | 140 | 141 | 140 | 143 |
| NII, 23° C. (kJ/m2) | 10 | 9 | 13 | 17 | 27 | 15 | 33 | 35 | 37 | 39 | 38 |
| NII, 0° C. (kJ/m2) | 8 | 7 | 12 | 15 | 18 | 11 | 20 | 21 | 34 | 33 | 35 |
| NII, −30° C. (kJ/m2) | 7 | 5 | 7 | 12 | 13 | 8 | 14 | 14 | 18 | 19 | 28 |
| MAI energy at max. force, 23° C. (J) | 129 | 91 | 104 | 102 | 101 | 116 | 117 | 116 | 127 | 117 | 112 |
| MAI, 23° C. ductility (%) | 100 | 60 | 100 | 100 | 100 | 100 | 100 | 100 | 100 | 100 | 100 |
| MAI energy at max. force, 0° C. (J) | 131 | 83 | 105 | 113 | 117 | 116 | 116 | 115 | 124 | 111 | 100 |
| MAI, 0° C. ductility (%) | 100 | 0 | 40 | 100 | 100 | 40 | 100 | 100 | 100 | 100 | 100 |
| MAI energy at max. force, −30° C. (J) | 122 | 64 | 104 | 102 | 95 | 94 | 100 | 102 | 111 | 94 | 110 |
| MAI, −30° C. ductility (%) | 0 | 0 | 0 | 20 | 100 | 0 | 0 | 0 | 60 | 100 | 100 |

Melt Viscosity was measured according to ISO11443;
Vicat B120 was measured according to IS0306;
HDT was measured according to ISO75;
NII was measured according to ISO180;
MAI was measured according to ISO6603.

Table 13 shows that incorporation of PDMS in the PPPBP-PC blends resulted in negative aesthetic issues on molded parts, which may result in failures upon metallization (visual appearance). In addition, impact properties significantly deteriorated, especially at the higher loading of PDMS (composition 76). Incorporation of PMPS yielded no aesthetic issues, but resulted in significant deterioration of Izod impact properties (compositions 77 and 78).

TABLE 13

|  | Composition | | | | | |
| --- | --- | --- | --- | --- | --- | --- |
|  | 73 | 74 | 75 | 76 | 77 | 78 |
| PPPBP-PC-1 (%) | 64 | 64 | 64 | 64 | 64 | 64 |
| PC-3 (%) | 34.591 | 33.626 | 34.591 | 33.626 | 33.768 | 31.998 |
| Silicon oil (1000 cps) | 0.989 | 1.954 | | | | |
| PDMS (100 cps) | | | 0.989 | 1.954 | | |
| PMPS | | | | | 1.812 | 3.582 |
| Additives | 0.42 | 0.42 | 0.42 | 0.42 | 0.42 | 0.42 |
| HDT, 0.45 MPa (° C.) | 166 | 165 | 165 | 166 | 160 | 160 |
| Vicat B120 (° C.) | 168 | 170 | 168 | 163 | 158 | 158 |
| NII, 23° C. (kJ/m$^2$) | 9.6 | 10.7 | 10.4 | 9.6 | 8.0 | 8.0 |
| NII, 0° C., 3 mm (kJ/m$^2$) | 9.0 | 10.3 | 9.9 | 9.1 | 6.8 | 6.8 |
| NII, −30° C., 3 mm (kJ/m$^2$) | 7.0 | 8.1 | 8.1 | 8.5 | 4.5 | 4.5 |
| MAI 23° C. ductility (%) | | 40 | 0 | 20 | 100 | 100 |
| MAI 23° C. energy (J) | | 64.4 | 102 | 3.9 | 114 | 114 |
| MAI 0° C. energy (J) | 96 | 6.7 | 91 | 6.2 | 100 | 100 |
| MAI −30° C. energy (J) | 90 | 6.3 | 74 | 3.2 | 65 | 65 |
| MVR, 300° C., 2.16 kg, 300 sec (cm$^3$/10 min) | 17.1 | 14.8 | 9.5 | 15.7 | 19.4 | 19.4 |

MVR was measured according to ISO1133;
Vicat B120 was measured according to IS0306;
HDT was measured according to ISO75;
NII was measured according to ISO180;
MAI was measured according to ISO6603.

Table 14 shows that impact modifier systems such as ABS/SAN, MBS/SAN, Bulk ABS and silicone acrylics were used to improve the impact/flow balance. Although it was possible to improve these properties, the metallization of molded parts based on these compositions were not acceptable ("NOK").

TABLE 14

|  | Composition | | | | |
| --- | --- | --- | --- | --- | --- |
|  | 48 | 79 | 80 | 81 | 82 |
| PPPBP-PC-1 (%) | 64 | 64 | 64 | 64 | 64 |
| PC-3 (%) | 18 | 30 | 21 | 21 | 16 |
| PC-Si-2 (%) | 18 | | | | |
| Kane Ace MR02 (%) | | 6 | | | |
| ABS (%) | | | 7 | | |
| MBS, powder (%) | | | | 5 | |
| SAN (%) | | | 8 | 10 | |
| Bulk ABS (%) | | | | | 20 |
| MVR 300° C./2.16 kg (300 s) (ml/10° C.) | 9 | 12 | 16 | 13 | 18 |
| MVR 300° C./2.16 kg (1080 s) (ml/10° C.) | 13 | 12 | 19 | 17 | 24 |
| MVR 330° C./2.16 kg (300 s) (ml/10° C.) | 33 | 34 | 56 | 49 | 81 |
| MV 300° C./1500 s$^{-1}$ (Pa-s) | 281 | 302 | 165 | 154 | 117 |
| MV 300° C./5000 s$^{-1}$ (Pa-s) | 144 | 136 | 79 | 76 | 58 |
| Vicat B120 (° C.) | — | — | — | — | — |
| HDT, 0.45 MPa (° C.) | 166 | 163 | 165 | 164 | 165 |
| NII, 23° C. (kJ/m$^2$) | 31 | 25 | 17 | 22 | 13 |
| NII, 0° C. (kJ/m$^2$) | 24 | 18 | 13 | 13 | 10 |
| MAI energy at max. force, 23° C. (J) | 104 | 87 | 125 | 120 | 105 |
| MAI, 23° C. ductility (%) | 100 | 100 | 100 | 100 | 20 |
| MAI energy at max. force, 0° C. (J) | 101 | 65 | 100 | 107 | 99 |
| MAI, 0° C. ductility (%) | 100 | 60 | 40 | 100 | 0 |
| 1.5 mm metallized plaques | | | | | |
| Visual inspection | OK | NOK | NOK | NOK | NOK |
| L* | 10 | 73 | 25 | 24 | 40 |
| Defect | — | Haze | Haze | Haze | Haze |

MVR was measured according to ISO1133; Melt Viscosity was measured according to ISO11443; Vicat B120 was measured according to IS0306; HDT was measured according to ISO75; NII was measured according to ISO180; MAI was measured according to ISO6603.

The flow properties of PPPBP-PC compositions were also improved by lowering the molecular weight of the accompanying BPA polycarbonate resins in the blends. By implementation of this lower molecular weight polycarbonate resin approach, compositions were obtained that have improved impact properties.

Table 15 summarizes the compositions made by this approach, as well as their performance under a variety of experimental conditions. Replacing high molecular weight polycarbonate (PC-1) with lower molecular weight polycarbonate (PC-2, PC-3, or PC-7) improved flow properties, and heat properties were maintained relative to composition 42. Composition 43 showed a slight decrease in room temperature ductility, however, impact performance was improved or comparable to 42 for the remaining compositions. Decreasing the amount of PPPBP-PC-1 copolymer resulted in an improvement of flow properties accompanied by a worsening of heat properties (compositions 85 and 86). The opposite effect was observed when the amount of PPPBP-PC-1 was increased (compositions 87-89). These results also showed that incorporation of a lower molecular weight polycarbonate does not have an influence on metallization performance of the composition.

sition 42, however, composition 97 showed a decrease in room temperature ductility. Taken together, these results

TABLE 15

| | Composition | | | | | | | | |
|---|---|---|---|---|---|---|---|---|---|
| | 42 | 83 | 43 | 84 | 85 | 86 | 87 | 88 | 89 |
| PPPBP-PC-1 (%) | 64.0 | 64.0 | 64.0 | 64.0 | 60.0 | 60.0 | 68.0 | 68.0 | 72.0 |
| PC-1 (%) | 18.0 | | | | | | | | |
| PC-2 (%) | 17.6 | 35.6 | | | 39.6 | | 31.6 | | |
| PC-3 (%) | | | 35.6 | | | 39.6 | | 31.6 | 27.6 |
| PC-7 (%) | | | | 35.6 | | | | | |
| Additives (%) | 0.4 | 0.4 | 0.4 | 0.4 | 0.4 | 0.4 | 0.4 | 0.4 | 0.4 |
| MV 300° C./1500 $s^{-1}$ (Pa-s) | 396 | 345 | 280 | 306 | 327 | 274 | 368 | 322 | 337 |
| MV 300° C./5000 $s^{-1}$ (Pa-s) | 175 | 157 | 135 | — | 151 | 130 | 166 | 151 | 157 |
| Vicat B120 (° C.) | 173 | 173 | 171 | 168 | 171 | 169 | 175 | 173 | 176 |
| HDT, 0.45 MPa (° C.) | 165 | 166 | 165 | 162 | 162 | 159 | 167 | 166 | 169 |
| HDT, 1.8 MPa (° C.) | 153 | 153 | 151 | 149 | 150 | 149 | 154 | 153 | 154 |
| NII, 23° C. (kJ/$m^2$) | 10 | 10 | 9 | 9 | 10 | 10 | 10 | 9 | 9 |
| NII, 0° C. (kJ/$m^2$) | 9 | 7 | 7 | 8 | 10 | 9 | 8 | 8 | 8 |
| NII, −30° C. (kJ/$m^2$) | 7 | 8 | 6 | 5 | 6 | 6 | 7 | 5 | 6 |
| MAI energy at max. force, 23° C. (J) | 107 | 127 | 109 | 118 | 128 | 120 | 125 | 112 | 119 |
| MAI, 23° C. ductility (%) | 100 | 100 | 60 | 100 | 100 | 100 | 100 | 90 | 100 |
| MAI energy at max. force, 0° C. (J) | 97 | 111 | 102 | 94 | 123 | 103 | 104 | 94 | 102 |
| MAI, 0° C. ductility (%) | 0 | 0 | 0 | 0 | 80 | 0 | 0 | 0 | 0 |
| Metallization test: 3.0 mm metallized plaques | | | | | | | | | |
| Passes haze onset test at (° C.) | 165 | 165 | 165 | — | 160 | 160 | 165 | 165 | 170 |
| Crosshatch adhesion test (GT) | GT0 | GT0 | GT0 | — | GT0 | GT0 | GT0 | GT0 | GT0 |
| Corrosion test; 10 d, 98% rel. hum. (%) | 0 | 0 | 0 | — | 0 | 0 | 0 | 0 | 0 |
| Metallization test: 1.5 mm metallized plaques | | | | | | | | | |
| Passes haze onset test at (° C.) | 160 | 160 | 160 | — | 155 | 155 | 165 | 160 | 165 |
| Crosshatch adhesion test (GT) | GT0 | GT0 | GT0 | — | GT0 | GT0 | GT0 | GT0 | GT0 |
| Corrosion test, 10 d, 98% rel. hum. (%) | 0 | 0 | 0 | — | 0 | 0 | 0 | 0 | 0 |

Melt Viscosity was measured according to ISO11443;
Vicat B120 was measured according to ISO306;
HDT was measured according to ISO75;
NII was measured according to ISO180;
MAI was measured according to ISO6603.

Table 16 shows that an increase in melt flow was also achieved by the employment of lower molecular weight PPPBP-BPA copolymer (17 k or 20 k) in the blends. Compositions containing lower molecular weight PPPBP copolymer were evaluated in comparison to the corresponding compositions containing 23 k molecular weight PPPBP.

Impact properties of the lower molecular weight compositions are not adversely affected in comparison to compodemonstrated that by lowering the molecular weight of the PPPBP-PC copolymer, flow properties were improved and heat and impact properties were maintained. In addition, these results also demonstrated that replacing the higher molecular weight PC-1 with the lower molecular weight PC-2 or PC-3 improved flow properties (see trends of compositions 92-94 and 95-97).

TABLE 16

| | Composition | | | | | | | | | |
|---|---|---|---|---|---|---|---|---|---|---|
| | 42 | 90 | 91 | 92 | 93 | 94 | 95 | 96 | 97 | 98 |
| PPPBP-PC-1 (%) | 64.0 | 64.0 | 64.0 | | | | | | | |
| PPPBP-PC-2 (%) | | | | 64.0 | 64.0 | 64.0 | | | | |
| PPPBP-PC-3 (%) | | | | | | | 64.0 | 64.0 | 64.0 | 65.0 |
| PC-1 (%) | 18.0 | 35.6 | | 35.6 | | | 35.6 | | | |
| PC-2 (%) | 17.6 | | 35.6 | | 35.6 | | | 35.6 | | |
| PC-3 (%) | | | | | | 35.6 | | | 35.6 | |
| PC-4 (%) | | | | | | | | | | 15.4 |
| PC-6 (%) | | | | | | | | | | 19.2 |
| Additives (%) | 0.4 | 0.4 | 0.4 | 0.4 | 0.4 | 0.4 | 0.4 | 0.4 | 0.4 | 0.4 |
| MV 300° C./1500 $s^{-1}$ (Pa-s) | 396 | 481 | 369 | 413 | 301 | 226 | 341 | 257 | 191 | 205 |

TABLE 16-continued

| | Composition | | | | | | | | | |
|---|---|---|---|---|---|---|---|---|---|---|
| | 42 | 90 | 91 | 92 | 93 | 94 | 95 | 96 | 97 | 98 |
| MV 300° C./5000 s$^{-1}$ (Pa-s) | 175 | — | 167 | 179 | 143 | 116 | 150 | 126 | 100 | 112 |
| Vicat B120 (° C.) | 173 | 173 | 172 | 172 | 170 | 169 | 171 | 170 | 168 | 172 |
| HDT, 0.45 MPa (° C.) | 165 | 165 | 166 | 166 | 162 | 163 | 165 | 164 | 161 | 164 |
| HDT, 1.8 MPa (° C.) | 153 | 152 | 154 | 154 | 152 | 152 | 153 | 152 | 151 | — |
| NII, 23° C. (kJ/m$^2$) | 10 | 11 | 10 | 10 | 9 | 9 | 9 | 9 | 7 | — |
| NII, 0° C. (kJ/m$^2$) | 9 | 10 | 9 | 9 | 9 | 7 | 8 | 8 | 6 | — |
| NII, −30° C. (kJ/m$^2$) | 7 | 9 | 7 | 7 | 4 | 3 | 5 | 3 | 2 | — |
| MAI energy at max. force, 23° C. (J) | 107 | 144 | 142 | 134 | 135 | 126 | 130 | 124 | 92 | — |
| MAI, 23° C. ductility (%) | 100 | 100 | 100 | 100 | 100 | 100 | 100 | 100 | 20 | — |
| MAI energy at max. force, 0° C. (J) | 97 | 116 | 90 | 117 | 126 | 122 | 122 | 187 | 110 | — |
| MAI 0° C. ductility (%) | 0 | 20 | 0 | 0 | 20 | 0 | 20 | 0 | 0 | — |
| Metallization test: 1.5 mm metallized plaques | | | | | | | | | | |
| Passes haze onset test at (° C.) | 160 | 165 | 160 | 165 | 160 | 160 | 165 | 160 | 160 | 160 |
| Crosshatch adhesion test (GT) | GT0 | GT0 | GT0 | GT0 | GT0 | GT0 | GT0 | GT0 | GT0 | GT0 |
| Corrosion test, 10 d, 98% rel. hum. (%) | 0 | 0 | 0 | 0 | 0 | 0 | 0 | 0 | 0 | 0 |

Melt Viscosity was measured according to ISO11443;
Vicat B120 was measured according to ISO306;
HDT was measured according to ISO75;
NII was measured according to ISO180;
MAI was measured according to ISO6603.

Table 17 shows the combination of PPPBP-PC-3 with a variety of polycarbonates and/or additives. The most significant flow increase without a concurrent loss of melt stability and heat capability was observed with compositions 101 and 102. These blends also maintained impact strength. Incorporation of PC-4 (100) resulted in the melt viscosity and flow unimproved—yet still improved compared to 1 (standard, MV=160 Pa*s under same conditions). Compositions including 65% of the PPPBP-PC-3 and 1-2% PBT (compositions 103-106) displayed poor melt stability, as demonstrated by the loss of 30-58% viscosity (at 316° C., 1800 seconds).

The performance properties of compositions 101 and 102 are shown in Table 18. These findings reinforced the previous results demonstrating that melt flow properties are improved when PPPBP-PC-1 is replaced with PPPBP-PC-3, and are further improved by blending with additional lower molecular weight polycarbonates. For example, a decrease in high shear melt viscosity was observed for compositions 99, 101, and 102 (111, 100, and 96 Pa-s, respectively) by blending lower molecular weight polycarbonates with PPPBP-PC-3. In addition, heat is unchanged as the glass transition temperatures of the blends are maintained at 171-172° C.

TABLE 17

| | Composition | | | | | | | |
|---|---|---|---|---|---|---|---|---|
| | 99 | 100 | 101 | 102 | 103 | 104 | 105 | 106 |
| PPPBP-PC-3 (%) | 63.75 | 65.00 | 65.00 | 65.00 | 65.00 | 65.00 | 65.00 | 65.00 |
| PC-4 (%) | 15.38 | 34.61 | | 15.38 | 33.61 | 32.61 | | |
| PC-5 (%) | 19.23 | | 34.61 | | | | 33.61 | 32.61 |
| PC-6 (%) | | | | 19.23 | | | | |
| PBT-1 | | | | | 1.0 | 2.0 | 1.0 | 2.0 |
| PETS (%) | 0.27 | 0.27 | 0.27 | 0.27 | 0.27 | 0.27 | 0.27 | 0.27 |
| Phosphite Stab.; Irgafos 168 (%) | 0.08 | 0.08 | 0.08 | 0.08 | 0.08 | 0.08 | 0.08 | 0.08 |
| Hindered Phenol; Irgafos 1076 (%) | 0.04 | 0.04 | 0.04 | 0.04 | 0.04 | 0.04 | 0.04 | 0.04 |
| MVR, 330° C., 2.16 kg, (cm$^3$/10 min) | 54 | 43 | 71 | 66 | 52 | 81 | 83 | 98 |
| Melt vis, 316° C., 5000 s$^{-1}$ (Pa-s) | 111 | 128 | 100 | 103 | 120 | 98 | 88 | 85 |
| Tg (° C.) | 172 | 175 | 171 | 172 | 172 | 168 | 168 | 165 |
| MAI total energy (J) | 78 | 77 | 69 | 72 | 75 | 64 | 70 | 71 |
| MAI abusive total energy (J) | 67 | 74 | 68 | 65 | 67 | 71 | 63 | 65 |
| Viscosity Change 316° C., 5000 s (%) | −11 | −14 | −5 | −10 | −30 | −58 | −37 | −53 |

TABLE 18

| | Composition | | |
|---|---|---|---|
| | 99 | 101 | 102 |
| HDT, 0.45 MPa, 3.2 mm (° C.) | | 163 | 163 |
| Standard Molding | | | |
| Energy to max load-avg (J) | 75 | 65 | 68 |
| Energy to failure-avg (J) | 78 | 69 | 72 |
| MAI Energy, Total-avg (J) | 78 | 72 | 69 |
| Max Load-avg (kN) | 7.6 | 7.3 | 7.3 |
| Deflection at max load-avg (mm) | 20.1 | 19.2 | 18.7 |
| Ductility (%) | 100 | 60 | 80 |
| Abusive Molding | | | |
| Energy to max load-avg (J) | 64 | 61 | 64 |
| Energy to failure-avg (J) | 67 | 65 | 68 |
| MAI Energy, Total-avg (J) | 67 | 65 | 68 |
| Max Load-avg (kN) | 7.1 | 6.9 | 7.1 |
| Deflection at max load-avg (mm) | 18.8 | 18.5 | 18.8 |
| Ductility (%) | 80 | 80 | 20 |
| MFR, 330° C., 2.16 kg, 360 sec (g/10 min) | | 73 | 83 |
| MVR, 330° C., 2.16 kg, 360 sec (cm³/10 min) | 54 | 66 | 71 |
| Melt vis @ 316° C., 5000 s⁻¹ (Pa-s) | 111 | 100 | 96 |
| Tg (° C.) | 172 | 172 | 171 |

Table 19 shows that 101 and 102 passed the haze onset at 3.0 mm (165° C.), cross hatch adhesion, and corrosion tests for both natural and black materials. For 1.5 mm samples, a small mold defect appeared, and the sample of composition 101 with natural color had a small corrosion spot after 10 days of hydro aging.

TABLE 19

| | Composition | | | |
|---|---|---|---|---|
| | 101 - Natural | 101 - Black | 102 - Natural | 102 - Black |
| 3.0 mm metallized plaques | | | | |
| Haze onset at 160° C. (P/F) | P | P | P | P |
| Haze onset at 160° C. (P/F) | P | P | P | P |
| Haze onset at 160° C. (P/F) | F | F | F | F |
| Cross hatch adhesion test (GT) | GT0 | GT0 | GT0 | GT0 |
| Corrosion test | | | | |
| 2 days at 98% humidity (P/F) | P | P | P | P |
| 5 days at 98% humidity (P/F) | P | P | P | P |
| 10 days at 98% humidity (P/F) | P | P | P | P |
| 1.5 mm metallized plaques | | | | |
| Haze onset at 160° C. (P/F) | P | P | P | P |
| Haze onset at 165° C. (P/F) | P | P | F | P |
| Haze onset at 170° C. (P/F) | F | F | F | F |
| Cross hatch adhesion test (GT) | GT0 | GT0 | GT0 | GT0 |
| Corrosion test | | | | |
| 2 days at 98% humidity (P/F) | P | P | P | P |
| 5 days at 98% humidity (P/F) | P | P | P | P |
| 10 days at 98% humidity (P/F) | 6% | P | P | P |

Further modification of compositions 101 and 102 was achieved by replacing the PPPBP-PC-3 with PPPBP-PC-2 in the blends. The performance properties of these blends are shown in Table 20. Impact properties (MAI) are maintained under both standard and abusive molding conditions while flow properties are improved (increased MVR, increased MFR, decreased high shear melt viscosity) compared to 1.

TABLE 20

| | Composition | | |
|---|---|---|---|
| | 106 | 107 | 108 |
| PPPBP-PC-2 (%) | 65 | 65 | 65 |
| PC-4 (%) | 15.38 | | 15.38 |
| PC-5 (%) | 19.23 | | |
| PC-6 (%) | | 34.61 | 19.23 |
| PETS (%) | 0.27 | 0.27 | 0.27 |
| Phosphite Stab.; Irgafos 168 (%) | 0.08 | 0.08 | 0.08 |
| Hindered Phenol; Irgafos 1076 (%) | 0.04 | 0.04 | 0.04 |
| Standard Molding | | | |
| Energy to max load-avg (J) | 70 | 68 | 70 |
| Energy to failure-avg (J) | 73 | 71 | 73 |
| MAI Energy, Total-avg 23° C. (J) | 73 | 71 | 73 |
| MAI Energy, Total-avg 0° C. (J) | 70 | 71 | 76 |
| Max Load-Avg (kN) | 7.4 | 7.2 | 7.3 |
| Deflection at max load-avg (mm) | 19.6 | 19.5 | 19.7 |
| Ductility 23° C. (%) | 100 | 100 | 100 |
| Ductility 0° C. (%) | 40 | 80 | 100 |
| Abusive Molding | | | |
| Energy to max load-avg (J) | 70 | 58 | 66 |
| Energy to failure-avg (J) | 73 | 60 | 70 |
| MAI Energy, Total-avg 23° C. (J) | 73 | 61 | 70 |
| MAI Energy, Total-avg 0° C. (J) | 70 | 74 | 69 |
| Max Load-avg (kN) | 7.4 | 6.2 | 7.2 |
| Deflection at max load-avg (mm) | 19.7 | 17 | 19.2 |
| Ductility 23° C. (%) | 80 | 60 | 80 |
| Ductility 0° C. (%) | 40 | 80 | 50 |
| MVR, 330° C., 2.16 kg, 360 sec (cm³/10 min) | 41 | 49 | 50 |
| MFR, 330° C., 2.16 kg, 360 sec (g/10 min) | 42 | 54 | 57 |
| Melt vis, 316° C., 5000 s⁻¹ (Pa-s) | 133 | 124 | 120 |
| Tg (° C.) | 175 | 172 | 171 |
| HDT (° C.) | 165 | 165 | 165 |

Properties of blends with PPPBP-PC-1 and PPPBP-PC-4 are shown in Table 21. The decrease in mol % PPPBP in a copolymer of the same Mw did not result in significant changes in properties, showing that molecular weight is controlling melt flow properties. Melt flow rate did not increase when PPPBP-PC-1 was replaced with PPPBP-PC-4. Melt viscosity at 5000 s⁻¹ increased slightly to 166 Pa*s when PPPBP-PC-1 was replaced with PPPBP-PC-4. Heat deflection temperature and Tg did not change significantly when PPPBP-PC-1 was replaced with PPPBP-PC-4. Multi Axial Impact, Total Energy of 72-74 J and 100% ductility were maintained under standard molding conditions when PPPBP-PC-1 was replaced with PPPBP-PC-4. Multi Axial Impact, Total Energy of 74-75 J and 100% ductility were maintained under abusive molding conditions when PPPBP-PC-1 was replaced with PPPBP-PC-4.

TABLE 21

| | Composition | |
|---|---|---|
| | 1 | 109 |
| PPPBP-PC-1 (%) | 63.75 | |
| PPPBP-PC-4 (%) | | 63.75 |
| PC-4 (%) | 15.94 | 15.94 |
| PC-5 (%) | 19.92 | 19.92 |
| PETS (%) | 0.27 | 0.27 |
| Phosphite Stab.; Irgafos 168 (%) | 0.08 | 0.08 |
| Hindered Phenol; Irgafos 1076 (%) | 0.04 | 0.04 |
| MFR, 330° C., 2.16 kg (g/10 min) | 34 | 31 |
| Melt. vis 316° C., 5000 s⁻¹ (Pa-s) | 162 | 166 |

TABLE 21-continued

|  | Composition | |
|---|---|---|
|  | 1 | 109 |
| HDT, (° C.) | 168 | 167 |
| Tg (° C.) | 175 | 175 |
| Standard Molding | | |
| MAI Total Energy, 23° C. (J) | 72 | 74 |
| Ductility (%) | 100 | 100 |
| Abusive Molding | | |
| MAI Total Energy, 23° C. (J) | 75 | 74 |
| Ductility (%) | 100 | 100 |

Table 22 shows properties of blends with 45 wt % PPPBP-PC-3 and 55 wt % of polycarbonate components. The melt flow rate increased from 43 to 72 g/10 min when PPPBP-PC-1 was replaced with PPPBP-PC-3, and further increased to 93 g/10 min by blending with lower Mw BPA polycarbonate resins. The MVR increased from 40 cm$^3$/10 min to 68 cm$^3$/10 min when PPPBP-PC-1 was replaced with PPPBP-PC-3, and was further increased to 87-89 cm$^3$/10 min by blending with lower Mw BPA polycarbonates. A decrease occurred in high shear melt viscosity (measured at 5000 s$^{-1}$) from 133 to 101 Pa-s with PPPBP-PC-3, and further decreased to 84-88 Pa-s in blends of PPPBP-PC-3 with lower Mw BPA polycarbonate. Tg was maintained at 165-167° C. for blends with PPPBP-PC-3, and 160-162° C. for blends with lower Mw polycarbonates. HDT was maintained at 154-155° C. for all blends with PPPBP-PC-3. Multi Axial Impact, Total Energy of 68-72 J and 100% ductility were maintained under standard molding conditions when PPPBP-PC-1 was replaced with PPPBP-PC-3.

TABLE 22

|  | Composition | | | |
|---|---|---|---|---|
|  | 110 | 111 | 112 | 113 |
| PPPBP-PC-1 (%) | 45 | | | |
| PPPBP-PC-3 (%) | | 45 | 45 | 45 |
| PC-4 (%) | 17.92 | 17.92 | 17.92 | |
| PC-5 (%) | 36.86 | 36.86 | | 54.78 |
| PC-6 (%) | | | 36.86 | |
| PETS (%) | 0.27 | 0.27 | 0.27 | 0.27 |
| Phosphite Stab.; Irgafos 168 (%) | 0.08 | 0.08 | 0.08 | 0.08 |

TABLE 22-continued

|  | Composition | | | |
|---|---|---|---|---|
|  | 110 | 111 | 112 | 113 |
| Hindered Phenol; Irgafos 1076 (%) | 0.04 | 0.04 | 0.04 | 0.04 |
| MFR, 330° C., 2.16 kg, 360 sec (g/10 min) | 43 | 72 | 93 | 93 |
| MVR, 330° C., 2.16 kg, 360 sec (cm$^3$/10 min) | 40 | 68 | 87 | 89 |
| Melt, vis 316° C., 5000 s$^{-1}$ (Pa-s) | 133 | 101 | 84 | 88 |
| HDT, (° C.) | 159 | 155 | 154 | 154 |
| Tg, (° C.) | 167 | 165 | 162 | 160 |
| Standard Molding | | | | |
| MAI Total Energy, 23° C. (J) | 72 | 72 | 68 | 69 |
| Ductility (%) | 100 | 100 | 100 | 100 |

Incorporation of hydroxyl-functionalized flow promoters, such as alkylene glycols (e.g., ethylene glycol, polymeric alkylene glycols, amine functionalized alkylene glycols) significantly improved the flow properties of the PPPBP-PC containing compositions at low loadings of the flow promoters. Implementation of this strategy to improve flow properties promoted the retention of properties such as thermal resistance and impact strength.

Figure 2:
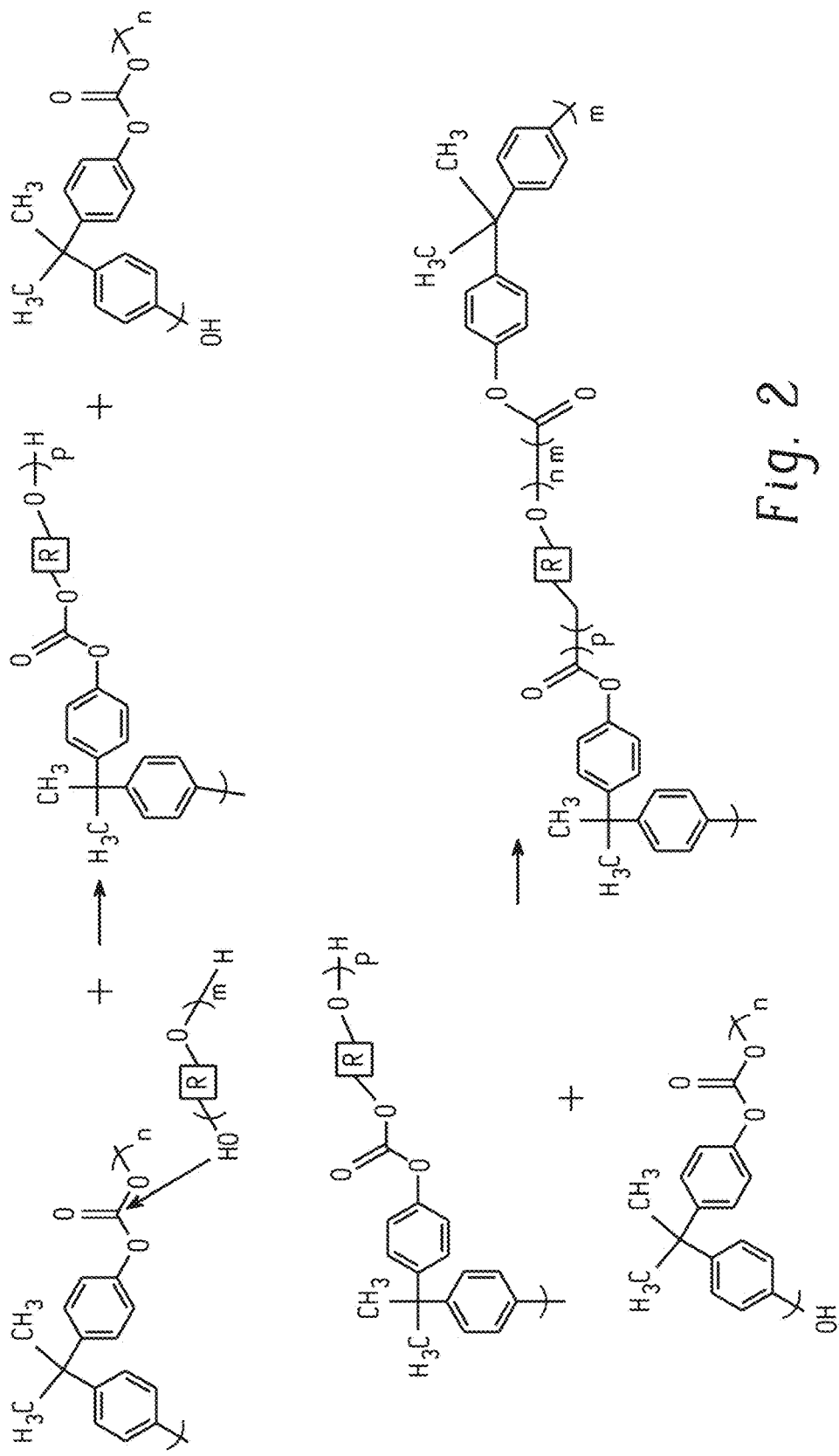
FIG. 2 illustrates a reaction scheme depicting the reaction of hydroxyl containing compounds with a polycarbonate chain.

Hydroxyl groups on the flow promoters can react with the PC or copolymer chain as shown in FIG. 2, causing chain scission. This results in a loss of PC molecular weight and decrease in viscosity, which is dependent on the chemical structure of the flow promoter and number of OH groups present. Low levels (less than 1 wt %) of flow promoter additives were required to significantly decrease the viscosity, and the additive caused no significant loss in heat (HDT or T$_g$) with minimal loss in impact properties.

Tables 23 and 24 show that a variety of alkylene glycols (e.g., PEG, PPG, ethylene glycol) were shown to improve flow properties in a series of compositions. However, heat properties of these compositions decreased slightly in comparison to 42. A correlation between the molecular weight of PEG incorporated into the composition and the effectiveness of flow promotion was observed. The lower molecular weight PEG was more effective at improving the flow, whereas the higher molecular weight PEG showed less of an improvement. THAM is an additional flow promoter that also demonstrated the ability to improve flow properties of the PPPBP-PC compositions, while heat and impact performance properties were maintained (composition 128).

TABLE 23

|  | Composition | | | | | | | | |
|---|---|---|---|---|---|---|---|---|---|
|  | 42 | 114 | 115 | 116 | 117 | 118 | 119 | 120 | 121 |
| PPPBP-PC-1 (%) | 64.0 | 64.0 | 64.0 | 64.0 | 64.0 | 64.0 | 64.0 | 64.0 | 64.0 |
| PC-1 (%) | 18.0 | 18.0 | 12.0 | 6.0 | | 18.0 | 18.0 | 18.0 | 18.0 |
| PC-2 (%) | 17.6 | 17.1 | 23.1 | 29.1 | 35.6 | 16.8 | 16.6 | 17.1 | 17.1 |
| PEG-1 (%) | | 0.5 | 0.5 | 0.5 | 0.5 | 0.8 | 1.0 | | |
| PEG-2 (%) | | | | | | | | 0.5 | 0.8 |
| Additives (%) | 0.4 | 0.4 | 0.4 | 0.4 | 0.4 | 0.4 | 0.4 | 0.4 | 0.4 |
| MV 300° C./1500 s$^{-1}$ (Pa-s) | 396 | — | — | 251 | — | 283 | 241 | 302 | 255 |
| MV 300° C./5000 s$^{-1}$ (Pa-s) | 175 | 149 | 150 | 129 | — | 138 | 121 | — | — |
| Vicat B120 (° C.) | 173 | 169 | 170 | 169 | 168 | 166 | 164 | 169 | 167 |
| HDT, 0.45 MPa (° C.) | 165 | 163 | 163 | 163 | 162 | 159 | 157 | 163 | 162 |
| HDT, 1.8 MPa (° C.) | 153 | 150 | 149 | 149 | 150 | 147 | 145 | 151 | 149 |
| NII, 23° C. (kJ/m$^2$) | 10 | 10 | — | — | — | 9 | 8 | — | — |
| NII, 0° C. (kJ/m$^2$) | 9 | 9 | — | — | — | 7 | 7 | — | — |
| NII, −30° C. (kJ/m$^2$) | 7 | 7 | — | — | — | 4 | 2 | — | — |
| MAI energy at max. force, 23° C. (J) | 107 | 134 | 133 | 121 | — | 115 | 126 | — | — |

TABLE 23-continued

| | Composition | | | | | | | | |
|---|---|---|---|---|---|---|---|---|---|
| | 42 | 114 | 115 | 116 | 117 | 118 | 119 | 120 | 121 |
| MAI, 23° C. ductility (%) | 100 | 100 | 100 | 100 | — | 80 | 60 | — | — |
| MAI energy at max. force, 0° C. (J) | 97 | 116 | 90 | 117 | — | 101 | 112 | — | — |
| MAI, 0° C. ductility (%) | 0 | 20 | 0 | 0 | — | 0 | 0 | — | — |
| Metallization test: 3.0 mm metallized plaques | | | | | | | | | |
| Passes haze onset test at (° C.) | 165 | 160 | — | — | — | — | 160 | — | — |
| Crosshatch adhesion test (GT) | GT0 | GT0 | — | — | — | — | GT0 | — | — |
| Corrosion test; 10 d, 98% rel. hum. (%) | 0 | 0 | — | — | — | — | 0 | — | — |
| Metallization test: 1.5 mm metallized plaques | | | | | | | | | |
| Passes haze onset test at (° C.) | 160 | 160 | — | — | — | — | 155 | — | — |
| Crosshatch adhesion test (GT) | GT0 | GT0 | — | — | — | — | GT0 | — | — |
| Corrosion test, 10 d, 98% rel. hum. (%) | 0 | 0 | — | — | — | — | 0 | — | — |

Melt Viscosity was measured according to ISO11443;
Vicat B120 was measured according to ISO306;
HDT was measured according to ISO75;
NII was measured according to ISO180;
MAI was measured according to ISO6603.

TABLE 24

| | Composition | | | | | | | | | |
|---|---|---|---|---|---|---|---|---|---|---|
| | 42 | 122 | 123 | 124 | 125 | 126 | 127 | 128 | 129 | 130 |
| PPPBP-PC-1 (%) | 64.0 | 64.0 | 64.0 | 64.0 | 64.0 | 64.0 | 64.0 | 64.0 | 64.0 | 64.0 |
| PC-1 (%) | 18.0 | 18.0 | 18.0 | 18.0 | 18.0 | 18.0 | 18.0 | 18.0 | 18.0 | 18.0 |
| PC-2 (%) | 17.6 | 17.1 | 16.8 | 17.1 | 16.8 | 17.1 | 16.8 | 17.5 | 17.6 | 17.6 |
| PEG-3 (%) | | 0.5 | 0.8 | | | | | | | |
| PPG (%) | | | | 0.5 | 0.8 | | | | | |
| Ethylene glycol (%) | | | | | | 0.5 | 0.8 | | | |
| THAM (%) | | | | | | | | 0.07 | 0.1 | 0.25 |
| Additives (%) | 0.4 | 0.4 | 0.4 | 0.4 | 0.4 | 0.4 | 0.4 | 0.4 | 0.4 | 0.4 |
| Melt viscosity | | | | | | | | | | |
| MV 300° C./1500 s⁻¹ (Pa-s) | 396 | 306 | 260 | 347 | 333 | 236 | 186 | 234 | 218 | 115 |
| MV 300° C./5000 s⁻¹ (Pa-s) | 175 | 145 | — | 158 | 152 | 117 | 102 | 118 | 110 | 70 |
| Vicat B120 (° C.) | 173 | 168 | 168 | 168 | 166 | 168 | 167 | 169 | — | — |
| HDT, 0.45 MPa (° C.) | 165 | 163 | 162 | 163 | 160 | 163 | 162 | 164 | — | — |
| HDT, 1.8 MPa (° C.) | 153 | 150 | 149 | 151 | 149 | 149 | 149 | 150 | — | — |
| NII, 23° C. (kJ/m²) | 10 | — | — | — | — | — | — | 9 | — | — |
| NII, 0° C. (kJ/m²) | 9 | — | — | — | — | — | — | 7 | — | — |
| NII, −30° C. (kJ/m²) | 7 | — | — | — | — | — | — | 4 | — | — |
| MAI energy at max. force, 23° C. (J) | 107 | — | — | — | — | — | — | 123 | — | — |
| MAI, 23° C. ductility (%) | 100 | — | — | — | — | — | — | 80 | — | — |
| MAI energy at max. force, 0° C. (J) | 97 | — | — | — | — | — | — | 122 | — | — |
| MAI, 0° C. ductility (%) | 0 | — | — | — | — | — | — | 0 | — | — |
| Metallization test: 3.0 mm metallized plaques | | | | | | | | | | |
| Passes haze onset test at (° C.) | 165 | — | — | — | — | — | — | 165 | — | — |
| Crosshatch adhesion test (GT) | GT0 | — | — | — | — | — | — | GT0 | — | — |
| Corrosion test; 10 d, 98% rel. hum. (%) | 0 | — | — | — | — | — | — | 0 | — | — |
| Metallization test: 1.5 mm metallized plaques | | | | | | | | | | |
| Passes haze onset test at (° C.) | 160 | — | — | — | 165 | — | 160 | — | | |
| Crosshatch adhesion test (GT) | GT0 | — | — | — | — | — | — | GT0 | — | — |

TABLE 24-continued

| | Composition | | | | | | | | | |
|---|---|---|---|---|---|---|---|---|---|---|
| | 42 | 122 | 123 | 124 | 125 | 126 | 127 | 128 | 129 | 130 |
| Corrosion test, 10 d, 98% rel. hum. (%) | 0 | — | — | — | — | — | — | 0 | — | |

Melt Viscosity was measured according to ISO11443;
Vicat B120 was measured according to ISO306;
HDT was measured according to ISO75;
NII was measured according to ISO180;
MAI was measured according to ISO6603.

Table 25 demonstrates that the addition of PC-Si-2 copolymer to PPPBP-PC-1 compositions containing PEG-1 led to achievement of low temperature ductility while improving flow and maintaining impact strength (e.g., composition 136).

Glycerol monosterate (GMS) is a further example of an alkylene alcohol derivative which also gave much improved flow in compositions containing high heat copolymers such as PPPBP-PC-1 (Table 26) and PC-8 (Table 27) and compositions containing PC-siloxane (Table 28). Compositions

TABLE 25

| | Composition | | | | | | | | | | |
|---|---|---|---|---|---|---|---|---|---|---|---|
| | 42 | 131 | 132 | 133 | 134 | 135 | 136 | 137 | 138 | 139 | 140 |
| PPPBP-PC-1 (%) | 64.0 | 64.0 | 64.0 | 64.0 | 64.0 | 64.0 | 64.0 | 64.0 | 64.0 | 64.0 | 64.0 |
| PC-1 (%) | 18.0 | | | | 16.8 | | 18.0 | 18.0 | | | |
| PC-2 (%) | 17.6 | 18.0 | 18.0 | | | 16.8 | | | | | 18.0 |
| PC-3 (%) | | | | 17.1 | | | | | 17.1 | | |
| PC-Si-2 (%) | | 17.6 | 17.1 | 18.0 | 18.0 | 18.0 | 16.6 | 17.1 | 18.0 | 17.5 | 17.5 |
| PEG-1 (%) | | | 0.5 | 0.5 | 0.8 | 0.8 | 1.0 | | | | |
| Ethylene Glycol (%) | | | | | | | | 0.5 | 0.5 | | |
| THAM (%) | | | | | | | | | | 0.07 | 0.07 |
| Additives (%) | 0.4 | 0.4 | 0.4 | 0.4 | 0.4 | 0.4 | 0.4 | 0.4 | 0.4 | 0.4 | 0.4 |
| Melt viscosity | | | | | | | | | | | |
| MV 300° C./1500 s$^{-1}$ (Pa-s) | 396 | 360 | 325 | 233 | 221 | 196 | 271 | 147 | 148 | 247 | 202 |
| MV 300° C./5000 s$^{-1}$ (Pa-s) | 175 | 165 | 150 | 117 | 116 | 107 | 130 | 85 | 83 | 134 | 103 |
| Vicat B120 (° C.) | 173 | 173 | 168 | 169 | 167 | 168 | 165 | 169 | 169 | 170 | 171 |
| HDT, 0.45 MPa (° C.) | 165 | 166 | 162 | 163 | 161 | 160 | 160 | 162 | 161 | 164 | 163 |
| HDT, 1.8 MPa (° C.) | 153 | 151 | 148 | 149 | 147 | 146 | 144 | 148 | 147 | 151 | 149 |
| NII, 23° C. (kJ/m$^2$) | 10 | 33 | 36 | 37 | 36 | 36 | 35 | 31 | 30 | 33 | 31 |
| NII, 0° C. (kJ/m$^2$) | 9 | 26 | 19 | 30 | 29 | 27 | 19 | 17 | 16 | 17 | 16 |
| NII, −30° C. (kJ/m$^2$) | 7 | 16 | 15 | 17 | 18 | 17 | 13 | 11 | 12 | 14 | 13 |
| MAI energy at max. force, 23° C. (J) | 107 | 126 | 125 | 119 | 108 | 106 | 121 | 114 | 74 | 73 | 92 |
| MAI, 23° C. ductility (%) | 100 | 100 | 100 | 100 | 100 | 100 | 100 | 100 | 100 | 100 | 100 |
| MAI energy at max. force, 0° C. (J) | 97 | 115 | 135 | 83 | 93 | 90 | 112 | 89 | 82 | 73 | 94 |
| MAI, 0° C. ductility (%) | 0 | 100 | 100 | 100 | 100 | 100 | 100 | 80 | 60 | 100 | 100 |
| MAI energy at max. force, −30° C. (J) | 74 | 125 | 119 | 86 | 96 | 96 | 106 | 85 | 80 | — | 73 |
| MAI −30° C. ductility (%) | 0 | 100 | 40 | 20 | 15 | 15 | 0 | 0 | 0 | — | 0 |
| Metallization test: 3.0 mm metallized plaques | | | | | | | | | | | |
| Passes haze onset test at (° C.) | 165 | — | — | — | — | — | — | — | — | — | — |
| Crosshatch adhesion test (GT) | GT0 | — | — | — | — | — | — | — | — | — | — |
| Corrosion test; 10 d, 98% rel. hum. (%) | 0 | — | — | — | — | — | — | — | — | — | — |
| Metallization test: 1.5 mm metallized plaques | | | | | | | | | | | |
| Passes haze onset test at (° C.) | 160 | — | — | — | — | — | — | — | — | — | — |
| Crosshatch adhesion test (GT) | GT0 | — | — | — | — | — | — | — | — | — | — |
| Corrosion test, 10 d, 98% rel. hum. (%) | 0 | — | — | — | — | — | — | — | — | — | — |

Melt Viscosity was measured according to ISO11443;
Vicat B120 was measured according to IS0306;
HDT was measured according to ISO75;
NII was measured according to ISO180;
MAI was measured according to ISO6603.

containing combinations of GMS and PETS or GTS are even more beneficial for flow improvement.

TABLE 26

| | Composition | | | | | | |
|---|---|---|---|---|---|---|---|
| | 141 | 142 | 143 | 144 | 145 | 146 | 147 |
| PPPBP-PC-1 (%) | 64 | 64 | 64 | 64 | 64 | 64 | 64 |
| PC-1 (%) | 18 | 18 | 18 | | | | |
| PC-2 (%) | 17 | 17 | 17 | | | | |
| PC-3 (%) | | | | 17 | 17 | 17 | 17 |
| PC-Si-2 (%) | | | | 18 | 18 | 18 | 18 |
| PETS (%) | 0.5 | | 0.3 | 0.5 | | 0.3 | 0.3 |
| GTS palm based (%) | | 0.5 | | | 0.5 | | |
| GMS (only Riken) (%) | | | 0.5 | | | 0.5 | |
| Ethylene Glycol | | | | | | | 0.5 |
| Additives (%) | 0.1 | 0.1 | 0.1 | 0.1 | 0.1 | 0.1 | 0.1 |
| MVR 300° C./2.16 kg (300 s) (ml/10° C.) | 10 | 11 | 20 | 9 | 12 | 23 | 24 |
| MVR 300° C./2.16 kg (1080 s) (ml/10° C.) | 12 | 16 | 27 | 11 | 14 | 29 | 25 |
| MVR 330° C./2.16 kg (300 s) (ml/10° C.) | 32 | 37 | 67 | 32 | 45 | 85 | 78 |
| MV 300° C./1500 s$^{-1}$ (Pa-s) | 377 | 335 | 239 | 312 | 286 | 197 | 150 |
| MV 300° C./5000 s$^{-1}$ (Pa-s) | 168 | 154 | 116 | 146 | 133 | 99 | 89 |
| Vicat B120 (° C.) | 171 | 168 | 167 | 172 | 169 | 165 | 167 |
| HDT, 0.45 MPa (° C.) | 165 | 162 | 163 | 165 | 163 | 159 | 162 |
| HDT, 1.8 MPa (° C.) | — | 150 | 151 | — | 152 | 146 | 149 |
| NII, 23° C. (kJ/m$^2$) | 9 | 8 | 8 | 35 | 36 | 30 | 31 |
| NII, 0° C. (kJ/m$^2$) | 9 | 8 | 8 | 26 | 21 | 17 | 14 |
| NII, −30° C. (kJ/m$^2$) | — | 6 | 4 | — | 15 | 12 | 13 |
| MAI energy at max. force, 23° C. (J) | 129 | 125 | 129 | 128 | 114 | 106 | 108 |
| MAI, 23° C. ductility (%) | 100 | 100 | 100 | 100 | 100 | 100 | 100 |
| MAI energy at max. force, 0° C. (J) | — | 109 | 101 | — | 99 | 91 | 89 |
| MAI, 0° C. ductility (%) | — | 20 | 0 | — | 100 | 100 | 80 |

Melt Viscosity was measured according to ISO11443;
Vicat B120 was measured according to IS0306;
HDT was measured according to ISO75;
NII was measured according to ISO180;
MAI was measured according to ISO6603.

TABLE 27

| | Composition | | | | |
|---|---|---|---|---|---|
| | 148 | 149 | 150 | 151 | 152 |
| PC-8 (%) | 65 | 65 | 65 | 65 | 65 |
| PC-2 (%) | 35 | 34 | 35 | 29 | 28 |
| PC-Si-2 (%) | | | | 6 | 6 |
| GMS (only Riken) (%) | | 0.5 | | | 0.5 |
| THAM | | | 0.07 | | 0.5 |
| MVR 300° C./2.16 kg (300 s) (ml/10° C.) | — | — | — | — | — |
| MVR 300° C./2.16 kg (1080 s) (ml/10° C.) | — | — | — | — | — |
| MVR 330° C./2.16 kg (300 s) (ml/10° C.) | — | — | — | — | — |
| MV 300° C./1500 s$^{-1}$ (Pa-s) | 286 | 194 | 195 | 368 | 309 |
| MV 300° C./5000 s$^{-1}$ (Pa-s) | 145 | 113 | 114 | 167 | 138 |
| Vicat B120 (° C.) | 166 | 161 | 163 | 165 | 161 |
| HDT, 0.45 MPa (° C.) | 158 | 154 | 156 | 158 | 153 |
| NII, 23° C. (kJ/m$^2$) | 6 | 6 | 6 | 9 | 7 |
| NII, 0° C. (kJ/m$^2$) | 7 | 6 | 6 | 8 | 8 |
| NII, −30° C. (kJ/m$^2$) | 6 | 6 | 6 | 8 | 7 |
| MAI energy at max. force, 23° C. (J) | 100 | 133 | 126 | 144 | 148 |
| MAI, 23° C. ductility (%) | 100 | 100 | 100 | 100 | 100 |
| MAI energy at max. force, 0° C. (J) | 93 | 124 | 116 | 112 | 113 |
| MAI energy at max. force - standard dev. | 11.5 | 7 | 13 | 9.8 | 11 |
| Deflection at break, 0° C. (mm) | 17 | 19 | 18 | 18 | 18 |
| Deflection at break - standard dev. | 1.1 | 0.6 | 1.1 | 0.8 | 1 |
| MAI, 0° C. ductility (%) | 100 | 100 | 100 | 100 | 100 |

MVR was measured according to ISO1133; Melt Viscosity was measured according to ISO11443; Vicat B120 was measured according to IS0306; HDT was measured according to ISO75; NII was measured according to ISO180; MAI was measured according to ISO6603.

TABLE 28

| | Composition | | | | | | | |
|---|---|---|---|---|---|---|---|---|
| | 153 | 154 | 155 | 156 | 157 | 158 | 159 | 160 |
| PPPBP-PC-1 (%) | 64 | 64 | 64 | 64 | 64 | 64 | 64 | 64 |
| PC-3 (%) | 30 | 29 | 29 | 29 | 30 | 30 | 30 | 29 |
| PC-Si-2 (%) | 6 | 6 | 6 | 6 | 6 | 6 | 6 | 6 |

TABLE 28-continued

| | Composition | | | | | | | |
|---|---|---|---|---|---|---|---|---|
| | 153 | 154 | 155 | 156 | 157 | 158 | 159 | 160 |
| Palmitic/Stearic Acid (50/50) ester of dipenta/pentaerythritol (%) | 0.3 | 0.3 | 0.3 | 0.3 | 0.2 | 0.1 | — | — |
| GMS (only Riken) (%) | | 0.2 | 0.3 | 0.4 | 0.1 | 0.2 | 0.3 | 0.4 |
| MVR 300° C./2.16 kg (300 s) (ml/10° C.) | — | — | — | — | — | — | — | — |
| MVR 300° C./2.16 kg (1080 s) (ml/10° C.) | — | — | — | — | — | — | — | — |
| MVR 330° C./2.16 kg (300 s) (ml/10° C.) | — | — | — | — | — | — | — | — |
| MV 300° C./1500 s$^{-1}$ (Pa-s) | 299 | 207 | 254 | 257 | 290 | 294 | 289 | 288 |
| Vicat B120 (° C.) | 172 | 168 | 169 | 168 | 171 | 172 | 171 | 170 |
| HDT, 0.45 MPa (° C.) | 164 | 161 | 161 | 160 | 164 | 164 | 163 | 162 |
| HDT, 1.8 MPa (° C.) | 151 | 150 | 149 | 148 | 151 | 151 | 150 | 150 |
| NII, 23° C. (kJ/m$^2$) | 10 | 10 | 12 | 10 | 14 | 13 | 11 | 13 |
| NII, 0° C. (kJ/m$^2$) | 12 | 11 | 11 | 12 | 11 | 12 | 12 | 11 |
| MAI energy at max. force, | 124 | 112 | 86 | 106 | 123 | 127 | 117 | 123 |
| MAI, 23° C. ductility (%) | 100 | 100 | 100 | 100 | 100 | 100 | 100 | 80 |

MVR was measured according to ISO1133;
Melt Viscosity was measured according to ISO11443;
Vicat B120 was measured according to ISO306;
HDT was measured according to ISO75;
NII was measured according to ISO180;
MAI was measured according to ISO6603.

Table 29 demonstrates that bisphenol-A can also be used as a flow promoter.

TABLE 29

| | Composition | | | |
|---|---|---|---|---|
| | 161 | 162 | 163 | 164 |
| PPPBP-PC-1 (%) | 64 | 64 | 64 | 64 |
| PC-1 (%) | 18 | 18 | | |
| PC-2 (%) | 17 | 17 | | |
| PC-3 (%) | | | 17 | 17 |
| PC-Si-2 (%) | | | 18 | 18 |
| Bisphenol-A (%) | 0.3 | 0.5 | 0.3 | 0.5 |
| MV 300° C./1500 s$^{-1}$ (Pa-s) | 259 | 212 | 206 | 184 |
| Vicat B120 (° C.) | 172 | 171 | 174 | 172 |
| HDT, 0.45 MPa (° C.) | 164 | 163 | 164 | 165 |
| HDT, 1.8 MPa (° C.) | 152 | 151 | 149 | 149 |
| NII, 23° C. (kJ/m$^2$) | 8 | 8 | 32 | 30 |
| NII, 0° C. (kJ/m$^2$) | 8 | 8 | 23 | 22 |
| MAI energy at max. force, 23° C. (J) | 128 | 121 | 99 | 108 |
| MAI, 23° C. ductility (%) | 100 | 100 | 100 | 100 |

Melt Viscosity was measured according to ISO11443; Vicat B120 was measured according to IS0306; HDT was measured according to ISO75; NII was measured according to ISO180; MAI was measured according to ISO6603.

Table 30 shows results of additional screening using 0.3 wt % or 0.5 wt % of PPPBP, BPA, or PCP monomers or 0.2% GMS as flow aids in PPPBP-PC-1 copolymer without the addition of regular polycarbonate. The results show that all diol or monoalcohol flow aids resulted in lower melt viscosity at high shear (5000 s$^{-1}$). The melt viscosity decreased from 206 Pa*s without flow aid to between 128 and 171 Pa*s depending on the type and amount of flow aid. BPA and PCP monomers at 0.5% (compositions 205 and 207) were the most effective flow aids. It should be noted that for these initial samples, monomers were added by weight percent, and mole percentage of monomer as well as mole percentage of total hydroxyl groups is not constant between the samples.

Heat distortion temperature (HDT) was maintained within 3° C. for all compositions of Table 30, and $T_g$ was also maintained.

Multi-axial impact (MAI) energy was measured after standard and abusive molding at 23° C., and maintained at least 52 or 48 J for all compositions under these conditions. All compositions of Table 30 have low ductility due to the structure of the PPPBP copolymer and absence of regular polycarbonate, while higher amounts of monomer flow promoter caused a slightly larger decrease in impact energy.

Notched Izod impact (NII) was measured at 23° C. and 0° C. and was maintained at a minimum of 58 J/m at 23° C. and 52 J/m at 0° C. Higher amounts of monomer flow promoter caused a greater decrease in impact, as seen in the MAI samples.

TABLE 30

| | Composition | | | | | | | |
|---|---|---|---|---|---|---|---|---|
| | 201 | 202 | 203 | 204 | 205 | 206 | 207 | 208 |
| PPPBP-PC-1 (%) | 99.51 | 99.21 | 99.01 | 99.21 | 99.01 | 99.21 | 99.01 | 99.31 |
| PPPPBP Monomer (%) | | 0.30 | 0.50 | | | | | |
| BPA monomer (%) | | | | 0.30 | 0.50 | | | |
| PCP monomer (%) | | | | | | 0.30 | 0.50 | |
| GMS (%) | | | | | | | | 0.20 |
| PETS (%) | 0.27 | 0.27 | 0.27 | 0.27 | 0.27 | 0.27 | 0.27 | 0.27 |
| Hindered Phenol (%) | 0.04 | 0.04 | 0.04 | 0.04 | 0.04 | 0.04 | 0.04 | 0.04 |
| Phosphite Stab (%) | 0.08 | 0.08 | 0.08 | 0.08 | 0.08 | 0.08 | 0.08 | 0.08 |

TABLE 30-continued

| | Composition | | | | | | | |
|---|---|---|---|---|---|---|---|---|
| | 201 | 202 | 203 | 204 | 205 | 206 | 207 | 208 |
| | Properties | | | | | | | |
| MVR, 300° C., 2.16 kg, 360 sec (g/10 min) | 4 | 6 | 8 | 8 | 13 | 8 | 11 | 7 |
| MVR, 330° C., 2.16 kg, 360 sec (cm$^3$/10 min) | 4 | 6 | 7 | 8 | 47 | 33 | 41 | 29 |
| MV 316° C., 5000 s$^{-1}$ (Pa-s) | 206 | 171 | 157 | 152 | 128 | 159 | 139 | 156 |
| YI | 9.2 | 7.8 | 9.0 | 13.7 | 13.9 | 9.9 | 10.9 | 10.7 |
| HDT, 0.45 MPa, 3.2 mm (° C.) | 186 | 186 | 185 | 184 | 183 | 185 | 183 | 183 |
| Tg (° C.) | 197 | 196 | 196 | 194 | 195 | 195 | 192 | 191 |
| MAI Energy, Total-avg (J) 23° C., standard | 68 | 63 | 70 | 61 | 52 | 67 | 67 | 71 |
| Ductility (%) | 0 | 10 | 20 | 10 | 0 | 10 | 0 | 11 |
| MAI Energy, Total-avg (J) 23° C., abusive | 62 | 67 | 61 | 68 | 48 | 67 | 62 | 72 |
| Ductility (%) | 20 | 0 | 0 | 0 | 0 | 30 | 0 | 0 |
| NII, 23° C. (J/m) | 78 | 68 | 60 | 73 | 58 | 68 | 62 | 75 |
| NII, 0° C. (J/m) | 75 | 58 | 52 | — | 52 | 57 | 54 | 60 |

Tables 31 and 32 show results of screening the same diol or monoalcohol flow aids (0.3 wt % or 0.5 wt % PPPBP, BPA, or PCP, or 0.2% GMS) in lower molecular weight PPPBP-PC-2 (Table 31) and PPPBP-PC-3 (Table 32) copolymer resins without the addition of regular polycarbonate. The results show that all monomer flow aids resulted in lower melt viscosity at high shear (5000 s$^{-1}$). The melt viscosity decreased from 163 Pa*s without flow aid in PPPBP-PC-2 copolymer to between 117 and 149 Pa*s, and from 141 Pa*s without flow aid in PPPBP-PC-3 copolymer to between 100 and 127 Pa*s depending on the type and amount of flow aid. BPA and PCP monomers at the higher level of 0.5 wt % were the most effective flow aids in the lower molecular weight copolymers, as observed with PPPBP-PC-1. For these compositions, monomers were again added by weight percent, and mole percentage of monomer as well as mole percentage of total hydroxyl groups is not constant between the compositions.

$T_g$ was maintained within 5° C. for all compositions of Tables 31 and 32.

The compositions (especially those with PPPBP-PC-3 copolymer) were extremely brittle and difficult to mold, and therefore impact and other mechanical properties could not be tested. This is an inherent property of the low molecular weight PPPBP copolymer resins, and was not caused by the addition of the flow promoters. The control sample with no flow promoter also could not be molded without extreme difficulty.

TABLE 31

| | Composition | | | | | | | |
|---|---|---|---|---|---|---|---|---|
| | 209 | 210 | 211 | 212 | 213 | 214 | 215 | 216 |
| PPPBP-PC-2 (%) | 99.51 | 99.21 | 99.01 | 99.21 | 99.01 | 99.21 | 99.01 | 99.31 |
| PPPPBP Monomer (%) | | 0.30 | 0.50 | | | | | |
| BPA monomer (%) | | | | 0.30 | 0.50 | | | |
| PCP monomer (%) | | | | | | 0.30 | 0.50 | |
| GMS (%) | | | | | | | | 0.20 |
| PETS (%) | 0.27 | 0.27 | 0.27 | 0.27 | 0.27 | 0.27 | 0.27 | 0.27 |
| Hindered Phenol (%) | 0.04 | 0.04 | 0.04 | 0.04 | 0.04 | 0.04 | 0.04 | 0.04 |
| Phosphite Stab. (%) | 0.08 | 0.08 | 0.08 | 0.08 | 0.08 | 0.08 | 0.08 | 0.08 |
| | Properties | | | | | | | |
| Tg (° C.) | 197 | 196 | 197 | 195 | 193 | 195 | 195 | 195 |
| MVR, 300° C., 2.16 kg, 360 sec (g/10 min) | 7 | 9 | 10 | 10 | 14 | 12 | 12 | 10 |
| MVR, 330° C., 2.16 kg, 360 sec (cm$^3$/10 min) | 27 | 36 | 43 | 46 | 60 | 47 | 58 | 55 |
| Melt, vis 316° C., 5000 s$^{-1}$ (Pa-s) | 163 | 149 | 135 | 137 | 117 | 142 | 127 | 137 |
| YI | 8.5 | 8.9 | 8.8 | 10.0 | 10.1 | 9.3 | 10.1 | 10.2 |

TABLE 32

| | Composition | | | | | | | |
|---|---|---|---|---|---|---|---|---|
| | 217 | 218 | 219 | 220 | 221 | 222 | 223 | 224 |
| PPPBP-PC-3 (%) | 99.51 | 99.21 | 99.01 | 99.21 | 99.01 | 99.21 | 99.01 | 99.31 |
| PPPPBP Monomer (%) | | 0.30 | 0.50 | | | | | |
| BPA monomer (%) | | | | 0.30 | 0.50 | | | |
| PCP monomer (%) | | | | | | 0.30 | 0.50 | |
| GMS (%) | | | | | | | | 0.20 |
| PETS (%) | 0.27 | 0.27 | 0.27 | 0.27 | 0.27 | 0.27 | 0.27 | 0.27 |
| Hindered Phenol (%) | 0.04 | 0.04 | 0.04 | 0.04 | 0.04 | 0.04 | 0.04 | 0.04 |
| Phosphite Stab. (%) | 0.08 | 0.08 | 0.08 | 0.08 | 0.08 | 0.08 | 0.08 | 0.08 |
| Properties | | | | | | | | |
| Tg (° C.) | 195 | 195 | 192 | 191 | 193 | 192 | 194 | 194 |
| MVR, 300° C., 2.16 kg, 360 sec (g/10 min) | 8 | 12 | 14 | 14 | 17 | 15 | 15 | 13 |
| MVR, 330° C., 2.16 kg, 360 sec (cm³/10 min) | 36 | 48 | 55 | 60 | 71 | 61 | 73 | 51 |
| Melt, vis 316° C., 5000 s$^{-1}$ (Pa-s) | 141 | 127 | 115 | 113 | 100 | 118 | 104 | 124 |
| YI | 8.3 | 9.2 | 9.5 | 10.2 | 10.4 | 9.6 | 10.0 | 11.0 |

Table 33 shows results of the screening using 0.3 wt % or 0.5 wt % of PPPBP, BPA, or PCP monomers or 0.2% GMS as flow aids in additional PPPBP-PC-1 copolymer/polycarbonate blends (65/35 PPPBP/PC). In these compositions, PCP monomer was added at 0.3 or 0.5 wt % and the other flow aids were added at equivalent mol % of OH) to the low or high loading of PCP, with the exception of GMS, which was added at 0.2 wt %.

The results show that all diol or monoalcohol flow aids resulted in higher MVR and lower melt viscosity at high shear (5000 s$^{-1}$), but PCP was the most effective flow promoter, especially at the higher loading level of 0.5 wt % (composition 227). At equivalent mol % of OH, flow increase/viscosity decrease was lower with BPA (composition 229) and PPPBP (composition 231) compared to PCP. In these compositions, the single OH group on PCP was more effective at flow promotion than the BPA and PPPBP diol monomers at the same mol % of OH) which may be due to greater accessibility of the OH groups on PCP (reduced steric hindrance) for chain scission.

HDT and T$_g$ were maintained within 3° C. for all compositions of Table 33.

MAI energy was measured after standard molding at 23° C. and 0° C., and abusive molding at 23° C., and was maintained at 63-70 J for standard molding and 58-70 J for abusive molding under these conditions. A slight decrease in ductility was observed for composition 227 (0.5 wt % PCP), but ductility was maintained at 80-100% for all other samples at 23° C. under standard or abusive molding conditions.

NII was measured at 23° C. and 0° C., and was maintained within 10-25% at room temperature. NII also decreased most in samples containing PCP, but GPC showed no significant decrease in molecular weight.

Parallel plate rheology at 300° C., 330° C., and 350° C. (held for 30 minutes) showed that all samples except those with GMS had good melt stability up to 350° C., and the GMS sample (composition 332) had good melt stability up to 330° C. Note that the GMS sample was added at 0.2 wt % and therefore did not contain the same molar percentage of OH groups.

TABLE 33

| | Composition | | | | | | | |
|---|---|---|---|---|---|---|---|---|
| | 225 | 226 | 227 | 228 | 229 | 230 | 231 | 232 |
| PPPBP-PC-1 (%) | 65 | 65 | 65 | 65 | 65 | 65 | 65 | 65 |
| PC-5 (%) | 34.61 | 34.37 | 34.14 | 34.48 | 34.36 | 34.39 | 34.17 | 34.41 |
| PPPPBP Monomer (%) | | | | | | 0.22 | 0.44 | |
| BPA monomer (%) | | | | 0.13 | 0.25 | | | |
| PCP monomer (%) | | 0.24 | 0.47 | | | | | |
| GMS (%) | | | | | | | | 0.20 |
| PETS (%) | 0.27 | 0.27 | 0.27 | 0.27 | 0.27 | 0.27 | 0.27 | 0.27 |
| Hindered Phenol (%) | 0.04 | 0.04 | 0.04 | 0.04 | 0.04 | 0.04 | 0.04 | 0.04 |
| Phosphite Stab. (%) | 0.08 | 0.08 | 0.08 | 0.08 | 0.08 | 0.08 | 0.08 | 0.08 |
| Properties | | | | | | | | |
| MVR, 300° C., 2.16 kg, 360 sec (cm³/10 min) | 12 | 15 | 17 | 14 | 17 | 14 | 16 | 15 |
| MVR, 330° C., 2.16 kg, 360 sec (cm³/10 min) | 36 | 54 | 75 | 45 | 60 | 45 | 54 | 52 |
| Melt, vis 300° C., 5000 s$^{-1}$ (Pa-s) | 184 | 168 | 154 | 170 | 156 | 172 | 161 | 168 |
| Melt, vis 330° C., 5000 s$^{-1}$ (Pa-s) | 110 | 79 | 74 | 96 | 85 | 96 | 90 | 92 |
| YI | 4.2 | 4.3 | 4.4 | 4.2 | 4.2 | 4.1 | 4.1 | 5.0 |
| HDT, 0.45 MPa, 3.2 mm (° C.) | 167 | 166 | 165 | 167 | 166 | 168 | 167 | 165 |
| Tg (° C.) | 177 | 173 | 174 | 178 | 174 | 175 | 174 | 174 |

TABLE 33-continued

| | Composition | | | | | | | |
|---|---|---|---|---|---|---|---|---|
| | 225 | 226 | 227 | 228 | 229 | 230 | 231 | 232 |
| MAI Energy, Total-avg (J) 23° C., standard | 68 | 67 | 63 | 72 | 66 | 65 | 66 | 70 |
| Ductility (%) | 70 | 90 | 50 | 100 | 90 | 100 | 90 | 90 |
| MAI Energy, Total-avg (J) 0° C., standard | 69 | 70 | 70 | 70 | 66 | 68 | 67 | 67 |
| Ductility (%) | 70 | 50 | 40 | 0 | 44 | 30 | 50 | 30 |
| MAI Energy, Total-avg (J) 23° C., abusive | 66 | 64 | 58 | 68 | 66 | 60 | 65 | 70 |
| Ductility (%) | 80 | 80 | 70 | 80 | 90 | 80 | 90 | 90 |
| NII, 23° C. (J/m) | 95 | 70 | 71 | 78 | 74 | 80 | 86 | 77 |
| NII, 0° C. (J/m) | 87 | 57 | 41 | 66 | 74 | 59 | 82 | 73 |
| GPC pellet - $M_w$ (Da) | 22161 | 22093 | 22074 | 22185 | 21867 | 22079 | 22095 | 22374 |
| RHE_M-01 - 300° C., 1800 s, % viscosity change | 0 | −22 | −20 | −4 | −6 | −4 | −2 | −16 |
| RHE_M-01 - 330° C., 1800 s, % viscosity change | −10 | −10 | −6 | −10 | −10 | −13 | −10 | −3 |
| RHE_M-01 - 350° C., 1800 s, % viscosity change | −12 | −16 | −12 | −14 | −10 | −18 | −12 | −28 |

Table 34 shows results of additional screening using 0.3% or 0.5% PPPBP, BPA, or PCP monomers (in which mol % of OH is equivalent to 0.3 or 0.5 wt % PCP) or 0.2 wt % GMS as flow aids in PPPBP-PC-2 copolymer/polycarbonate blends (65/35 PPPBP/PC). The results show that, as in the previous compositions (Table 33), all diol or monoalcohol flow aids resulted in higher MVR and lower melt viscosity at high shear (5000 s$^{-1}$), but PCP was the most effective flow promoter, especially at the higher loading level of 0.5 wt % PCP (composition 335). GMS was the second most effective (composition 240), although more yellowing was observed (YI=8.8) most likely due to the reaction of GMS with the polycarbonate chain and formation of a cyclic carbonate byproduct.

HDT and $T_g$ were maintained within 2° C. for all compositions in Table 34.

MAI energy was measured after standard molding at 23° C. and 0° C., and was maintained a value of at least 50 J under these conditions. Ductility decreased to 40-70% for all compositions molded under standard conditions due to the lower molecular weight copolymer, and the lowest ductility was again observed for composition 235 (0.5 wt % PCP). NII was also maintained at a minimum of 80 J/m at 23° C. and 66 J/m at 0° C. for all but composition 235. The loss of impact is likely due to the decrease in molecular weight from 20K to 17.6K as measured by GPC for this composition. However, the GMS composition (composition 240) did not show a large decrease in molecular weight because it also reacts with the chain via a different mechanism as addressed below.

TABLE 34

| | Composition | | | | | | | |
|---|---|---|---|---|---|---|---|---|
| | 233 | 234 | 235 | 236 | 237 | 238 | 239 | 240 |
| PPPBP-PC-2 (%) | 65 | 65 | 65 | 65 | 65 | 65 | 65 | 65 |
| PC-5 (%) | 34.61 | 34.37 | 34.14 | 34.48 | 34.36 | 34.39 | 34.17 | 34.41 |
| PPPPBP Monomer (%) | | | | | | | 0.22 | 0.44 |
| BPA monomer (%) | | | | 0.13 | 0.25 | | | |
| PCP monomer (%) | | 0.24 | 0.47 | | | | | |
| GMS (%) | | | | | | | | 0.20 |
| PETS (%) | 0.27 | 0.27 | 0.27 | 0.27 | 0.27 | 0.27 | 0.27 | 0.27 |
| Hindered Phenol (%) | 0.04 | 0.04 | 0.04 | 0.04 | 0.04 | 0.04 | 0.04 | 0.04 |
| Phosphite Stab. (%) | 0.08 | 0.08 | 0.08 | 0.08 | 0.08 | 0.08 | 0.08 | 0.08 |
| Properties | | | | | | | | |
| MFR, 300° C., 2.16 kg, 360 sec (cm³/10 min) | 33 | 18 | 23 | 19 | 22 | 25 | 14 | 23 |
| MVR, 330° C., 2.16 kg, 360 sec (cm³/10 min) | 44 | 67 | 101 | 55 | 72 | 56 | 65 | 87 |
| Melt, vis 300° C., 5000 s$^{-1}$ (Pa-s) | 169 | 137 | 116 | 147 | 138 | 151 | 143 | 130 |
| Melt, vis 330° C., 5000 s$^{-1}$ (Pa-s) | 95 | 75 | 62 | 76 | 76 | 62 | 78 | 69 |
| HDT, 0.45 MPa, 3.2 mm (° C.) | 167 | 166 | 165 | 166 | 165 | 166 | 166 | 165 |
| Tg (° C.) | 175 | 174 | 173 | 175 | 175 | 175 | 174 | 175 |
| MAI Energy, Total-avg (J) 23° C., standard | 63 | 53 | 50 | 64 | 54 | 67 | 54 | 59 |
| Ductility (%) | 80 | 40 | 0 | 66 | 60 | 70 | 40 | 60 |
| MAI Energy, Total-avg (J) 0° C., standard | 70 | 61 | 60 | 63 | 60 | 66 | 66 | 67 |
| Ductility (%) | 10 | 10 | 0 | 0 | 0 | 0 | 10 | 10 |

TABLE 34-continued

| | Composition | | | | | | | |
|---|---|---|---|---|---|---|---|---|
| | 233 | 234 | 235 | 236 | 237 | 238 | 239 | 240 |
| NII, 23° C. (J/m) | 91 | 89 | 80 | 88 | 86 | 87 | 86 | 84 |
| NII, 0° C. (J/m) | 78 | 70 | 37 | 82 | 66 | 83 | 75 | 71 |
| YI | 5.9 | 5.7 | 6.1 | 5.7 | 5.7 | 5.4 | 5.4 | 8.8 |
| GPC pellet - $M_w$ (Da) | 20247 | 18677 | 17628 | 19062 | 18341 | 19184 | 18117 | 19541 |
| RHE_M-01 - 300° C., 1800 s, % viscosity change | −12 | −7 | −9 | −12 | 0 | −7 | −1 | 51 |
| RHE_M-01 - 330° C., 1800 s, % viscosity change | −7 | −5 | −2 | −1 | −1 | −1 | −2 | −19 |
| RHE_M-01 - 350° C., 1800 s, % viscosity change | −11 | −11 | −3 | −11 | −5 | −9 | −6 | −23 |

Table 35 shows results of additional screening using the same loading levels of 0.3% or 0.5% PPPBP, BPA, or PCP monomers (in which mol % of OH is equivalent to 0.3 or 0.5 wt % PCP) or 0.2 wt % GMS as flow aids in blends of PPPBP-PC-3 copolymer/polycarbonate (65/35 PPPBP/PC). The results show that all diol or monoalcohol flow aids again resulted in higher MVR and lower melt viscosity at high shear (5000 s$^{-1}$). As with the PPPBP-PC-1/PC and PPPBP-PC-2/PC blends, 0.5 wt % PCP was the most effective flow promoter (composition 243), along with 0.2 wt % GMS (composition 248). Surprisingly, in the PPPBP-PC-3 blends, GMS performed about equally to PCP in terms of flow improvement. However, the YI increase to 22 was much more significant than in the PPPBP-PC-1 or PPPBP-PC-2 blends. As in the PPPBP-PC-2 blends, the decrease in molecular weight for the GMS composition (248) was less than the PCP compositions, indicating a different method of flow promotion through formation of GMS carbonate. The GMS composition also showed a small increase in viscosity over time at 330° C., and this increase became more significant at 350° C., indicating other cross-linking reactions could be taking place. This effect was not present in the PPPBP-PC-1 copolymer blends with PC.

HDT and $T_g$ were maintained within 4° C. for all compositions in Table 35.

MAI energy was measured after standard molding at 23° C. and 0° C., and was maintained a value of at least 51 J under these conditions. The lowest impact energy was observed for compositions 243 (0.5 wt % PCP) and 248 (0.2 wt % GMS), which had the highest flow and most molecular weight loss. NII was also maintained at 23° C. for all but compositions 243 and 248. At 0° C., only compositions 244 and 246 (0.3% BPA and 0.3% PPPBP) were able to maintain NII energy.

FIG. 2 shows the effect of utilizing a diol, such as GMS, at high temperature (350° C.). The effect of increasing viscosity over time became more significant as the molecular weight of the PPPBP copolymer in the blends decreased.

TABLE 35

| | Composition | | | | | | | |
|---|---|---|---|---|---|---|---|---|
| | 241 | 242 | 243 | 244 | 245 | 246 | 247 | 248 |
| PPPBP-PC-3 (%) | 65 | 65 | 65 | 65 | 65 | 65 | 65 | 65 |
| PC-5 (%) | 34.61 | 34.37 | 34.14 | 34.48 | 34.36 | 34.39 | 34.17 | 34.41 |
| PPPBP Monomer (%) | | | | | | 0.22 | 0.44 | |
| BPA monomer (%) | | | | 0.13 | 0.25 | | | |
| PCP monomer (%) | | 0.24 | 0.47 | | | | | |
| GMS (%) | | | | | | | | 0.20 |
| PETS (%) | 0.27 | 0.27 | 0.27 | 0.27 | 0.27 | 0.27 | 0.27 | 0.27 |
| Hindered Phenol (%) | 0.04 | 0.04 | 0.04 | 0.04 | 0.04 | 0.04 | 0.04 | 0.04 |
| Phosphite Stab. (%) | 0.08 | 0.08 | 0.08 | 0.08 | 0.08 | 0.08 | 0.08 | 0.08 |
| Properties | | | | | | | | |
| MVR, 300° C., 2.16 kg, 360 sec (cm³/10 min) | 60 | 100 | 127 | 76 | 94 | 73 | 92 | 117 |
| MVR, 330° C., 2.16 kg, 360 sec (cm³/10 min) | 19 | 26 | 43 | 25 | 27 | 23 | 28 | 38 |
| Melt, vis 300° C., 5000 s$^{-1}$ (Pa-s) | 151 | 129 | 110 | 136 | 134 | 141 | 125 | 107 |
| Melt, vis 330° C., 5000 s$^{-1}$ (Pa-s) | 83 | 67 | 56 | 73 | 73 | 74 | 67 | 53 |
| HDT, 0.45 MPa, 3.2 mm (° C.) | 167 | 165 | 164 | 166 | 165 | 166 | 166 | 163 |
| Tg (° C.) | 175 | 175 | 174 | 176 | 176 | 175 | 175 | 171 |
| MAI Energy, Total-avg (J) 23° C., standard | 63 | 58 | 51 | 67 | 61 | 61 | 61 | 54 |
| Ductility (%) | 80 | 70 | 20 | 70 | 50 | 60 | 30 | 0 |
| MAI Energy, Total-avg (J) 0° C., standard | 63 | 62 | 59 | 67 | 67 | 70 | 63 | 64 |
| Ductility (%) | 0 | 0 | 0 | 10 | 0 | 20 | 0 | 10 |
| NII, 23° C. (J/m) | 83 | 83 | 46 | 84 | 74 | 78 | 78 | 58 |
| NII, 0° C. (J/m) | 64 | 56 | 46 | 67 | 51 | 68 | 48 | 27 |
| YI | 7.8 | 7.4 | 7.7 | 7.5 | 7.7 | 7.6 | 7.6 | 22.3 |
| GPC pellet - $M_w$ (Da) | 20231 | 18432 | 16728 | 19179 | 18177 | 19097 | 18407 | 18015 |

TABLE 35-continued

| | Composition | | | | | | | |
|---|---|---|---|---|---|---|---|---|
| | 241 | 242 | 243 | 244 | 245 | 246 | 247 | 248 |
| RHE_M-01 - 300° C., 1800 s, % viscosity change | -7 | -7 | -6 | -7 | -6 | -8 | -6 | -16 |
| RHE_M-01 - 330° C., 1800 s, % viscosity change | 3 | 13 | 22 | 19 | 30 | 20 | 40 | 21 |
| RHE_M-01 - 350° C., 1800 s, % viscosity change | -21 | -22 | -19 | -16 | 8 | -2 | 0 | 140 |

Figure 3:
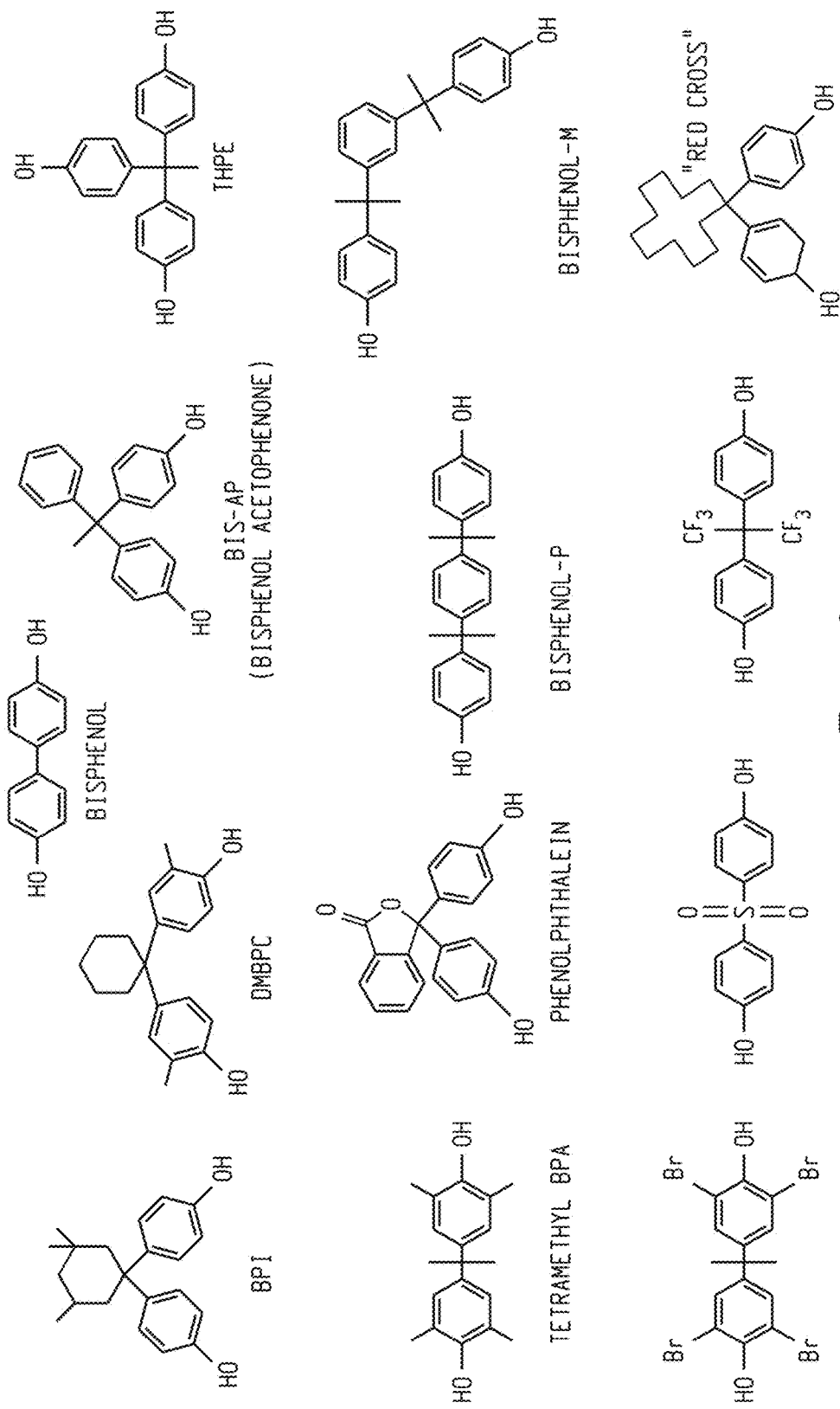
FIG. 3 depicts the structure of several hydroxyl containing monomers.

Other diol monomers (shown in FIG. 3) were considered as flow promoters in compositions with PPPBP-PC-1 copolymer or high flow polycarbonate. One triol monomer (1,1,1-trishydroxy phenyl ethane; THPE) was included to determine the effect of three hydroxyl groups. Bisphenol acetophenone (BisAP), THPE, DMBPC, BPI, PCP, BPA, and PPPBP monomers were selected for incorporation into blends as in the above experiments. Tables 36 and 37 show these additional compositions.

TABLE 36

| | Composition | | | | | |
|---|---|---|---|---|---|---|
| | 249 | 250 | 251 | 252 | 253 | 254 |
| PPPBP-PC-1 (%) | 99.61 | 99.37 | 99.14 | 99.48 | 99.36 | 99.39 |
| BPA monomer (%) | | | | 0.13 | 0.25 | |
| PCP monomer (%) | | 0.24 | 0.47 | | | |
| PPPPBP monomer (%) | | | | | | 0.22 |
| BisAP monomer (%) | | | | | | |
| THPE monomer (%) | | | | | | |
| DMBPC monomer (%) | | | | | | |
| BPI monomer (%) | | | | | | |
| PETS (%) | 0.27 | 0.27 | 0.27 | 0.27 | 0.27 | 0.27 |
| Hindered Phenol (%) | 0.04 | 0.04 | 0.04 | 0.04 | 0.04 | 0.04 |
| Phosphite Stab. (%) | 0.08 | 0.08 | 0.08 | 0.08 | 0.08 | 0.08 |
| Properties | | | | | | |
| HDT, 0.45 MPa, 3.2 mm (° C.) | 186 | 184 | 183 | 185 | 184 | 185 |
| Tg (° C.) | 197 | 193 | 192 | 196 | 195 | 195 |
| MAI Energy, Total-avg (J) 23° C., standard | 60 | 48 | 53 | 57 | 53 | 62 |
| Ductility (%) | 10 | 0 | 0 | 0 | 0 | 0 |
| NII, 23° C. (J/m) | 66 | 59 | 49 | 74 | 74 | 71 |
| NII, 0° C. (J/m) | 46 | 49 | 40 | 51 | 52 | 54 |
| MVR, 300° C., 2.16 kg, 360 sec (cm³/10 min) | 5 | 8 | 11 | 7 | 8 | 6 |
| MVR, 330° C., 2.16 kg, 360 sec (cm³/10 min) | 19 | 30 | 40 | 25 | 30 | 22 |
| Melt, vis 300° C., 5000 s$^{-1}$ (Pa-s) | 278 | 235 | 197 | 254 | 231 | 255 |
| YI | 12.6 | 12.3 | 11.5 | 12.5 | 12.1 | 12.4 |
| GPC pellet - M$_w$ (Da) | 21654 | 20056 | 18699 | 20752 | 19672 | 20554 |
| RHE_M-01 - 330° C., 1800 s, % viscosity change | -9 | -7 | -4 | -9 | 1 | -6 |
| RHE_M-01 - 350° C., 1800 s, % viscosity change | -19 | -16 | -11 | -12 | -10 | -18 |

| | Composition | | | | |
|---|---|---|---|---|---|
| | 255 | 256 | 257 | 258 | 259 |
| PPPBP-PC-1 (%) | 99.17 | 99.27 | 99.37 | 99.26 | 99.24 |
| BPA monomer (%) | | | | | |
| PCP monomer (%) | | | | | |
| PPPPBP monomer (%) | 0.44 | | | | |
| BisAP monomer (%) | | 0.34 | | | |
| THPE monomer (%) | | | 0.24 | | |
| DMBPC monomer (%) | | | | 0.35 | |
| BPI monomer (%) | | | | | 0.37 |
| PETS (%) | 0.27 | 0.27 | 0.27 | 0.27 | 0.27 |
| Hindered Phenol (%) | 0.04 | 0.04 | 0.04 | 0.04 | 0.04 |
| Phosphite Stab. (%) | 0.08 | 0.08 | 0.08 | 0.08 | 0.08 |

TABLE 36-continued

| Properties | | | | | |
|---|---|---|---|---|---|
| HDT, 0.45 MPa, 3.2 mm (° C.) | 185 | 184 | 185 | 184 | 185 |
| Tg (° C.) | 195 | 194 | 195 | 195 | 197 |
| MAI Energy, Total-avg (J) 23° C., standard | 52 | 61 | 63 | 55 | 56 |
| Ductility (%) | 0 | 0 | 0 | 10 | 0 |
| NII, 23° C. (J/m) | 64 | 57 | 59 | 53 | 57 |
| NII, 0° C. (J/m) | 41 | 213 | 40 | 50 | 54 |
| MVR, 300° C., 2.16 kg, 360 sec (cm³/10 min) | 8 | 10 | 6 | 8 | 8 |
| MVR, 330° C., 2.16 kg, 360 sec (cm³/10 min) | 28 | 39 | 25 | 32 | 31 |
| Melt, vis 300° C., 5000 s$^{-1}$ (Pa-s) | 236 | 212 | 255 | 229 | 234 |
| YI | 10.0 | 15.3 | 13.5 | 12.6 | 12.3 |
| GPC pellet - M$_w$ (Da) | 19586 | 19295 | 21039 | 19898 | 19646 |
| RHE_M-01 - 330° C., 1800 s, % viscosity change | −7 | −14 | −3 | −2 | −3.5 |
| RHE_M-01 - 350° C., 1800 s, % viscosity change | −12 | −34 | −7 | −10 | −4.3 |

TABLE 37

| | Composition | | | | | |
|---|---|---|---|---|---|---|
| | 260 | 261 | 262 | 263 | 264 | 265 |
| PC-5 (%) | 99.61 | 99.37 | 99.14 | 99.48 | 99.36 | 99.39 |
| BPA monomer (%) | | | | 0.13 | 0.25 | |
| PCP monomer (%) | | 0.24 | 0.47 | | | |
| PPPPBP monomer (%) | | | | | | 0.22 |
| BisAP monomer (%) | | | | | | |
| THPE monomer (%) | | | | | | |
| DMBPC monomer (%) | | | | | | |
| BPI monomer (%) | | | | | | |
| PETS (%) | 0.27 | 0.27 | 0.27 | 0.27 | 0.27 | 0.27 |
| Hindered Phenol (%) | 0.04 | 0.04 | 0.04 | 0.04 | 0.04 | 0.04 |
| Phosphite Stab. (%) | 0.08 | 0.08 | 0.08 | 0.08 | 0.08 | 0.08 |
| Properties | | | | | | |
| HDT, 0.45 MPa, 3.2 mm (° C.) | 137 | 136 | 135 | 137 | 136 | 137 |
| Tg (° C.) | 146 | 145 | 144 | 146 | 144 | 145 |
| MAI Energy, Total-avg (J) 23° C., standard | 63 | 60 | 58 | 55 | 59 | 65 |
| Ductility (%) | 100 | 100 | 100 | 90 | 100 | 100 |
| Notched Izod impact - 23° C. (J/m) | 678 | 652 | 571 | 668 | 644 | 666 |
| Ductility | 100 | 100 | 90 | 100 | 100 | 100 |
| Notched Izod impact - 0° C. (J/m) | 213 | 132 | 94 | 144 | 126 | 131 |
| Ductility | 0 | 0 | 0 | 0 | 0 | 0 |
| MVR, 300° C., 2.16 kg, 360 sec (cm³/10 min) | 109 | 166 | 217 | 142 | 179 | 146 |
| MVR, 330° C., 2.16 kg, 360 sec (cm³/10 min) | 48 | 74 | 93 | 60 | 76 | 61 |
| Melt, vis 300° C., 5000 s$^{-1}$ (Pa-s) | 99 | 79 | 66 | 88 | 79 | 88 |
| YI | 1.9 | 1.9 | 1.8 | 2.0 | 1.9 | 2.0 |
| GPC pellet - M$_w$ (Da) | 21708 | 21408 | 21287 | 21118 | 21107 | 21126 |

| | Composition | | | | |
|---|---|---|---|---|---|
| | 266 | 267 | 268 | 269 | 270 |
| PC-5 (%) | 99.17 | 99.27 | 99.37 | 99.26 | 99.24 |
| BPA monomer (%) | | | | | |
| PCP monomer (%) | | | | | |
| PPPPBP monomer (%) | 0.44 | | | | |
| BisAP monomer (%) | | 0.34 | | | |
| THPE monomer (%) | | | 0.24 | | |
| DMBPC monomer (%) | | | | 0.35 | |
| BPI monomer (%) | | | | | 0.37 |

TABLE 37-continued

| | | | | | |
|---|---|---|---|---|---|
| PETS (%) | 0.27 | 0.27 | 0.27 | 0.27 | 0.27 |
| Hindered Phenol (%) | 0.04 | 0.04 | 0.04 | 0.04 | 0.04 |
| Phosphite Stab. (%) | 0.08 | 0.08 | 0.08 | 0.08 | 0.08 |
| Properties | | | | | |
| HDT, 0.45 MPa, 3.2 mm (° C.) | 137 | 135 | 137 | 136 | 137 |
| Tg (° C.) | 144 | 143 | 145 | 145 | 144 |
| MAI Energy, Total-avg (J) 23° C., standard | 60 | 48 | 60 | 59 | 58 |
| Ductility (%) | 100 | 90 | 100 | 100 | 100 |
| Notched Izod impact - 23° C. (J/m) | 619 | 578 | 644 | 590 | 495 |
| Ductility | 90 | 60 | 100 | 90 | 70 |
| Notched Izod impact - 0° C. (J/m) | 129 | 130 | 148 | 109 | 121 |
| Ductility | 0 | 0 | 0 | 0 | 0 |
| MVR, 300° C., 2.16 kg, 360 sec (cm$^3$/10 min) | 169 | 238 | 122 | 171 | 170 |
| MVR, 330° C., 2.16 kg, 360 sec (cm$^3$/10 min) | 75 | 115 | 55 | 68 | 74 |
| Melt, vis 300° C., 5000 s$^{-1}$ (Pa-s) | 81 | 63 | 99 | 81 | 80 |
| YI | 2.0 | 3.4 | 2.1 | 1.9 | 1.9 |
| GPC pellet - M$_w$ (Da) | 21168 | 18735 | 21336 | 21170 | 21133 |

While polyester additives are effective at increasing the melt flow rate of PPPBP-PC blends (Tables 2-8), the melt stabilities of these blends were limited at typical high heat polycarbonate processing temperatures. To improve the stability of these blends at high heat and to avoid discoloration, compositions that incorporate alternative stabilizer packages were developed.

Variant compositions of 26 with alternative stabilizer packages were prepared (Table 38). The stabilizers used for the compositions include PEPQ (higher Mw phosphite stabilizer), MZP (acid quencher), and phosphoric acid (H$_3$PO$_4$). Additionally, in some formulations, hindered phenol stabilizer was removed or replaced with hydroxyl octaphenyl benzotriazole.

The compositions were prepared by powder to pellet conversion and compounding through the use of a single screw lab line. All ingredients were tumble-blended prior to compounding and fed using a single feeder to the extruder. Standard injection molding was done at 580° F. with a 35 s cycle time. Abusive molding was done at 580° F. with a 120 s cycle time.

The compositions containing PEPQ (compositions 165-170) in place of the standard stabilizer package of 26 showed a significant decrease in Yellowness Index (YI). These compositions also maintained high flow and similar heat (Tg/HDT) and impact properties in comparison to 26. However, there was no improvement in melt stability (parallel plate viscosity change after 1800 s).

TABLE 38

| | Composition | | | | | | |
|---|---|---|---|---|---|---|---|
| | 26 | 165 | 166 | 167 | 168 | 169 | 170 |
| PPPBP-PC-1 (%) | 85.0 | 85.0 | 85.0 | 85.0 | 85.0 | 85.0 | 85.0 |
| PC-6 (%) | 9.61 | 9.53 | 9.58 | 9.33 | 9.53 | 9.58 | 9.33 |
| PBT-1 (%) | 5.0 | 5.0 | 5.0 | 5.0 | 5.0 | 5.0 | 5.0 |
| PETS (%) | 0.27 | 0.27 | 0.27 | 0.27 | 0.27 | 0.27 | 0.27 |
| Phosphite Stab.; Irgafos 168 (%) | 0.08 | | | | | | |
| Hindered Phenol; Irgafos 1076 (%) | 0.04 | | | | 0.05 | | |
| MZP (%) | | 0.05 | 0.05 | 0.05 | 0.05 | | |
| H$_3$PO$_4$ (%) | | | | | | 0.05 | 0.05 |
| PEPQ (%) | | 0.15 | 0.10 | 0.10 | 0.10 | 0.10 | 0.10 |
| Hydroxyl octaphenyl benzotriazole (%) | | | | 0.25 | | | 0.25 |
| MVR, 330° C., 2.16 kg, 360 sec (cm$^3$/10 min) | 60 | 55 | 49 | 57 | 55 | 51 | 50 |
| MFR, 330° C., 2.16 kg, 360 sec (g/10 min) | 61 | 60 | 53 | 61 | 57 | 55 | 54 |
| Melt, vis 316° C., 5000 s$^{-1}$ (Pa-s) | 122 | 116 | 117 | 114 | 111 | 114 | 115 |
| Tg (° C.) | 172 | 176 | 172 | 172 | 172 | 172 | 171 |
| Parallel Plate Viscosity Change; 300° C. (%) | −49 | −50 | −47 | −52 | −51 | −48 | −49 |
| Parallel Plate Viscosity Change; 316° C. (%) | −77 | −72 | −72 | −75 | −76 | −74 | −77 |
| YI (avg) | 8.5 | 3.6 | 3.4 | 3.9 | 3.3 | 3.3 | 3.8 |
| YI (SD) | 0.06 | 0.01 | 0.02 | 0.01 | 0.01 | 0.01 | 0.01 |
| % T | 87.6 | 88.5 | 88.5 | 88.6 | 88.8 | 88.8 | 88.8 |

TABLE 38-continued

| | Composition | | | | | | |
|---|---|---|---|---|---|---|---|
| | 26 | 165 | 166 | 167 | 168 | 169 | 170 |
| MAI Energy total (J) | 63 | 63 | 63 | 65 | 60 | 64 | 67 |
| HDT, 0.45 MPa (° C.) | 162 | 161 | 164 | 162 | 161 | 161 | 161 |
| NII 23° C., 2 lb/ft (J/m) | 79 | 73 | 70 | 72 | 76 | 76 | 74 |

Table 39 shows additional stabilizer packages that were investigated. A thioester antioxidant, pentaerythritol tetrakis-(3-dodecylthiopropionate), was employed as a stabilizer in conjunction with PEPQ and/or MZP in a modification of 26. Table 39 highlights that the YI was again significantly improved in all compositions containing PEPQ. The addition of pentaerythritol tetrakis-(3-dodecylthiopropionate) also improved YI, but less significantly. The compositions containing pentaerythritol tetrakis-(3-dodecylthiopropionate) (compositions 171-174) resulted in decreased flow, but improved melt stabilities (parallel plate viscosity change). Heat was maintained in all compositions, although a decrease in MAI energy was observed with the addition of MZP (173) or a higher loading of PEPQ (174).

TABLE 39

| | Composition | | | | |
|---|---|---|---|---|---|
| | 26 | 171 | 172 | 173 | 174 |
| PPPBP-PC-1 (%) | 85.0 | 85.0 | 85.0 | 85.0 | 85.0 |
| PC-6 (%) | 9.61 | 9.56 | 9.54 | 9.52 | 9.49 |
| PBT-1 (%) | 5.0 | 5.0 | 5.0 | 5.0 | 5.0 |
| PETS (%) | 0.27 | 0.27 | 0.27 | 0.27 | 0.27 |
| Phosphite Stab.; Irgafos 168 (%) | 0.08 | 0.08 | | | |
| Hindered Phenol; Irgafos 1076 (%) | 0.04 | 0.04 | 0.04 | 0.04 | 0.04 |
| MZP (%) | | | | 0.02 | |
| PEPQ (%) | | | 0.10 | 0.10 | 0.15 |
| Seenox 412S (%) | | 0.05 | 0.05 | 0.05 | 0.05 |
| Melt density, 330° C., 2.17 kg (g/cm$^3$) | 0.86 | 1.02 | 1.08 | 1.07 | 1.05 |
| MVR, 330° C., 2.16 kg, 360 sec (cm$^3$/10 min) | 66 | 61 | 42 | 46 | 42 |
| MFR, 330° C., 2.16 kg, 360 sec (g/10 min) | 57 | 62 | 45 | 49 | 44 |
| Melt, vis 316° C., 5000 s$^{-1}$ (Pa-s) | 121 | 118 | 129 | 126 | 130 |
| Tg (° C.) | 175 | 175 | 175 | 175 | 175 |

TABLE 39-continued

| | Composition | | | | |
|---|---|---|---|---|---|
| | 26 | 171 | 172 | 173 | 174 |
| Parallel Plate Viscosity Change; 300° C. (%) | −59 | −57 | −49 | −42 | −44 |
| Parallel Plate Viscosity Change; 316° C. (%) | −84 | −82 | −75 | −69 | −72 |
| YI (avg) | 10.3 | 8.5 | 5.2 | 3.6 | 3.9 |
| % T | 86.1 | 87.2 | 87.9 | 88.3 | 88.8 |
| MAI Energy total (standard) (J) | 58.7 | 57.5 | 55.4 | 41 | 45.6 |
| Ductility (%) | 40 | 40 | 40 | 20 | 20 |
| MAI Energy total (abusive) (J) | 53.6 | 45.4 | 28.9 | 42.2 | 49.6 |
| Ductility (%) | 20 | 0 | 20 | 20 | 40 |
| HDT, 0.45 MPa (° C.) | 162 | 164 | 163 | 163 | 164 |
| NII 23° C., 2 lb/ft (J/m) | 62 | 66 | 58 | 65 | 65 |

Selected stabilizer packages from the experiments above were also evaluated in compositions containing 5% PET (Table 40). The experimental results of these PET containing blends incorporating PEPQ were in contrast to the results of the PBT containing blends of Table 39. All compositions containing 5% PET lost transparency (% T dropped from 88% to 66-74%) and had decreased flow (melt viscosity increased to 137-148 Pa-s). However, Tg increased to 185-188° C., and melt stability improved, especially with PEPQ/pentaerythritol tetrakis-(3-dodecylthiopropionate) combinations (compositions 179 and 180). Comparison of compositions 178 and 179 suggested that MZP aids in the reduction of haziness (increase in % T from 65 to 75%). This effect was also observed when comparing compositions 179 (PEPQ/pentaerythritol tetrakis-(3-dodecylthiopropionate)) and 180 (PEPQ/pentaerythritol tetrakis-(3-dodecylthiopropionate)/MZP), although the effect is much less pronounced in the presence of pentaerythritol tetrakis-(3-dodecylthiopropionate).

TABLE 40

| | Composition | | | | | | |
|---|---|---|---|---|---|---|---|
| | 26 | 175 | 176 | 177 | 178 | 179 | 180 |
| PPPBP-PC-1 (%) | 85.0 | 85.0 | 85.0 | 85.0 | 85.0 | 85.0 | 85.0 |
| PC-6 (%) | 9.61 | 9.61 | 9.54 | 9.59 | 9.57 | 9.54 | 9.52 |
| PBT-1 (%) | 5.0 | | | | | | |
| PET-1 (%) | | 5.0 | 5.0 | 5.0 | 5.0 | 5.0 | 5.0 |
| PETS (%) | 0.27 | 0.27 | 0.27 | 0.27 | 0.27 | 0.27 | 0.27 |
| Phosphite Stab.; Irgafos 168 (%) | 0.08 | 0.08 | | | | | |
| Hindered Phenol; Irgafos 1076 (%) | 0.04 | 0.04 | 0.04 | 0.04 | 0.04 | 0.04 | 0.04 |
| MZP (%) | | | | | 0.02 | | 0.02 |
| PEPQ (%) | | | 0.15 | 0.10 | 0.10 | 0.10 | 0.10 |
| Seenox 412S (%) | | | | | | 0.05 | 0.05 |
| MVR, 330° C., 2.16 kg, 360 sec (cm$^3$/10 min) | 56 | 33 | 30 | 32 | 34 | 29 | 32 |
| MFR, 330° C., 2.16 kg, 360 sec (g/10 min) | 62 | 36 | 32 | 33 | 37 | 31 | 34 |
| Melt, vis 316° C., 5000 s$^{-1}$ (Pa-s) | 127 | 143 | 143 | 144 | 137 | 148 | 144 |

TABLE 40-continued

| | Composition | | | | | | |
|---|---|---|---|---|---|---|---|
| | 26 | 175 | 176 | 177 | 178 | 179 | 180 |
| Tg (° C.) | 175 | 188 | 187 | 188 | 186 | 185 | 185 |
| Parallel Plate Viscosity Change; 300° C. (%) | −55 | −28 | −28 | −26 | −46 | −20 | −17 |
| Parallel Plate Viscosity Change; 316° C. (%) | −82 | −55 | −53 | −54 | −56 | −41 | −38 |
| YI (avg) | 8.0 | 16.7 | 14.1 | 16.4 | 13.6 | 17.3 | 16.2 |
| % T | 87.7 | 72.0 | 74.0 | 64.8 | 74.5 | 64.7 | 66.4 |
| MAI Energy total (standard) (J) | 67 | 66 | 63 | 72 | 70 | 68 | 71 |
| Ductility (%) | 0 | 20 | 40 | 20 | 40 | 20 | 60 |
| MAI Energy total (abusive) (J) | 56 | 58 | 67 | 67 | 70 | 64 | 68 |
| Ductility (%) | 20 | 0 | 20 | 40 | 20 | 20 | 60 |
| HDT, 0.45 MPa (° C.) | 165 | 171 | 171 | 172 | 168 | 63 | 170 |
| NII, 23° C. (J/m) | 69 | 69 | 72 | 71 | 75 | 170 | 72 |

Copolyesters PCCD and PCTG were incorporated into PPPBP-PC containing compositions. The blends were made as a mixture of PPPBP-PC-3 with either PC-5 or a combination of PC-4 and PC-6 (Table 41). A pronounced anti-yellowing effect of PEPQ was also observed in this set of compositions. Comparison of compositions 181 (5% PCCD with standard stabilizer) and 182 (5% PCCD with PEPQ) or 184 (5% PCTG with standard stabilizer) and 185 (5% PCTG with PEPQ) demonstrated that PEPQ caused a significant decrease in YI in both PCCD and PCTG blends.

The flow properties of these blends were further improved in comparison to 101, but addition of the polyesters caused a decrease in Tg, HDT and melt stability. However, due to the higher heat stability of PCTG and PCCD, the decreases in these properties were less than that observed with 5% PBT (Tables 38 and 39). In addition, the PPPBP-PC-3 copolymer content was maintained at 65%, while the compositions that contain PBT required 85% of the PPPBP-PC-1 copolymer. In addition, the PPPBP-PC-3 containing blends showed an improvement in melt stability.

TABLE 41

| | Composition | | | | | | |
|---|---|---|---|---|---|---|---|
| | 101 | 181 | 182 | 183 | 184 | 185 | 186 |
| PPPBP-PC-3 (%) | 65.0 | 65.0 | 65.0 | 65.0 | 65.0 | 65.0 | 65.0 |
| PC-4 (%) | | | | 13.18 | | | 13.18 |
| PC-5 (%) | 34.61 | 29.61 | 29.53 | | 29.61 | 29.53 | |
| PC-6 (%) | | | | 16.43 | | | 16.43 |
| PCCD (%) | | 5.0 | 5.0 | 5.0 | | | |
| PCTG, 80% CHDM (%) | | | | | 5.0 | 5.0 | 5.0 |
| PETS (%) | 0.27 | 0.27 | 0.27 | 0.27 | 0.27 | 0.27 | 0.27 |
| Phosphite Stab.; Irgafos 168 (%) | 0.08 | 0.08 | | 0.08 | 0.08 | | 0.08 |
| Hindered Phenol; Irgafos 1076 (%) | 0.04 | 0.04 | 0.05 | 0.04 | 0.04 | 0.05 | 0.04 |
| MZP (%) | | | 0.05 | | | 0.05 | |
| PEPQ (%) | | | 0.10 | | | 0.10 | |
| MVR, 330° C., 2.16 kg, 360 sec (cm³/10 min) | 71 | 97 | 114 | 82 | 94 | 117 | 84 |
| MFR, 330° C., 2.16 kg, 360 sec (g/10 min) | 76 | 101 | 122 | 87 | 101 | 129 | 93 |
| Melt, vis 316° C., 5000 s$^{-1}$ (Pa-s) | 97 | 83 | 78 | 94 | 87 | 84 | 89 |
| Tg (° C.) | 171 | 163 | 167 | 162 | 168 | 165 | 168 |
| Parallel Plate Viscosity Change; 316° C. (%) | −2 | −39 | −44 | −25 | −51 | −46 | −48 |
| YI (avg) | 4.1 | 6.9 | 3.7 | 4.8 | 5.8 | 3.4 | 5.3 |
| Haze | 1.1 | 0.6 | 1.2 | 0.6 | 0.6 | 0.8 | 0.5 |
| MAI Energy total (standard) (J) | 64 | 64 | 61 | 66 | 63 | 68 | 66 |
| Ductility (%) | 70 | 70 | 50 | 100 | 80 | 20 | 70 |
| HDT, 0.45 MPa (° C.) | 162 | 155 | 155 | 156 | 157 | 156 | 158 |

Decreased amounts of polyester flow aids (1-2% PBT, PET, PCCD, PCTG) were employed to modify the blend including PPPBP-PC-3 and PC-5 (101). As shown in Table 42, a decrease in melt viscosity was observed in all compositions composed of PEPQ and/or 1-2% of the polyester flow aids. The greatest flow improvement was observed with 1% PBT/1% PET (189), although this also resulted in the greatest decrease in melt stability. Incorporation of PEPQ caused a slight decrease in viscosity and melt stability even without the addition of any polyesters. These results demonstrated that PPPBP-PC-3 combined with small amounts of flow aid(s) maintained a low YI and resulted in a greater flow increase than with just PPPBP-PC-3 alone.

TABLE 42

|  | Composition | | | | | | | |
| --- | --- | --- | --- | --- | --- | --- | --- | --- |
|  | 101 | 187 | 188 | 189 | 190 | 191 | 192 | 193 |
| PPPBP-PC-3 (%) | 65.0 | 65.0 | 65.0 | 65.0 | 65.0 | 65.0 | 65.0 | 65.0 |
| PC-5 (%) | 34.61 | 34.53 | 33.53 | 32.53 | 32.61 | 32.53 | 32.61 | 32.53 |
| PBT-1 (%) |  |  | 1.0 | 1.0 |  |  |  |  |
| PET-1 (%) |  |  |  | 1.0 |  |  |  |  |
| PCCD (%) |  |  |  |  | 2.0 | 2.0 |  |  |
| PCTG, 80% CHDM (%) |  |  |  |  |  |  | 2.0 | 2.0 |
| PETS (%) | 0.27 | 0.27 | 0.27 | 0.27 | 0.27 | 0.27 | 0.27 |  |
| Phosphite Stab.; Irgafos 168 (%) | 0.08 |  |  |  | 0.08 |  | 0.08 |  |
| Hindered Phenol; Irgafos 1076 (%) | 0.04 | 0.05 | 0.05 | 0.05 | 0.04 | 0.05 | 0.04 | 0.05 |
| MZP (%) |  | 0.05 | 0.05 | 0.05 |  | 0.05 |  | 0.05 |
| PEPQ (%) |  | 0.10 | 0.10 | 0.10 |  | 0.10 |  | 0.10 |
| Melt density, 330° C., 2.17 kg (g/cm$^3$) | 1.0 | 1.1 | 1.1 | 1.0 | 1.1 | 1.1 | 1.1 | 1.1 |
| MVR, 330° C., 2.16 kg, 360 sec (cm$^3$/10 min) | 70 | 99 | 98 | 109 | 84 | 104 | 78 | 104 |
| MFR, 330° C., 2.16 kg, 360 sec (g/10 min) | 73 | 106 | 90 | 114 | 84 | 113 | 85 | 109 |
| Melt vis 316° C., 5000 s$^{-1}$ (Pa-s) | 99 | 86 | 86 | 81 | 96 | 83 | 95 | 83 |
| Tg (° C.) | 171 | 171 | 171 | 168 | 168 | 168 | 171 | 168 |
| Parallel Plate Viscosity Change; 316° C. (%) | 4 | −14 | −32 | −46 | −9 | −27 | −20 | −34 |
| YI (avg) | 4.4 | 4.2 | 3.9 | 3.9 | 3.9 | 3.5 | 4.0 | 3.5 |
| Haze | 1.0 | 1.7 | 1.2 | 1.0 | 0.7 | 1.0 | 0.7 | 0.9 |
| MAI Energy total (standard) (J) | 66 | 66 | 62 | 62 | 57 | 65 | 68 | 66 |
| Ductility (%) | 90 | 10 | 40 | 33 | 60 | 40 | 70 | 30 |
| HDT, 0.45 MPa (° C.) | 164 | 164 | 160 | 155 | 159 | 158 | 160 | 158 |

Decreased amounts of polyester flow aids (1-2% PBT, PET, PCCD, PCTG) were also were employed to modify the blends including PPPBP-PC-3 and a mixture of PC-4 and PC-6 (102). As shown in Table 43, melt viscosity is decreased in all compositions with PEPQ and/or 1-2% of the polyester flow aids. Again, the greatest flow improvement was with 1% PBT/1% PET (196), although this also resulted in the greatest decrease in melt stability. Incorporation of PEPQ caused a slight decrease in viscosity and melt stability even without the addition of any polyesters. As in the blends with PC-5, the PPPBP-PC-3 combined with small amounts of flow aid(s) maintained a low YI and resulted in a greater flow increase than with just PPPBP-PC-3 alone. These compositions also demonstrated less influence on melt stability than by the addition of increased amounts of flow aid.

TABLE 43

| Composition | 102 | 194 | 195 | 196 | 197 | 198 | 199 | 200 |
| --- | --- | --- | --- | --- | --- | --- | --- | --- |
| PPPBP-PC-3 (%) | 65.0 | 65.0 | 65.0 | 65.0 | 65.0 | 65.0 | 65.0 | 65.0 |
| PC-4 (%) | 15.38 | 15.34 | 14.89 | 14.44 | 14.48 | 14.44 | 14.48 | 14.44 |
| PC-6 (%) | 19.23 | 19.19 | 18.64 | 18.09 | 18.13 | 18.09 | 18.13 | 18.09 |
| PBT-1 (%) |  |  | 1.0 | 1.0 |  |  |  |  |
| PET-1 (%) |  |  |  | 1.0 |  |  |  |  |
| PCCD (%) |  |  |  |  | 2.0 | 2.0 |  |  |
| PCTG, 80% CHDM (%) |  |  |  |  |  |  | 2.0 | 2.0 |
| PETS (%) | 0.27 | 0.27 | 0.27 | 0.27 | 0.27 | 0.27 | 0.27 | 0.27 |
| Phosphite Stab.; Irgafos 168 (%) | 0.08 |  |  |  | 0.08 |  | 0.08 |  |
| Hindered Phenol; Irgafos 1076 (%) | 0.04 | 0.05 | 0.05 | 0.05 | 0.04 | 0.05 | 0.04 | 0.05 |

TABLE 43-continued

| Composition | 102 | 194 | 195 | 196 | 197 | 198 | 199 | 200 |
|---|---|---|---|---|---|---|---|---|
| MZP (%) | | 0.05 | 0.05 | 0.05 | | 0.05 | | 0.05 |
| PEPQ (%) | | 0.10 | 0.10 | 0.10 | | 0.10 | | 0.10 |
| Melt density, 330° C., 2.17 kg (g/cm$^3$) | 0.91 | 1.07 | 0.9 | 1.12 | 1.04 | 1.05 | 1.06 | 1.0 |
| MVR, 330° C., 2.16 kg, 360 sec (cm$^3$/10 min) | 87 | 109 | 131 | 120 | 83 | 116 | 91 | 115 |
| MFR, 330° C., 2.16 kg, 360 sec (g/10 min) | 75 | 114 | 108 | 138 | 90 | 120 | 95 | 110 |
| Melt vis 316° C., 5000 s$^{-1}$ (Pa-s) | 110 | 80 | 78 | 75 | 91 | 77 | 88 | 79 |
| Tg (° C.) | 171 | 171 | 168 | 165 | 168 | 164 | 168 | 168 |
| Parallel Plate Viscosity Change; 316° C. (%) | −1 | −18 | −33 | −46 | −14 | −30 | −25 | −37 |
| YI (avg) | 3.8 | 3.5 | 3.5 | 3.5 | 3.8 | 3.5 | 3.9 | 3.3 |
| Haze | 1.5 | 1.2 | 1.2 | 1.0 | 0.7 | 1.0 | 0.6 | 0.9 |
| MAI Energy total (standard) (J) | 61 | 61 | 47 | 54 | 54 | 58 | 58 | 46 |
| Ductility (%) | 60 | 40 | 20 | 20 | 50 | 33 | 66 | 40 |
| HDT, 0.45 MPa (° C.) | 160 | 158 | 157 | 155 | 158 | 157 | 158 | 159 |

For reasons of completeness, set forth below are some embodiments of the articles disclosed herein.

Embodiment 1

A metallized article (e.g., a metallized bezel) comprising a thermoplastic composition comprising: (a) a first polycarbonate that includes structural units derived from at least one of:

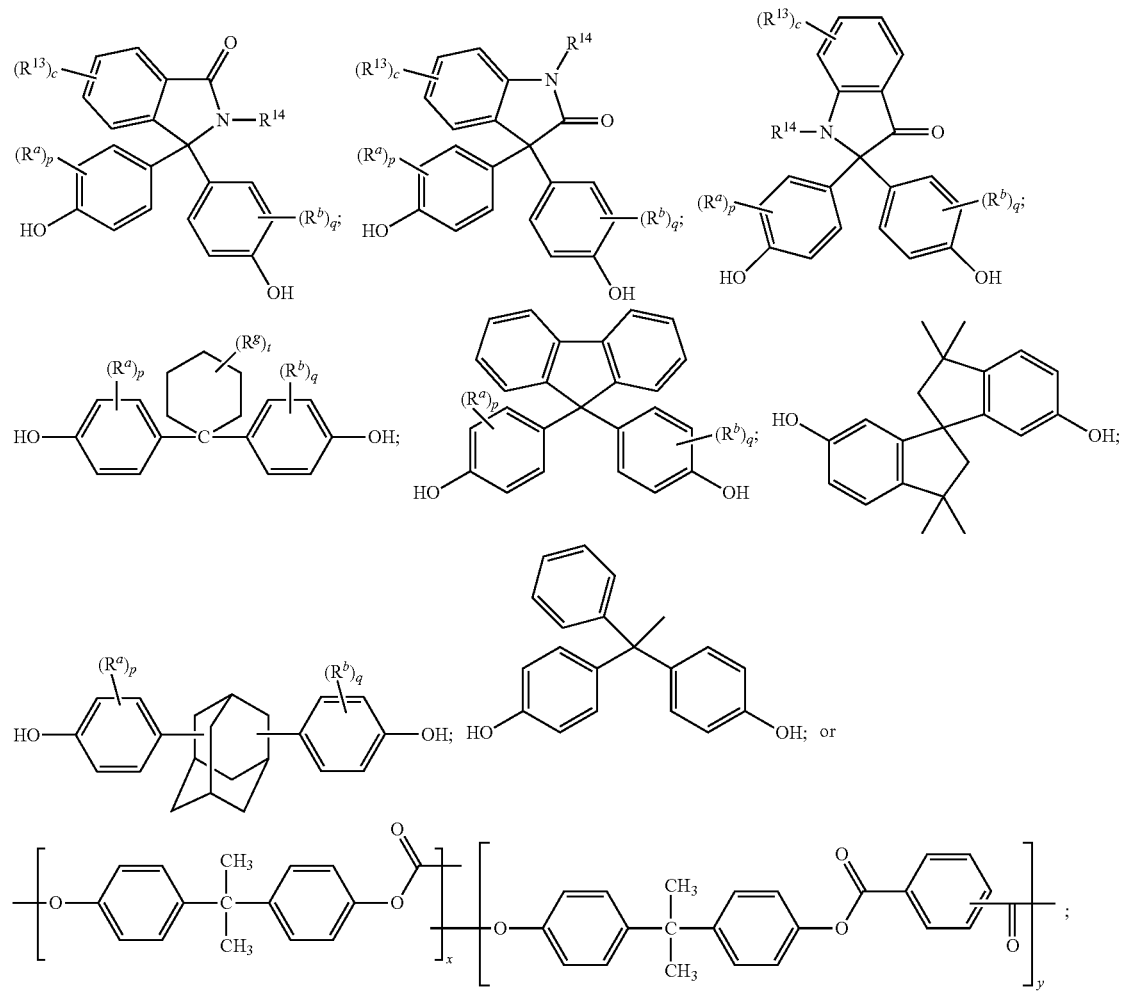

wherein $R^a$ and $R^b$ at each occurrence are each independently halogen, $C_1$-$C_{12}$ alkyl, $C_1$-$C_{12}$ alkenyl, $C_3$-$C_8$ cycloalkyl, or $C_1$-$C_{12}$ alkoxy; p and q at each occurrence are each independently 0 to 4; $R^{13}$ at each occurrence is independently a halogen or a $C_1$-$C_6$ alkyl group; c at each occurrence is independently 0 to 4; $R^{14}$ at each occurrence is independently a $C_1$-$C_6$ alkyl, phenyl, or phenyl substituted with up to five halogens or $C_1$-$C_6$ alkyl groups; $R^g$ at each occurrence is independently $C_1$-$C_{12}$ alkyl or halogen, or two $R^g$ groups together with the carbon atoms to which they are attached form a four-, five-, or six-membered cycloalkyl group; t is 0 to 10; and x:y is 1:99 to 99:1; (b) optionally a second polycarbonate that is a BPA polycarbonate having a Mw of 17,000 g/mol [±1,000 g/mol] to 24,000 g/mol [±1,000 g/mol], as determined by GPC using BPA polycarbonate standards; (c) a hydroxyl-functionalized flow promoter; (d) optionally a third polycarbonate that is a BPA polycarbonate having a Mw of 17,000 g/mol [±1,000 g/mol] to 40,000 g/mol [±1,000 g/mol], as determined by GPC using BPA polycarbonate standards; provided the third polycarbonate is different from the second polycarbonate; and (e) optionally a fourth polycarbonate that is a BPA polycarbonate-polydimethylsiloxane copolymer comprising 5 wt % to 25 wt % siloxane, having an average polydimethylsiloxane block length of 30 to 100 units; wherein the composition has a heat deflection temperature of at least 140° C., measured at 0.45 MPa in accordance with ISO 75; wherein the composition has a melt viscosity of less than 350 Pa·s, measured in accordance with ISO 11443 at 300° C. at a shear rate of 1500 $s^{-1}$.

Embodiment 2

The article of Embodiment 1, wherein the article has one or more of the following properties: a minimum haze onset temperature of 150° C.; achieves a GT0 metal adhesion rating when measured in accordance with ASTM 3359/ISO 2409; and exhibits 0% corrosion when stored for 240 hours at 98% relative humidity at 40° C., in accordance with DIN 50017.

Embodiment 3

The article of Embodiment 1 or Embodiment 2, wherein the first polycarbonate comprises at least 18 mol % structural units derived from BPA, and has a Tg of at least 170° C.

Embodiment 4

The article of any one of Embodiments 1-3, wherein the first polycarbonate comprises 31 mol % to 35 mol % structural units derived from PPPBP; and has a Mw of 15,500 g/mol [±1,000 g/mol] to 40,000 g/mol [±1,000 g/mol], as determined by GPC using BPA polycarbonate standards.

Embodiment 5

The article of any one of Embodiments 1-4, wherein the second polycarbonate and the third polycarbonate are each independently selected from: a BPA polycarbonate having a Mw of 17,000 g/mol [±1,000 g/mol] to 24,000 g/mol [±1,000 g/mol], as determined by GPC using BPA polycarbonate standards; and a BPA polycarbonate having a Mw of 26,000 g/mol [±1,000 g/mol] to 30,000 g/mol [±1,000 g/mol], as determined by GPC using BPA polycarbonate standards.

Embodiment 6

The article of any one of Embodiments 1-5, wherein the second polycarbonate and the third polycarbonate are each independently selected from: a PCP end-capped linear BPA polycarbonate having a Mw of 18,200 g/mol [±1,000 g/mol], as determined by GPC using BPA polycarbonate standards; a PCP end-capped linear BPA polycarbonate having a Mw of 18,800 g/mol [±1,000 g/mol], as determined by GPC using BPA polycarbonate standards; a linear BPA polycarbonate having a Mw of 21,700 g/mol [±1,000 g/mol], as determined by GPC using BPA polycarbonate standards; a phenol end-capped linear BPA polycarbonate having a Mw of 21,800 g/mol [±1,000 g/mol] as determined by GPC using BPA polycarbonate standards; a PCP end-capped linear BPA polycarbonate having a Mw of 21,900 g/mol [±1,000 g/mol] as determined by GPC using BPA polycarbonate standards; a PCP end-capped linear BPA polycarbonate having a Mw of 29,900 g/mol [±1,000 g/mol] as determined by GPC using BPA polycarbonate standards; and a phenol end-capped linear BPA polycarbonate having a Mw of 30,000 g/mol [±1,000 g/mol] as determined by GPC using BPA polycarbonate standards.

Embodiment 7

The article of any one of Embodiments 1-6, wherein the hydroxyl-functionalized flow promoter is a bis-hydroxyl-functionalized structure.

Embodiment 8

The article of any one of Embodiments 1-6, wherein the hydroxyl-functionalized flow promoter is ethylene glycol, propylene glycol, polyethylene glycol, polypropylene glycol, poly(1,4-butylene) glycol, block or random poly (ethylene glycol)-co-(propylene glycol) copolymer, THAM, sorbitol, sucrose, fructose, glucose, GMS, 1,4-dihydroxybenzene, 2,2-bis(4-hydroxyphenyl)propane, THPE, BisAP, DMBPC, BPI, BPA, PCP, PPPBP, a polycarbonate homo-polymer or co-polymer having an aryl hydroxy end-group content of greater than 350 ppm, a polyalkylene glycol having a Mw of up to 36,000 g/mol [±1,000 g/mol], a polyethylene glycol (PEG) having a Mw of 3,350 g/mol [±1,000 g/mol], a PEG having a Mw of 10,000 g/mol [±1,000 g/mol], a PEG having a Mw of 35,000 g/mol [±1,000 g/mol], or a polypropylene glycol (PPG) having a Mw of 2,000 g/mol [±1,000 g/mol].

Embodiment 9

The article of any one of Embodiments 1-8, wherein the fourth polycarbonate is: a PCP end-capped BPA polycarbonate-polydimethylsiloxane copolymer comprising 6 wt % siloxane, having an average polydimethylsiloxane block length of 45 units; or a PCP end-capped BPA polycarbonate-polydimethylsiloxane copolymer comprising 20 wt % siloxane, having an average polydimethylsiloxane block length of 45 units; wherein the fourth polycarbonate has a Mw of 23,000 g/mol [±1,000 g/mol] to 30,000 g/mol [±1,000 g/mol], as determined by GPC using BPA polycarbonate standards.

Embodiment 10

The article of any one of Embodiments 1-9, wherein the composition comprises: 60 wt % to 70 wt % of the first polycarbonate; 15 wt % to 40 wt % of the second polycarbonate; 0.1 wt % to 2 wt % of the hydroxyl-functionalized flow promoter; optionally 15 wt % to 25 wt % of the third polycarbonate; and optionally 10 wt % to 25 wt % of the fourth polycarbonate; provided that the combined wt % value of all components does not exceed 100 wt %.

Embodiment 11

The article according to any one of Embodiments 1-10, wherein the composition is selected from the group consisting of (1) to (15): (1) a composition comprising 64.0 wt % of the first polycarbonate; 18.0 wt % of the second polycarbonate; 17.1 wt % of the third polycarbonate; 0.5 wt % of the flow promoter; and 0.4 wt % of additives; (2) a composition comprising 64.0 wt % of the first polycarbonate; 12.0 wt % of the second polycarbonate; 23.1 wt % of the third polycarbonate; 0.5 wt % of the flow promoter; and 0.4 wt % of additives; (3) a composition comprising 64.0 wt % of the first polycarbonate; 6.0 wt % of the second polycarbonate; 29.1 wt % of the third polycarbonate; 0.5 wt % of the flow promoter; and 0.4 wt % of additives; (4) a composition comprising 64.0 wt % of the first polycarbonate; 35.6 wt % of the second polycarbonate; 0.5 wt % of the flow promoter; and 0.4 wt % of additives; (5) a composition comprising 64.0 wt % of the first polycarbonate; 18.0 wt % of the second polycarbonate; 16.8 wt % of the third polycarbonate; 0.8 wt % of the flow promoter; and 0.4 wt % of additives; (6) a composition comprising 64.0 wt % of the first polycarbonate; 18.0 wt % of the second polycarbonate; 16.6 wt % of the third polycarbonate; 1.0 wt % of the flow promoter; and 0.4 wt % of additives; (7) a composition comprising 64.0 wt % of the first polycarbonate; 18.0 wt % of the second polycarbonate; 17.1 wt % of the fourth polycarbonate; 0.5 wt % of the flow promoter; and 0.4 wt % of additives; (8) a composition comprising 64.0 wt % of the first polycarbonate; 17.1 wt % of the second polycarbonate; 18.0 wt % of the fourth polycarbonate; 0.5 wt % of the flow promoter; and 0.4 wt % of additives; (9) a composition comprising 64.0 wt % of the first polycarbonate; 18.0 wt % of the second polycarbonate; 16.6 wt % of the fourth polycarbonate; 1.0 wt % of the flow promoter; and 0.4 wt % of additives; (10) a composition comprising 64.0 wt % of the first polycarbonate; 16.8 wt % of the second polycarbonate; 18.0 wt % of the fourth polycarbonate; 0.8 wt % of the flow promoter; and 0.4 wt % of additives; (11) a composition comprising 65.0 wt % of the first polycarbonate; 34.4 wt % of the second polycarbonate; 0.2 wt % of the flow promoter; and 0.4 wt % of additives; (12) a composition comprising 65.0 wt % of the first polycarbonate; 34.1 wt % of the second polycarbonate; 0.5 wt % of the flow promoter; and 0.4 wt % of additives; (13) a composition comprising 65.0 wt % of the first polycarbonate; 34.5 wt % of the second polycarbonate; 0.1 wt % of the flow promoter; and 0.4 wt % of additives; (14) a composition comprising 65.0 wt % of the first polycarbonate; 34.4 wt % of the second polycarbonate; 0.3 wt % of the flow promoter; and 0.4 wt % of additives; and (15) a composition comprising 65.0 wt % of the first polycarbonate; 34.2 wt % of the second polycarbonate; 0.4 wt % of the flow promoter; and 0.4 wt % of additives.

Embodiment 12

The article of any one of Embodiments 1-9, wherein the composition comprises: 90 wt % to 99.6 wt % of the first polycarbonate; and 0.1 wt % to 2 wt % of the hydroxyl-functionalized flow promoter; provided that the combined wt % value of all components does not exceed 100 wt %.

Embodiment 13

The article according to any one of Embodiments 1-9 or 12, wherein the composition is selected from the group consisting of (1) to (10): (1) a composition comprising 99.2 wt % of the first polycarbonate; 0.3 wt % of the flow promoter; and 0.4 wt % of additives; (2) a composition comprising 99.0 wt % of the first polycarbonate; 0.5 wt % of the flow promoter; and 0.4 wt % of additives; (3) a composition comprising 99.3 wt % of the first polycarbonate; 0.2 wt % of the flow promoter; and 0.4 wt % of additives; (4) a composition comprising 99.4 wt % of the first polycarbonate; 0.2 wt % of the flow promoter; and 0.4 wt % of additives; (5) a composition comprising 99.1 wt % of the first polycarbonate; 0.5 wt % of the flow promoter; and 0.4 wt % of additives; (6) a composition comprising 99.5 wt % of the first polycarbonate; 0.1 wt % of the flow promoter; and 0.4 wt % of additives; (7) a composition comprising 99.4 wt % of the first polycarbonate; 0.3 wt % of the flow promoter; and 0.4 wt % of additives; (8) a composition comprising 99.2 wt % of the first polycarbonate; 0.4 wt % of the flow promoter; and 0.4 wt % of additives; (9) a composition comprising 99.3 wt % of the first polycarbonate; 0.3 wt % of the flow promoter; and 0.4 wt % of additives; and (10) a composition comprising 99.3 wt % of the first polycarbonate; 0.4 wt % of the flow promoter; and 0.4 wt % of additives.

Embodiment 14

The article of any one of Embodiments 1-13, wherein a molded sample of the composition has at least 80% ductility or at least 100% ductility in a multi-axial impact test at 23° C., measured in accordance with ISO 6603; wherein the composition has a heat deflection temperature of at least 155° C. or at least 160° C., measured at 0.45 MPa in accordance with ISO 75; wherein the composition has a melt viscosity of less than 310 Pa·s, less than 280 Pa·s, or less than 250 Pa·s, measured in accordance with ISO 11443 at 300° C. at a shear rate of 1,500 s$^{-1}$; or wherein the composition has a notched Izod impact strength (NII) of at least 8 kJ/m$^2$ at 23° C., at least 12 kJ/m$^2$, or at least 25 kJ/m$^2$, measured in accordance with ISO 180.

Embodiment 15

The article of any one of Embodiments 1-14, wherein a 3.0 mm plaque comprising the composition, metallized with a 100 nm to 150 nm thick aluminum layer using a physical vapor deposition process, and protected with a plasma-deposited siloxane hard-coat of 50 nm, has a minimum haze onset temperature of 160° C.

Embodiment 16

The article of Embodiment 15, wherein the plaque has a minimum haze onset temperature of 165° C.; wherein the plaque achieves a GT0 metal adhesion rating when measured in accordance with ASTM 3359/ISO 2409; or wherein the plaque exhibits 0% corrosion when stored for 240 hours at 98% relative humidity at 40° C., in accordance with DIN 50017.

Embodiment 17

The article of any one of Embodiments 1-14, wherein a 1.5 mm plaque comprising the composition, metallized with a 100 nm to 150 nm thick aluminum layer using a physical vapor deposition process, and protected with a plasma-deposited siloxane hard-coat of 50 nm, has a minimum haze onset temperature of 155° C.

Embodiment 18

The article of Embodiment 17, wherein the plaque has a minimum haze onset temperature of 160° C.; wherein the plaque achieves a GT0 metal adhesion rating when measured in accordance with ASTM 3359/ISO 2409; wherein the plaque exhibits 0% corrosion when stored for 120 hours at 98% relative humidity at 40° C., in accordance with DIN 50017; or wherein the plaque exhibits 0% corrosion when stored for 240 hours at 98% relative humidity at 40° C., in accordance with DIN 50017.

Embodiment 19

The article of any one of Embodiments 1-18, wherein the composition comprises 5 wt % to 35 wt % filler (e.g., talc, clay, glass, or a combination thereof).

Embodiment 20

The article of any one of Embodiments 1-19, wherein a metallized part comprising the composition has an L* of 20 or less or 15 or less, when measured using a spectrophotometer in reflection mode with specular light excluded.

Embodiment 21

The article of any one of Embodiments 1-20, selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, circuit breakers, electrical and electronic housings, and running boards, or any combination thereof.

What is claimed is:

1. A metallized article comprising a metallized surface formed on an article formed from a thermoplastic composition comprising:
   (a) 60 to 70 wt. % of a first polycarbonate that includes structural units derived from at least one of:

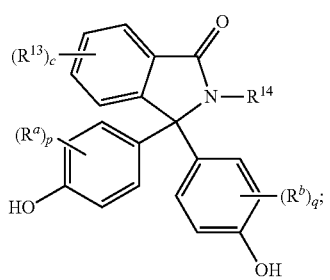

-continued

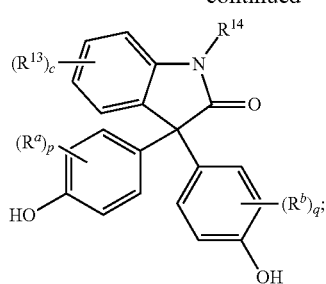

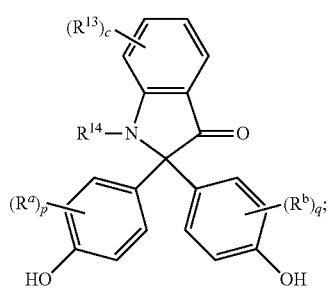

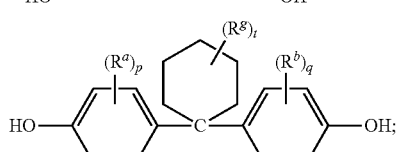

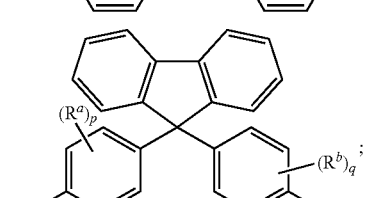

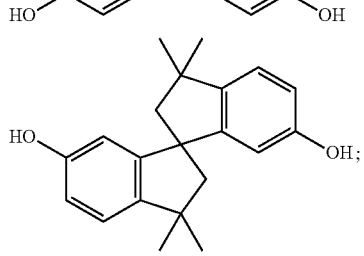

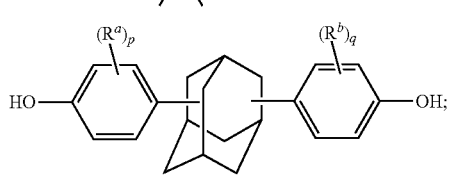

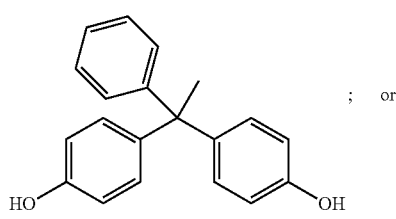

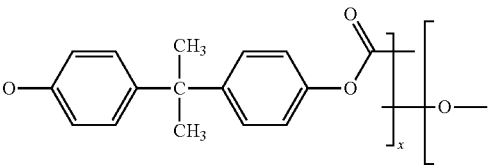

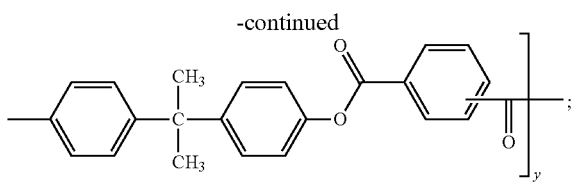

wherein $R^a$ and $R^b$ at each occurrence are each independently halogen, $C_1$-$C_{12}$ alkyl, $C_1$-$C_{12}$ alkenyl, $C_3$-$C_8$ cycloalkyl, or $C_1$-$C_{12}$ alkoxy; p and q at each occurrence are each independently 0 to 4; $R^{13}$ at each occurrence is independently a halogen or a $C_1$-$C_6$ alkyl group; c at each occurrence is independently 0 to 4; $R^{14}$ at each occurrence is independently a $C_1$-$C_6$ alkyl, phenyl, or phenyl substituted with up to five halogens or $C_1$-$C_6$ alkyl groups; $R^g$ at each occurrence is independently $C_1$-$C_{12}$ alkyl or halogen, or two $R^g$ groups together with the carbon atoms to which they are attached form a four-, five, or six-membered cycloalkyl group; t is 0 to 10; and x:y is 1:99 to 99:1;

(b) 15 to 40 wt. % of a second polycarbonate that is a BPA polycarbonate having a Mw of 17,000 g/mol [±1,000 g/mol] to 24,000 g/mol [±1,000 g/mol], as determined by GPC using BPA polycarbonate standards;

(c) 0.1 to 2 wt. % of a hydroxyl-functionalized flow promoter; the hydroxyl-functionalized flow promoter comprising an alkylene glycol, a polyalkylene glycol, tri(hydroxymethyl)aminomethan ("THAM"), sorbitol, sucrose, fructose, glucose, glyceryl monostearate ("GMS"), 1,4-dihydroxybenzene, 2,2-bis(4-hydroxyphenyl)propane, 1,1,1-trishydroxy phenyl ethane (THPE), bisphenol acetophenone (BisAP), 1,1-bis(4-hydroxy-3-methylphenyl)cyclohexane (DMBPC), 4,4'-(3,3,5-trimethylcyclohexane-1,1-diyl)diphenol (BPI), paracumyl phenol (PCP), 3,3-bis(4-hydroxyphenyl)-2-phenylisoindolin-1-one (PPPBP), or a polycarbonate homo-polymer or co-polymer having an aryl hydroxy end-group content of greater than 350 ppm;

(d) 15 to 25 wt. % of a third polycarbonate that is a BPA polycarbonate having a Mw of 26,000 g/mol [±1,000 g/mol] to 30,000 g/mol [±1,000 g/mol], as determined by GPC using BPA polycarbonate standards; provided the third polycarbonate is different from the second polycarbonate; and (e) optionally a fourth polycarbonate that is a BPA polycarbonate-polydimethylsiloxane copolymer comprising 5 wt % to 25 wt % siloxane, having an average polydimethylsiloxane block length of 30 to 100 units, provided that the combined wt % value of all components does not exceed 100 wt %;

wherein the composition has a heat deflection temperature of at least 140° C., measured at 0.45 MPa in accordance with ISO 75;

wherein the composition has a melt viscosity of less than 350 Pa·s, measured in accordance with ISO 11443 at 300° C. at a shear rate of 1500 s$^{-1}$; and wherein the article has one or more of the following properties:
a minimum haze onset temperature of 150° C.;
achieves a GT0 metal adhesion rating when measured in accordance with ASTM 3359/ISO 2409; and
exhibits 0% corrosion when stored for 240 hours at 98% relative humidity at 40° C., in accordance with DIN 50017.

2. The article of claim 1, wherein the first polycarbonate comprises at least 18 mol % structural units derived from BPA, and has a Tg of at least 170° C.

3. The article of claim 1, wherein the first polycarbonate comprises 31 mol % to 35 mol % structural units derived from PPPBP; and has a Mw of 15,500 g/mol [±1,000 g/mol] to 40,000 g/mol [±1,000 g/mol], as determined by GPC using BPA polycarbonate standards.

4. The article of claim 1, wherein the hydroxyl-functionalized flow promoter is a bis-hydroxyl-functionalized structure.

5. The article of claim 1, wherein the hydroxyl-functionalized flow promoter is ethylene glycol, propylene glycol, polyethylene glycol, poly(1,4-butylene) glycol, block or random poly (ethylene glycol)-co-(propylene glycol) copolymer, a polyalkylene glycol having a Mw of up to 36,000 g/mol [±1,000 g/mol], a polyethylene glycol (PEG) having a Mw of 3,350 g/mol [±1,000 g/mol], a PEG having a Mw of 10,000 g/mol [±1,000 g/mol], a PEG having a Mw of 35,000 g/mol [±1,000 g/mol], or a polypropylene glycol (PPG) having a Mw of 2,000 g/mol [±1,000 g/mol].

6. The article of claim 1, wherein the fourth polycarbonate is
a PCP end-capped BPA polycarbonate-polydimethylsiloxane copolymer comprising 6 wt % siloxane, having an average polydimethylsiloxane block length of 45 units; or
a PCP end-capped BPA polycarbonate-polydimethylsiloxane copolymer comprising 20 wt % siloxane, having an average polydimethylsiloxane block length of 45 units;
wherein the fourth polycarbonate has a Mw of 23,000 g/mol [±1,000 g/mol] to 30,000 g/mol [±1,000 g/mol], as determined by GPC using BPA polycarbonate standards.

7. The article of claim 1, wherein a molded sample of the composition has at least 80% ductility in a multi-axial impact test at 23° C., measured in accordance with ISO 6603; wherein the composition has a heat deflection temperature of at least 155° C., measured at 0.45 MPa in accordance with ISO 75; wherein the composition has a melt viscosity of less than 310 Pa·s measured in accordance with ISO 11443 at 300° C. at a shear rate of 1,500 s$^{-1}$; or wherein the composition has a notched Izod impact strength (NII) of at least 8 kJ/m$^2$ at 23° C., measured in accordance with ISO 180.

8. The article of claim 1, wherein the article is a plaque having thickness of 3.0 mm plaque comprising the composition, metallized with a 100 nm to 150 nm thick aluminum layer using a physical vapor deposition process, and protected with a plasma-deposited siloxane hard-coat of 50 nm has a minimum haze onset temperature of 165° C.; wherein the plaque achieves a GT0 metal adhesion rating when measured in accordance with ASTM 3359/ISO 2409; or wherein the plaque exhibits 0% corrosion when stored for 240 hours at 98% relative humidity at 40° C., in accordance with DIN 50017.

9. The article of claim 1, wherein the article is a plaque having a thickness of 1.5 mm comprising the composition, metallized with a 100 nm to 150 nm thick aluminum layer using a physical vapor deposition process, and protected with a plasma-deposited siloxane hard-coat of 50 nm, has a minimum haze onset temperature of 155° C.

10. The article of claim 9, wherein the plaque has a minimum haze onset temperature of 160° C.; wherein the plaque achieves a GT0 metal adhesion rating when measured in accordance with ASTM 3359/ISO 2409; wherein the plaque exhibits 0% corrosion when stored for 120 hours at 98% relative humidity at 40° C., in accordance with DIN 50017; or wherein the plaque exhibits 0% corrosion when stored for 240 hours at 98% relative humidity at 40° C., in accordance with DIN 50017.

11. The article of claim 1, wherein the composition comprises 5 wt % to 35 wt % filler.

12. The article of claim 1, wherein a metallized part comprising the composition has an L* of 20 or less or 15 or less, when measured using a spectrophotometer in reflection mode with specular light excluded.

13. The article of claim 1, selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, circuit breakers, electrical and electronic housings, and running boards, or any combination thereof.

14. The article of claim 1, wherein the flow promoter is paracumyl phenol (PCP), or 3,3-bis(4-hydroxyphenyl)-2-phenylisoindolin-1-one (PPPBP); and the flow promoter is present in the compositions in an amount of 0.05 to 1% by weight, based on total weight of the composition.

15. The article of claim 1, wherein the flow promoter is tri(hydroxymethyl)aminomethan ("THAM"); and the flow promoter is present in the compositions in an amount of 0.05 to 1% by weight, based on total weight of the composition.

16. A metallized article comprising a metallized surface formed on an article formed from a thermoplastic composition comprising:
(a) a first polycarbonate that includes structural units derived from at least one of:

wherein $R^a$ and $R^b$ at each occurrence are each independently halogen, $C_1$-$C_{12}$ alkyl, $C_1$-$C_{12}$ alkenyl, $C_3$-$C_8$ cycloalkyl, or $C_1$-$C_{12}$ alkoxy; p and q at each occurrence are each independently 0 to 4; $R^{13}$ at each occurrence is independently a halogen or a $C_1$-$C_6$ alkyl group; c at each occurrence is independently 0 to 4; $R^{14}$ at each occurrence is independently a $C_1$-$C_6$ alkyl, phenyl, or phenyl substituted with up to five halogens or $C_1$-$C_6$ alkyl groups; $R^g$ at each occurrence is independently $C_1$-$C_{12}$, alkyl or halogen, or two $R^g$ groups together with the carbon atoms to which they are attached form a four-, five-, or six-membered cycloalkyl group; t is 0 to 10; and x:y is 1:99 to 99:1;
(b) a second polycarbonate that is a BPA polycarbonate having a Mw of 17,000 g/mol [±1,000 g/mol] to 24,000 g/mol [±1,000 g/mol], as determined by GPC using BPA polycarbonate standards;
(c) a hydroxyl-functionalized flow promoter present in an amount of 0.01 to 2% by weight based on the total weight of the composition; the hydroxyl-functionalized flow promoter comprising an alkylene glycol, a polyalkylene glycol, tri(hydroxymethyl)aminomethan ("THAM"), sorbitol, sucrose, fructose, glucose, glyceryl monostearate ("GMS"), 1,4-dihydroxybenzene, 2,2-bis(4-hydroxyphenyl)propane, 1,1,1-trishydroxy phenyl ethane (THPE), bisphenol acetophenone (BisAP), 1,1-bis(4-hydroxy-3-methylphenyl)cyclohexane (DMBPC), 4,4'-(3,3,5-trimethylcyclohexane-1,1-diyl)diphenol (BPI), paracumyl phenol (PCP), 3,3-bis(4-hydroxyphenyl)-2-phenylisoindolin-1-one (PPPBP), or a polycarbonate homo-polymer or co-polymer having an aryl hydroxy end-group content of greater than 350 ppm;

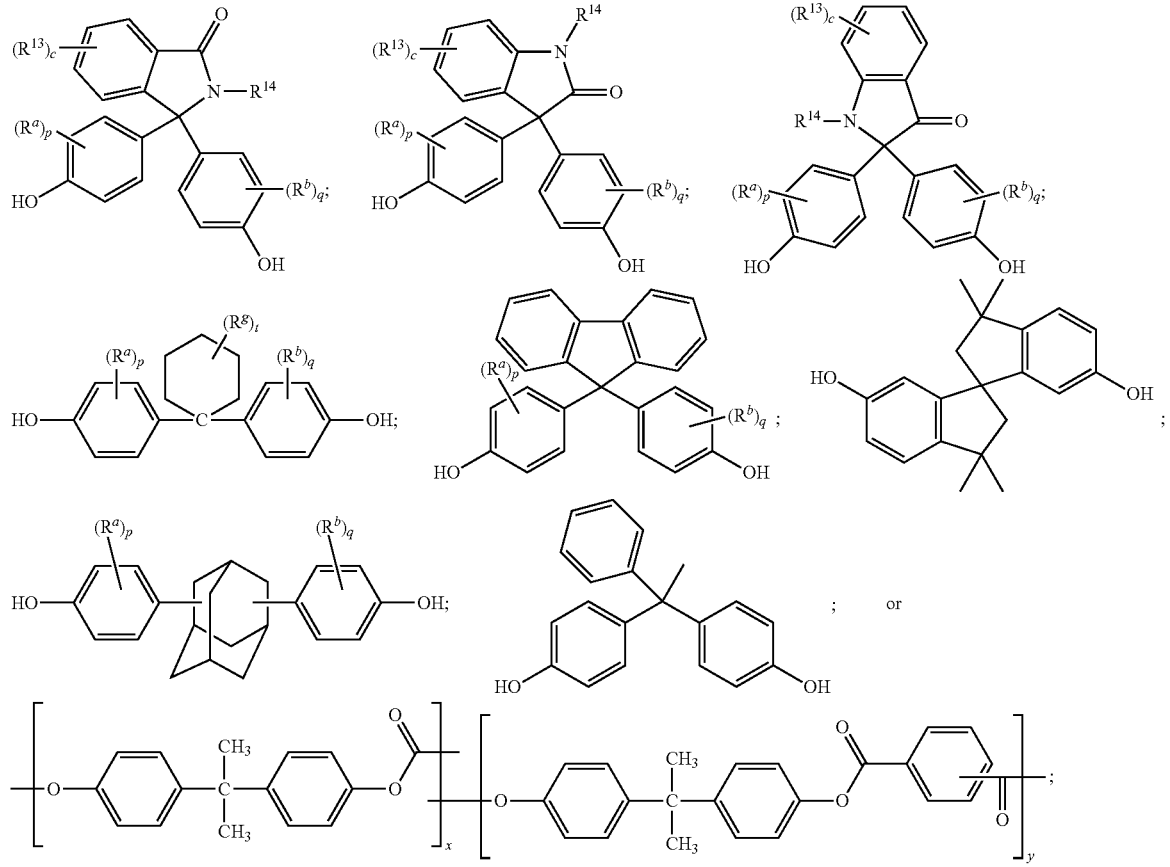

(d) a third polycarbonate that is a BPA polycarbonate having a Mw of 26,000 g/mol [±1,000 g/mol] to 30,000 g/mol [±1,000 g/mol], as determined by GPC using BPA polycarbonate standards; provided the third polycarbonate is different from the second polycarbonate; and (e) optionally a fourth polycarbonate that is a BPA polycarbonate-polydimethylsiloxane copolymer comprising 5 wt % to 25 wt % siloxane, having an average polydimethylsiloxane block length of 30 to 100 units, provided that the combined wt % value of all components does not exceed 100 wt % and the second polycarbonate is present in the composition;

wherein the composition has a heat deflection temperature of at least 140° C., measured at 0.45 MPa in accordance with ISO 75;

wherein the composition has a melt viscosity of less than 350 Pa·s, measured in accordance with ISO 11443 at 300° C. at a shear rate of 1500 s$^{-1}$; and wherein the article has one or more of the following properties:

a minimum haze onset temperature of 150° C.;

achieves a GT0 metal adhesion rating when measured in accordance with ASTM 3359/ISO 2409; and exhibits 0% corrosion when stored for 240 hours at 98% relative humidity at 40° C., in accordance with DIN 50017, and wherein the second polycarbonate is selected from:

a PCP end-capped linear BPA polycarbonate having a Mw of 18,200 g/mol [±1,000 g/mol], as determined by GPC using BPA polycarbonate standards;

a PCP end-capped linear BPA polycarbonate having a Mw of 18,800 g/mol [±1,000 g/mol], as determined by GPC using BPA polycarbonate standards;

a linear BPA polycarbonate having a Mw of 21,700 g/mol [±1,000 g/mol], as determined by GPC using BPA polycarbonate standards;

a phenol end-capped linear BPA polycarbonate having a Mw of 21,800 g/mol [±1,000 g/mol] as determined by GPC using BPA polycarbonate standards; and a PCP end-capped linear BPA polycarbonate having a Mw of 21,900 g/mol [±1,000 g/mol] as determined by GPC using BPA polycarbonate standards; and wherein the third polycarbonate is selected from a PCP end-capped linear BPA polycarbonate having a Mw of 29,900 g/mol [±1,000 g/mol] as determined by GPC using BPA polycarbonate standards; and a phenol end-capped linear BPA polycarbonate having a Mw of 30,000 g/mol [±1,000 g/mol] as determined by GPC using BPA polycarbonate standards.

17. A metallized article comprising a metallized surface formed on an article formed from a thermoplastic composition comprising:

(a) a first polycarbonate that includes structural units derived from at least one of:

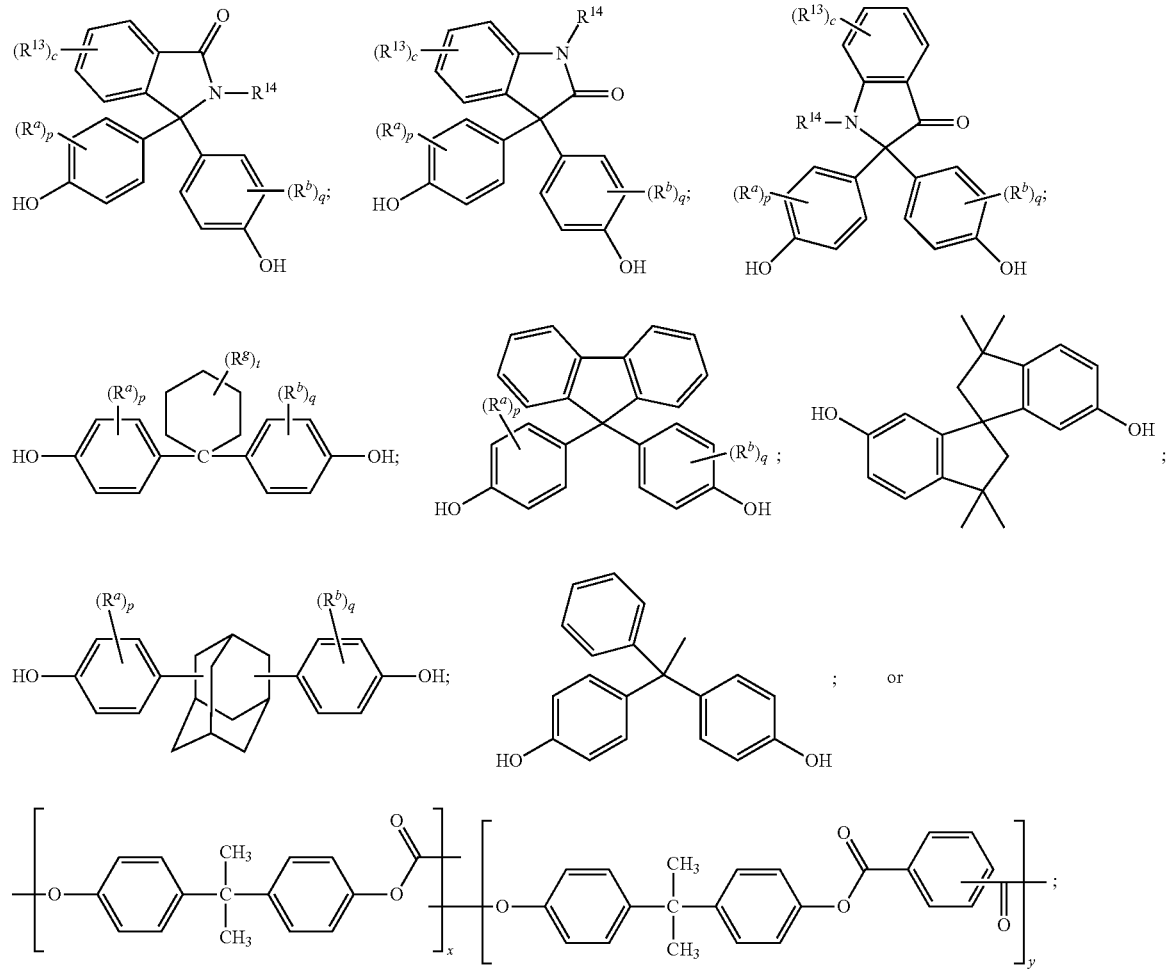

wherein $R^a$ and $R^b$ at each occurrence are each independently halogen, $C_1$-$C_{12}$, alkyl, $C_1$-$C_{12}$alkenyl, $C_3$-$C_8$ cycloalkyl, or $C_1$-$C_{12}$, alkoxy; p and q at each occurrence are each independently 0 to 4; $R^{13}$ at each occurrence is independently a halogen or a $C_1$-$C_6$ alkyl group; c at each occurrence is independently 0 to 4; $R^{14}$ at each occurrence is independently a $C_1$-$C_6$ alkyl, phenyl, or phenyl substituted with up to five halogens or $C_1$-$C_6$ alkyl groups; $R^g$ at each occurrence is independently $C_1$-$C_{12}$, alkyl or halogen, or two $R^g$ groups together with the carbon atoms to which they are attached form a four-, five-, or six-membered cycloalkyl group; t is 0 to 10; and x:y is 1:99 to 99:1;

(b) a second polycarbonate that is a BPA polycarbonate having a Mw of 17,000 g/mol [±1,000 g/mol] to 24,000 g/mol [±1,000 g/mol], as determined by GPC using BPA polycarbonate standards;

(c) a hydroxyl-functionalized flow promoter present in an amount of 0.01 to 2% by weight based on the total weight of the composition; the hydroxyl-functionalized flow promoter comprising an alkylene glycol, a polyalkylene glycol, tri(hydroxymethyl)aminomethan ("THAM"), sorbitol, sucrose, fructose, glucose, glyceryl monostearate ("GMS"), 1,4-dihydroxybenzene, 2,2-bis(4-hydroxyphenyl)propane, 1,1,1-trishydroxy phenyl ethane (THPE), bisphenol acetophenone (BisAP), 1,1-bis(4-hydroxy-3-methylphenyl)cyclohexane (DMBPC), 4,4'-(3,3,5-trimethylcyclohexane-1,1-diyl)diphenol (BPI), paracumyl phenol (PCP), 3,3-bis(4-hydroxyphenyl)-2-phenylisoindolin-1-one (PPPBP), or a polycarbonate homo-polymer or co-polymer having an aryl hydroxy end-group content of greater than 350 ppm;

(d) a third polycarbonate that is a BPA polycarbonate having a Mw of 26,000 g/mol [±1,000 g/mol] to 30,000 g/mol [±1,000 g/mol], as determined by GPC using BPA polycarbonate standards; provided the third polycarbonate is different from the second polycarbonate; and (e) optionally a fourth polycarbonate that is a BPA polycarbonate-polydimethylsiloxane copolymer comprising 5 wt % to 25 wt % siloxane, having an average polydimethylsiloxane block length of 30 to 100 units, provided that the combined wt % value of all components does not exceed 100 wt % and the second polycarbonate is present in the composition;

wherein the composition has a heat deflection temperature of at least 140° C., measured at 0.45 MPa in accordance with ISO 75;

wherein the composition has a melt viscosity of less than 350 Pa·s, measured in accordance with ISO 11443 at 300° C. at a shear rate of 1500 s$^{-1}$; and wherein the article has one or more of the following properties:

a minimum haze onset temperature of 150° C.;

achieves a GT0 metal adhesion rating when measured in accordance with ASTM 3359/ISO 2409; and exhibits 0% corrosion when stored for 240 hours at 98% relative humidity at 40° C., in accordance with DIN 50017, and wherein the composition is selected from the group consisting of (1) to (6):

(1) a composition comprising 64.0 wt % of the first polycarbonate; 18.0 wt % of the second polycarbonate; 17.1 wt % of the third polycarbonate; 0.5 wt % of the flow promoter; and 0.4 wt % of additives;

(5) a composition comprising 64.0 wt % of the first polycarbonate; 18.0 wt % of the second polycarbonate; 16.8 wt % of the third polycarbonate; 0.8 wt % of the flow promoter; and 0.4 wt % of additives;

(6) a composition comprising 64.0 wt % of the first polycarbonate; 18.0 wt % of the second polycarbonate; 16.6 wt % of the third polycarbonate; 1.0 wt % of the flow promoter; and 0.4 wt % of additives.

18. A metallized article comprising a metallized surface formed on an article formed from a thermoplastic composition comprising:

(a) a first polycarbonate that includes structural units derived from at least one of:

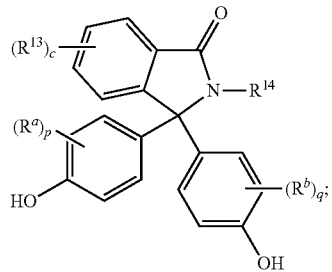 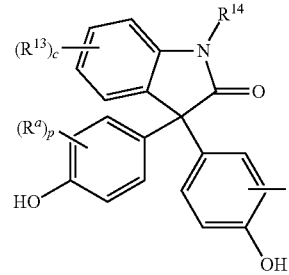 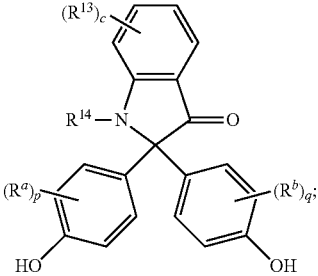

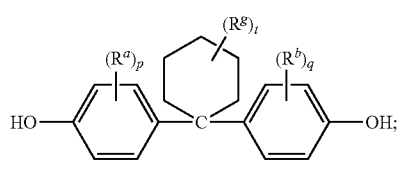 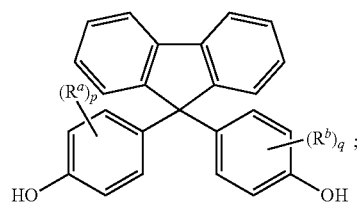 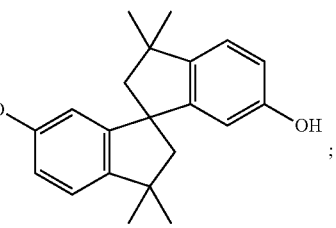

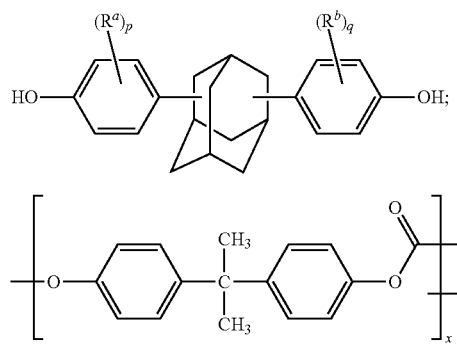
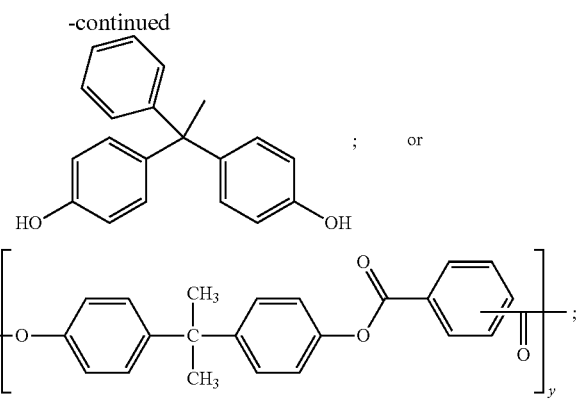

wherein $R^a$ and $R^b$ at each occurrence are each independently halogen, $C_1$-$C_{12}$ alkyl, $C_1$-$C_{12}$ alkenyl, $C_3$-$C_8$ cycloalkyl, or $C_1$-$C_{12}$ alkoxy; p and q at each occurrence are each independently 0 to 4; $R^{13}$ at each occurrence is independently a halogen or a $C_1$-$C_6$ alkyl group; c at each occurrence is independently 0 to 4; $R^{14}$ at each occurrence is independently a $C_1$-$C_6$ alkyl, phenyl, or phenyl substituted with up to five halogens or $C_1$-$C_6$ alkyl groups; $R^g$ at each occurrence is independently $C_1$-$C_{12}$, alkyl or halogen, or two $R^g$ groups together with the carbon atoms to which they are attached form a four-, five-, or six-membered cycloalkyl group; t is 0 to 10; and x:y is 1:99 to 99:1;

(b) a second polycarbonate that is a BPA polycarbonate having a Mw of 17,000 g/mol [±1,000 g/mol] to 24,000 g/mol [±1,000 g/mol], as determined by GPC using BPA polycarbonate standards;

(c) a hydroxyl-functionalized flow promoter;

(d) a third polycarbonate that is a BPA polycarbonate having a Mw of 26,000 g/mol [±1,000 g/mol] to 30,000 g/mol [±1,000 g/mol], as determined by GPC using BPA polycarbonate standards; provided the third polycarbonate is different from the second polycarbonate; and (e) optionally a fourth polycarbonate that is a BPA polycarbonate-polydimethylsiloxane copolymer comprising 5 wt % to 25 wt % siloxane, having an average polydimethylsiloxane block length of 30 to 100 units, provided that the combined wt % value of all components does not exceed 100 wt % and the second polycarbonate is present in the composition;

wherein the composition has a heat deflection temperature of at least 140° C., measured at 0.45 MPa in accordance with ISO 75;

wherein the composition has a melt viscosity of less than 350 Pa·s, measured in accordance with ISO 11443 at 300° C. at a shear rate of 1500 s$^{-1}$; and wherein the article has one or more of the following properties:

a minimum haze onset temperature of 150° C.;

achieves a GT0 metal adhesion rating when measured in accordance with ASTM 3359/ISO 2409; and exhibits 0% corrosion when stored for 240 hours at 98% relative humidity at 40° C., in accordance with DIN 50017, wherein the flow promoter is 1,4-dihydroxybenzene, bisphenol acetophenone (BisAP), 4,4'-(3,3,5-trimethylcyclohexane-1,1-diyl)diphenol (BPI), and the flow promoter is present in the compositions in an amount of 0.05 to 1% by weight, based on total weight of the composition.

* * * * *